US011225196B2

(12) United States Patent
Anderson et al.

(10) Patent No.: US 11,225,196 B2
(45) Date of Patent: Jan. 18, 2022

(54) CONSOLE ASSEMBLY FOR VEHICLE INTERIOR

(71) Applicant: Shanghai Yanfeng Jinqiao Automotive Trim Systems Co. Ltd., Novi, MI (US)

(72) Inventors: Rick Alan Anderson, Grand Haven, MI (US); Loren Ray Washburn, Hamilton, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 16/813,211

(22) Filed: Mar. 9, 2020

(65) Prior Publication Data

US 2020/0207277 A1 Jul. 2, 2020

Related U.S. Application Data

(63) Continuation of application No. 15/890,953, filed on Feb. 7, 2018, now Pat. No. 10,717,390, which is a
(Continued)

(51) Int. Cl.
*B60R 7/04* (2006.01)
*E05C 19/16* (2006.01)
(Continued)

(52) U.S. Cl.
CPC .............. *B60R 7/04* (2013.01); *B60N 2/793* (2018.02); *E05B 77/42* (2013.01); *E05B 83/32* (2013.01);
(Continued)

(58) Field of Classification Search
CPC .. B60N 2/793; B60R 7/04; B60R 7/06; E05B 83/32; E05C 19/165
(Continued)

(56) References Cited

U.S. PATENT DOCUMENTS

| 5,639,002 | A | 6/1997 | Weitbrecht et al. |
| 7,566,084 | B2 * | 7/2009 | Kikuchi ................... B60R 7/04 |
| | | | 188/83 |
| 2005/0133507 | A1 * | 6/2005 | Tanaka ................... B65D 43/26 |
| | | | 220/263 |

FOREIGN PATENT DOCUMENTS

| CN | 2516388 Y | 10/2002 |
| CN | 100529320 C | 8/2009 |

(Continued)

OTHER PUBLICATIONS

First Office Action from the State Intellectual Property Office of the People's Republic of China for CN Patent Application No. 201780030615.0 dated Dec. 21, 2020 (with English Translation) (17 Pages).

*Primary Examiner* — Jason S Daniels

(57) ABSTRACT

A vehicle interior component comprising a cover movable relative to a base and a latch mechanism configured for movement within the base for an engaged state and a disengaged state is disclosed. The latch mechanism may maintain the disengaged state after the cover has been released from the base. The latch mechanism may comprise a magnet fixed to and concealed within the cover; the magnet of the base may be concealed within the base. The component may comprise an opening mechanism for opening of the cover upon release of external force from the cover. The opening mechanism may move the latch mechanism within the base. The latch mechanism may extend through an opening in a sidewall of the base to engage the cover to secure the cover to the base.

18 Claims, 37 Drawing Sheets

Related U.S. Application Data continuation of application No. PCT/US2017/033149, filed on May 17, 2017.

(60) Provisional application No. 62/338,413, filed on May 18, 2016.

(51) Int. Cl.
| | |
|---|---|
| *B60N 2/75* | (2018.01) |
| *E05B 77/42* | (2014.01) |
| *E05B 83/32* | (2014.01) |
| *B60R 11/00* | (2006.01) |

(52) U.S. Cl.
CPC ..... *E05C 19/165* (2013.01); *B60R 2011/0007* (2013.01); *E05Y 2900/538* (2013.01)

(58) Field of Classification Search
USPC .......................................... 296/24.34, 37.8
See application file for complete search history.

(56) References Cited

FOREIGN PATENT DOCUMENTS

| CN | 101573502 A | | 11/2009 |
|---|---|---|---|
| CN | 203515048 U | | 4/2014 |
| JP | S6095336 U | * | 6/1985 |

* cited by examiner

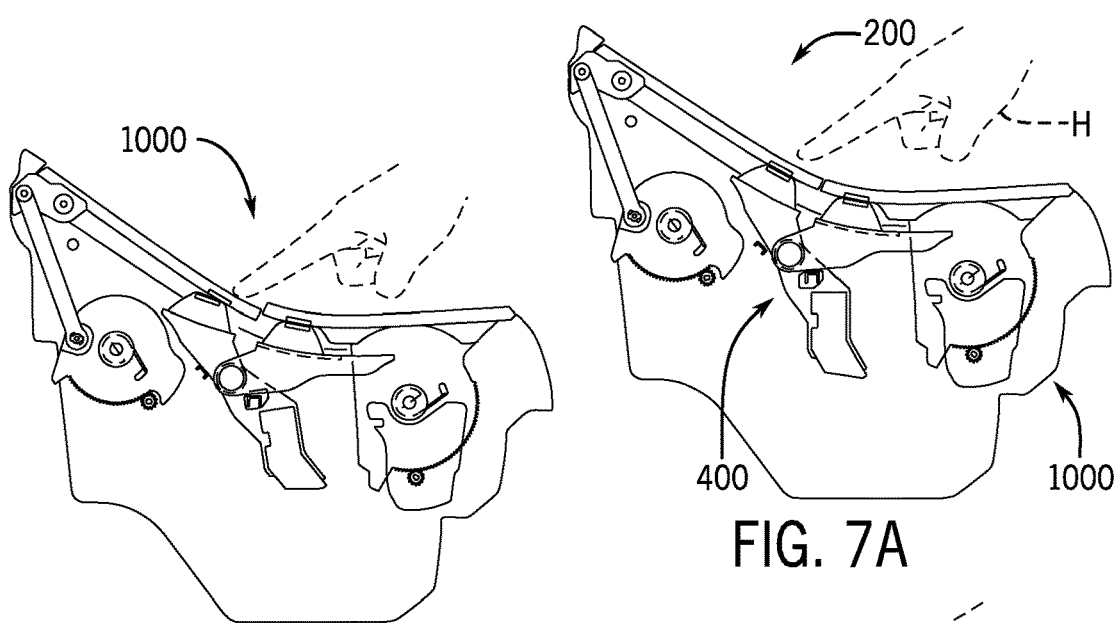
FIG. 7B
FIG. 7A
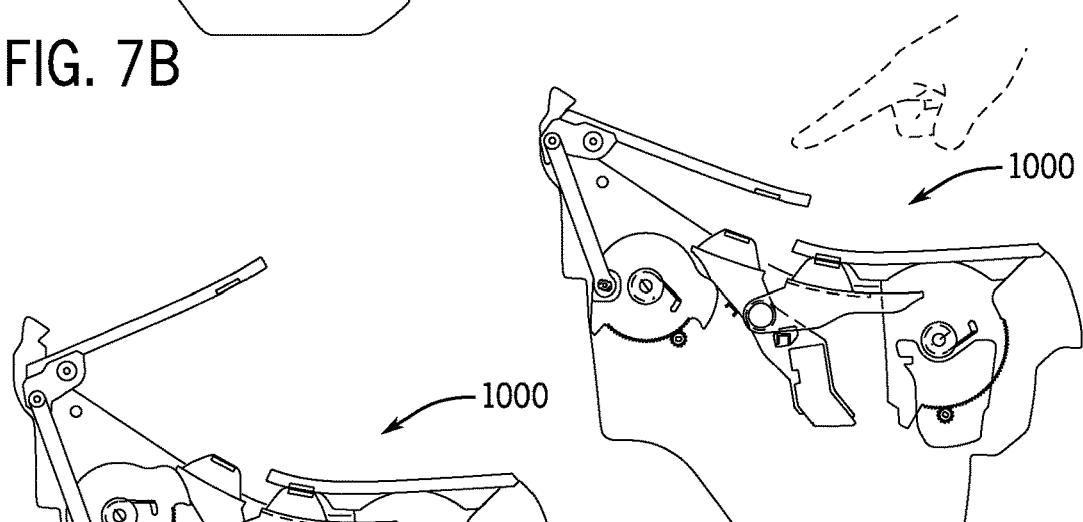
FIG. 7C
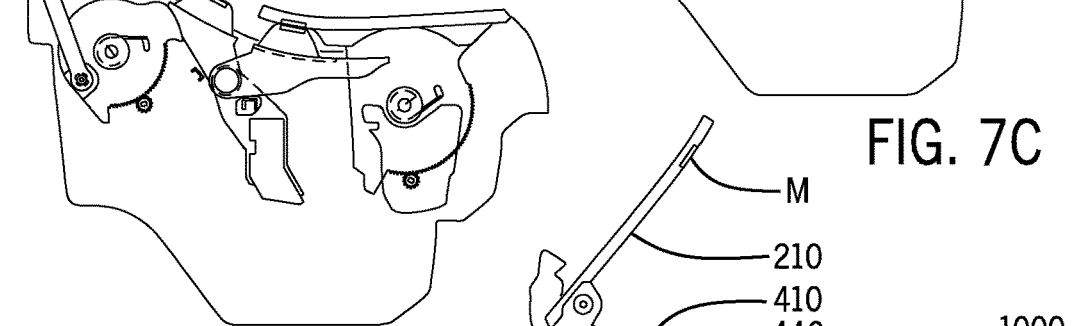
FIG. 7D
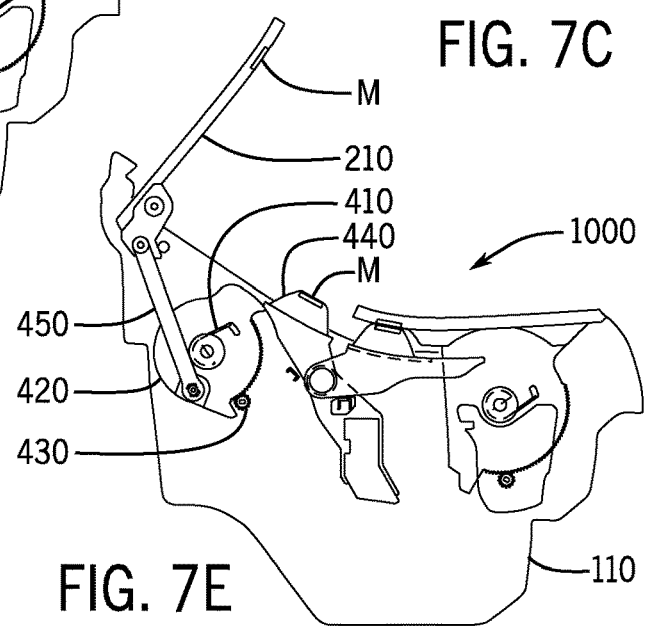
FIG. 7E

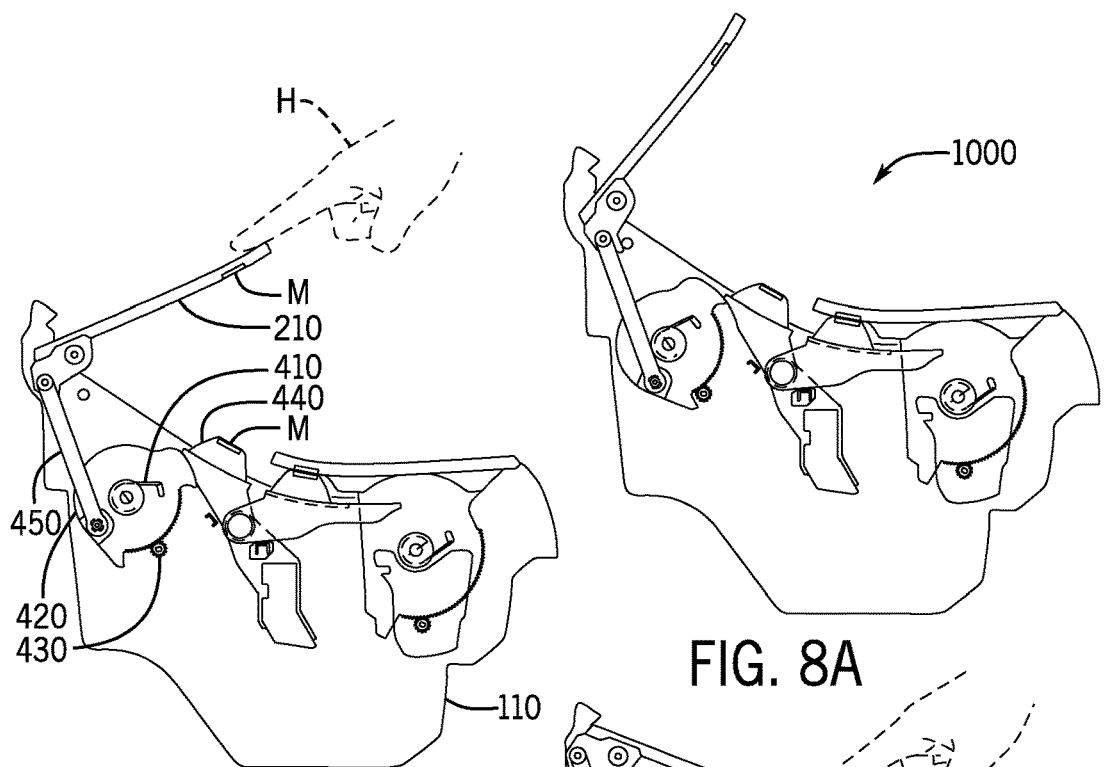
FIG. 8A
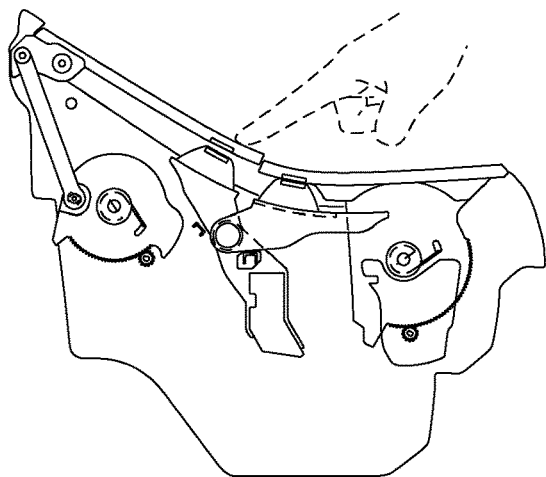
FIG. 8B
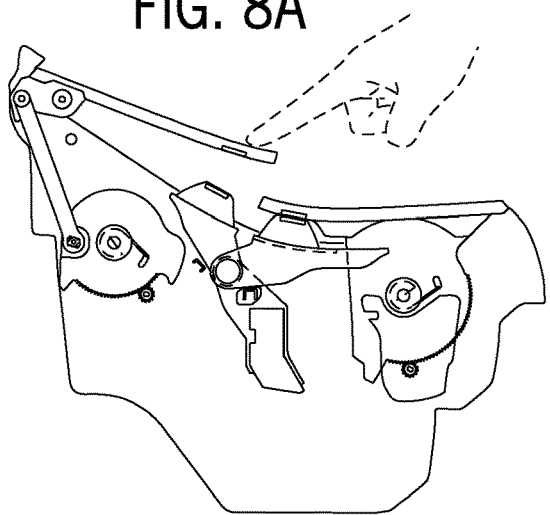
FIG. 8C
FIG. 8D
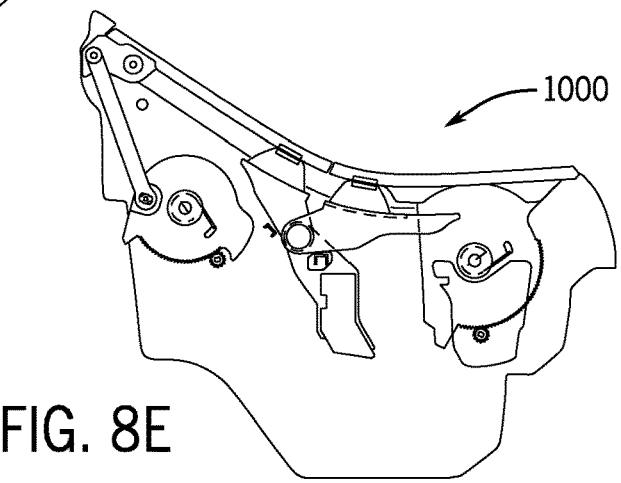
FIG. 8E

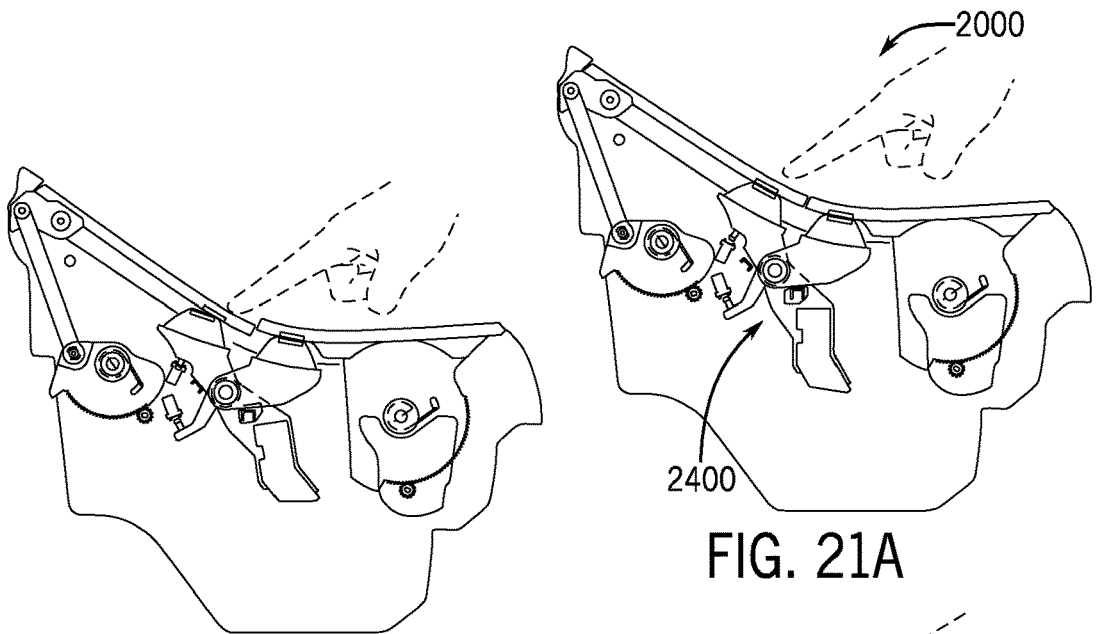
FIG. 21A
FIG. 21B
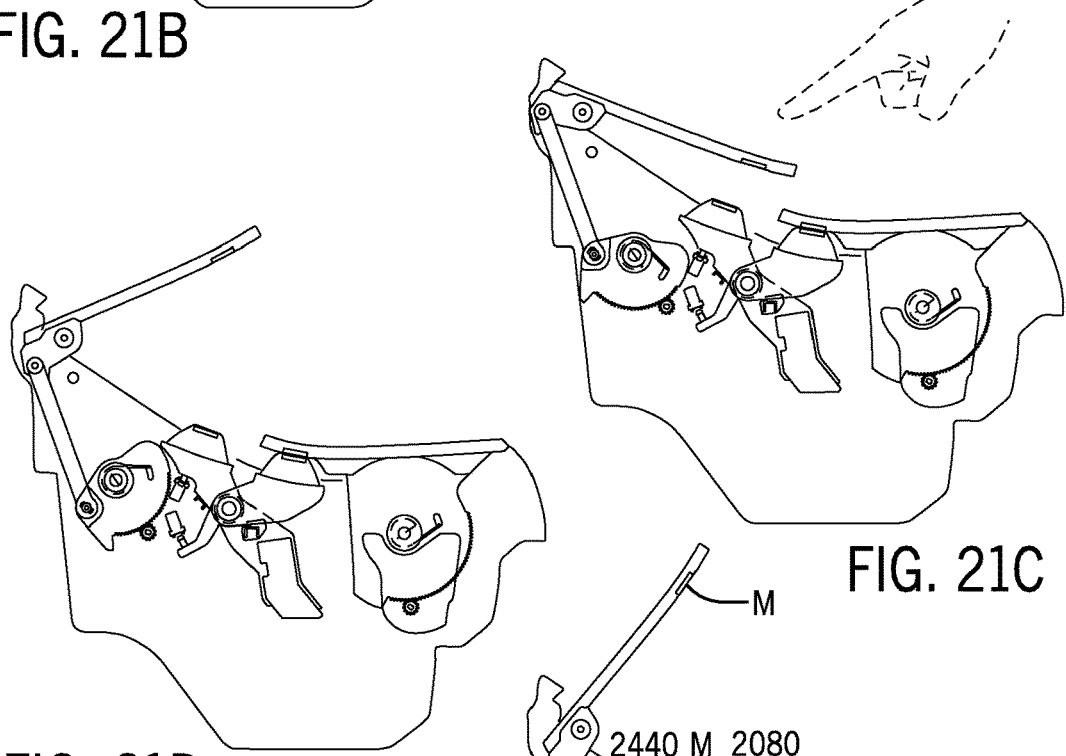
FIG. 21C
FIG. 21D
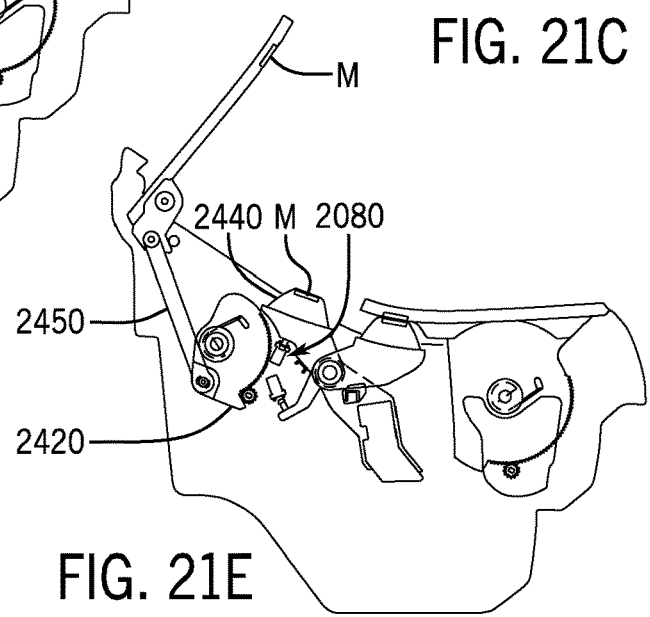
FIG. 21E

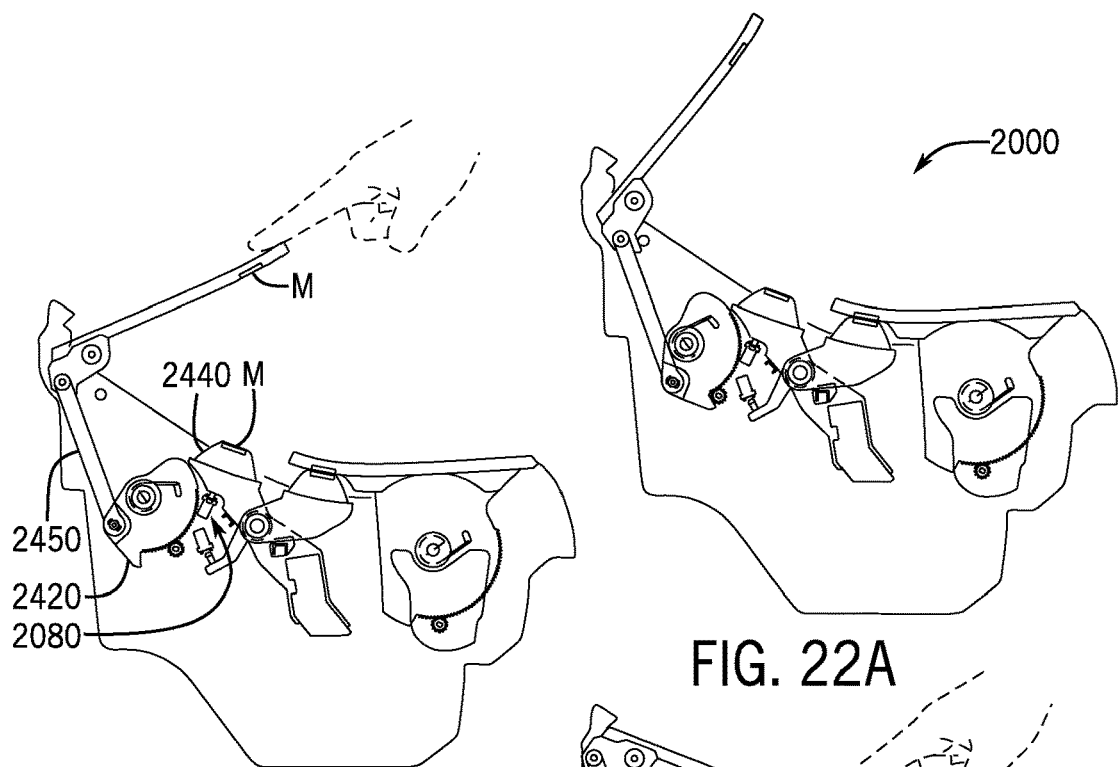
FIG. 22A
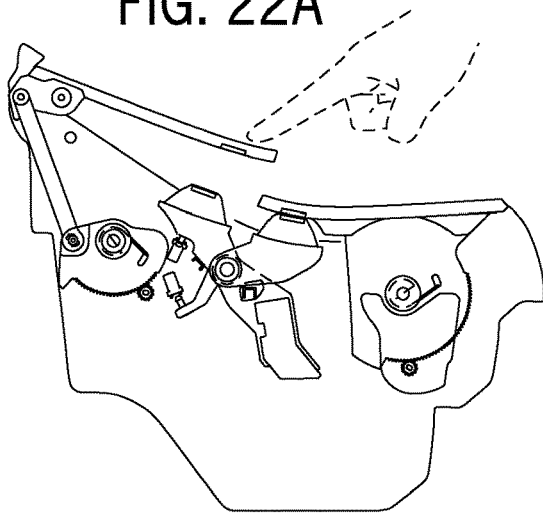
FIG. 22C
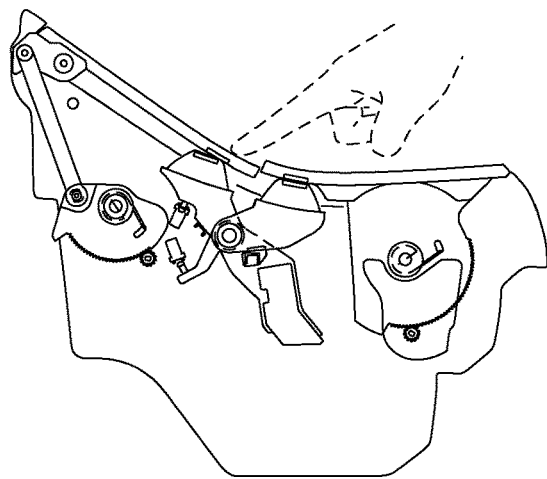
FIG. 22B
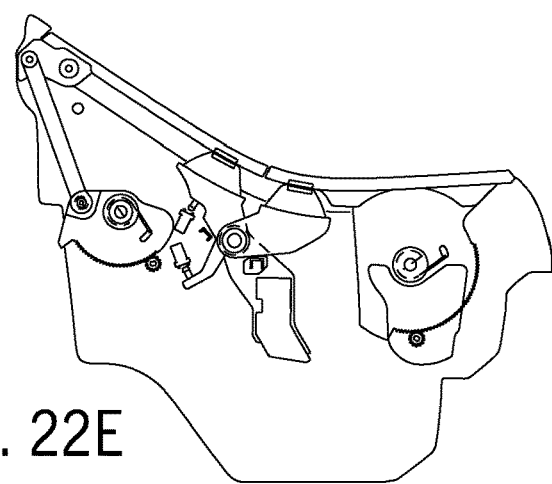
FIG. 22E
FIG. 22D

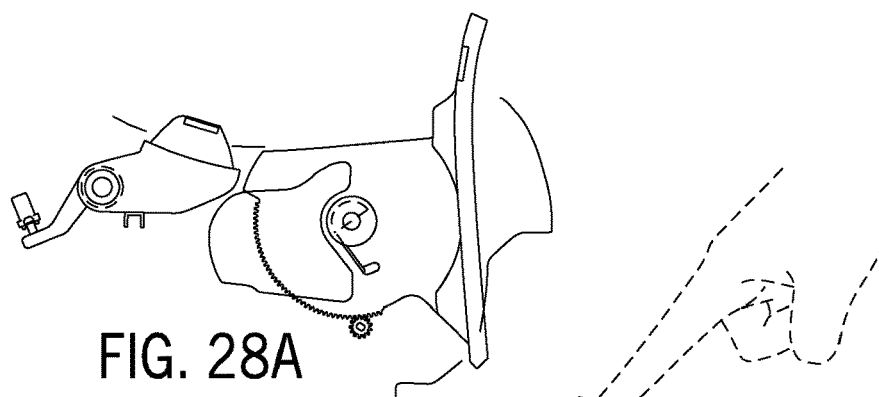
FIG. 28A
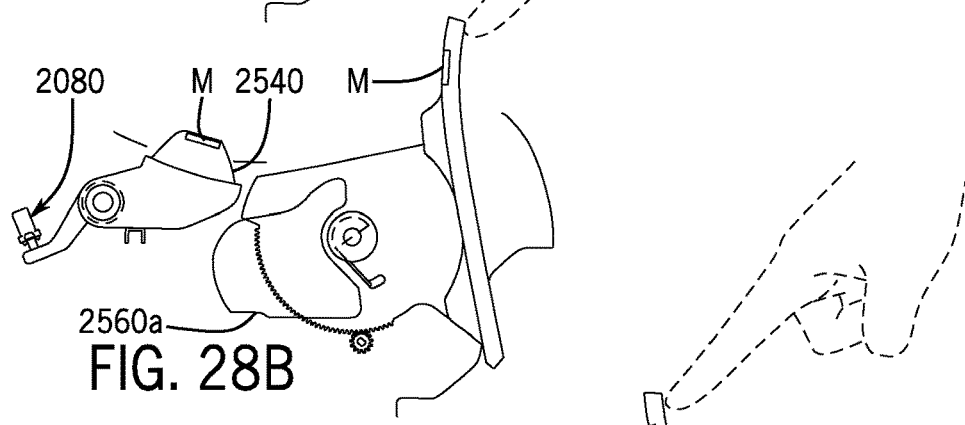
FIG. 28B
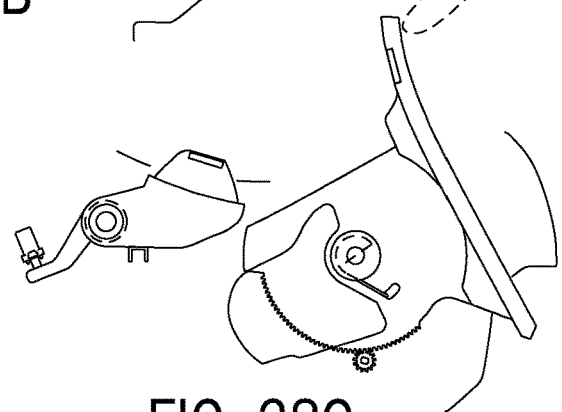
FIG. 28C
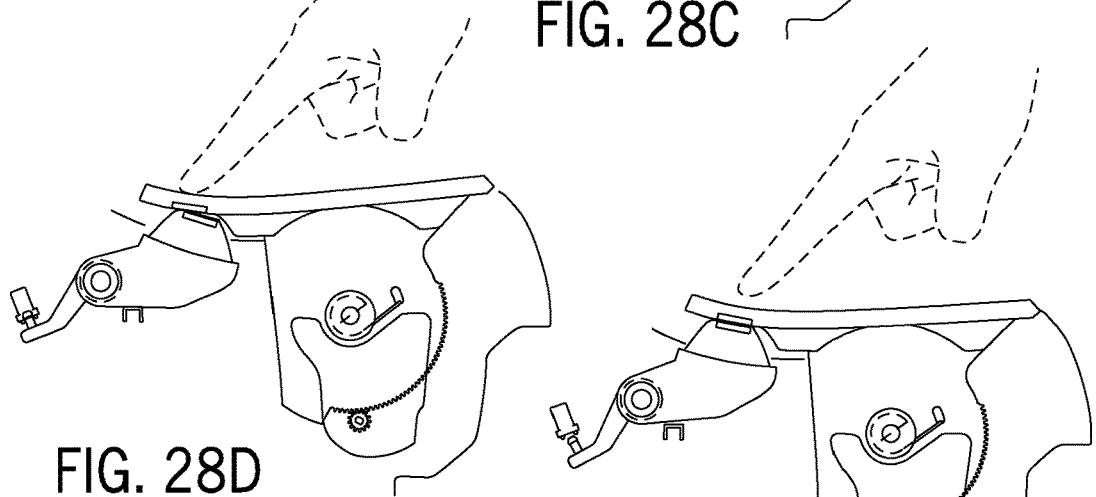
FIG. 28D
FIG. 28E

CONSOLE ASSEMBLY FOR VEHICLE INTERIOR

CROSS-REFERENCE TO RELATED APPLICATIONS

The present application is a continuation of U.S. patent application Ser. No. 15/890,953 titled "CONSOLE ASSEMBLY FOR VEHICLE INTERIOR" filed Feb. 7, 2018 (now U.S. Pat. No. 10,717,390), which is a continuation of International/PCT Patent Application No. PCT/US2017/033149 titled "CONSOLE ASSEMBLY FOR VEHICLE INTERIOR" filed May 17, 2017, which claims the benefit of U.S. Provisional Patent Application No. 62/338,413 titled "CONSOLE FOR VEHICLE INTERIOR" filed May 18, 2016.

The present application is related to and incorporates by reference in full the following applications: (a) U.S. Provisional Patent Application No. 62/338,413 titled "CONSOLE FOR VEHICLE INTERIOR" filed May 18, 2016; (b) International/PCT Patent Application No. PCT/US2017/033149 titled "CONSOLE ASSEMBLY FOR VEHICLE INTERIOR" filed May 17, 2017; (c) U.S. patent application Ser. No. 15/890,953 titled "CONSOLE ASSEMBLY FOR VEHICLE INTERIOR" filed Feb. 7, 2018 (now U.S. Pat. No. 10,717,390); (d) U.S. patent application Ser. No. 15/890,980 titled "CONSOLE ASSEMBLY FOR VEHICLE INTERIOR" filed Feb. 7, 2018 (now U.S. Pat. No. 10,737,628).

FIELD

The present invention relates to a console assembly for a vehicle interior.

BACKGROUND

It is well known to provide in a vehicle interior a console assembly comprising a base with a compartment and a cover movable relative to the base to facilitate access to the compartment.

It would be advantageous to provide an improved console assembly for a vehicle interior configured for improved functionality and operation comprising features (and combinations of features) as shown and described in the present application including features relating to a cover arrangement, a latch mechanism for the cover and a mechanism to actuate the cover.

SUMMARY

The present invention relates to a vehicle interior component comprising a base; a cover movable relative to the base from a closed position to an open position; and a latch mechanism. The latch mechanism may comprise a magnet configured for movement within the base for an engaged state and a disengaged state to release the cover from the closed position. The latch mechanism may be configured to maintain the disengaged state after the cover has been released from the base. The latch mechanism may comprise a magnet fixed to the cover. The magnet fixed to the cover may be configured to be concealed within the cover; the magnet of the base may be configured to be concealed within the base. The component may comprise an opening mechanism configured to actuate movement of the cover from the closed position to the open position upon release of an external force from the cover. The opening mechanism may be configured to move the latch mechanism within the base as the cover moves toward the open position. The base may comprise an opening provided in a sidewall of the base; the latch mechanism may be configured to extend through the opening to engage the cover to secure the cover to the base. The magnet may comprise at least one of (a) a magnet element; (b) a ferro-magnetic element; (c) an element of a magnet arrangement; (d) an element of a magnetic latch arrangement; (e) an element of a magnetic latch mechanism; (f) a magnetic material element; (g) a magnetic component; (h) a magnet configured to engage a magnet in the cover; (i) a multi-pole magnet; (j) a multi-pole magnet configured to engage a magnet in the cover; (k) a magnet configured to establish magnetic attraction when aligned according to complementary magnetic polarity; (l) a multi-pole magnet configured to establish magnetic attraction when aligned according to a multi-pole complementary south-north magnetic polarity; (m) a magnet configured to establish magnetic attraction with a metallic component.

The present invention relates to a vehicle interior component comprising a base; a cover movable relative to the base from a closed position to an open position; and a latch mechanism. The latch mechanism may comprise a magnet configured for movement within the base for an engaged state and a disengaged state to release the cover from the closed position. The cover may comprise a magnet. The cover may be configured to move the magnet of the base from an elevated position for the magnet of the base to engage the magnet of the cover to secure the cover to the base to a retracted position for the magnet of the base to disengage the magnet of the cover to release the cover from the base. The cover may be configured to move the magnet of the base from the elevated position to the retracted position in response to application of external force on the cover. The magnet of the cover may be configured to slide relative to the magnet of the base to release the cover from the base. The latch mechanism may be configured to maintain the magnet of the base in the retracted position after the cover has been released from the base. The magnet of the base may be configured to extend beyond an opening in the base in the elevated position. The cover may be configured to move the magnet of the base from the retracted position toward the elevated position as the cover moves toward the open position. The cover may comprise a user interface configured to release the cover from the base; actuation of the user interface may be configured to move the magnet of the cover and the magnet of the base.

The present invention relates to a vehicle interior component comprising: a base; a cover movable relative to the base from a closed position to an open position; and a latch mechanism. The latch mechanism may comprise a magnet configured for movement within the base for an engaged state and a disengaged state to release the cover from the closed position. The cover may comprise a magnet. The magnet of the cover may be configured to move relative to the base to move the magnet of the base from the engaged state to the disengaged state. The magnet of the cover may be fixed to the cover. The cover may be configured to rotate relative to the base between the open position and the closed position about a pivot; the magnet of the cover may be configured to rotate relative to the base about the pivot to rotate the magnet of the base to the disengaged state. The component may comprise a counterweight configured for at least one of: (a) to facilitate movement of the cover to the open position; (b) to maintain the cover in the closed position. The magnet of the base may be configured to retract at least partially into a sidewall of the base when the magnet of the base moves toward the disengaged state.

The component may comprise at least one of (a) a vehicle trim component, (b) a console, (c) a floor console, (d) a center console, (e) a storage compartment; (f) a console assembly The present invention relates to a vehicle interior component configured to be operated by application of an external force from an occupant comprising: (a) a base providing a compartment; (b) a cover movable relative to the base from a closed position to an open position; and (c) a latch mechanism comprising an arm providing a latch feature configured to secure the cover to the base. The cover may comprise a latch feature; the arm may be configured for movement relative to the base between (1) an elevated position for the latch feature of the arm to engage the latch feature of the cover to secure the cover to the base and (2) a retracted position for the latch feature of the arm to disengage the latch feature of the cover to release the cover from the base. The arm may be pivotally coupled to the base. The latch feature of the arm may comprise at least one magnet. The latch feature of the arm may comprise an element of a material configured to be retained by at least one magnet; and the latch feature of the cover may comprise at least one magnet. A magnet of the arm may be installed in the arm and a magnet of the cover may be installed in the cover so that the magnet of the arm engages the magnet of the cover when the cover is in the closed position. The arm may be configured to rotate relative to the base between a stop at the retracted position and a stop at the elevated position. The latch mechanism may comprise a spring configured to retain the arm in the elevated position. The latch mechanism may comprise a push-push latch to retain the arm in the retracted position. The base may comprise an opening; the arm may be configured to extend through the opening of the base to engage the cover to secure the cover to the base. The opening may comprise a slot; the slot may be provided in a sidewall of the base. The arm may project at least partially through the slot when in the elevated position to present the latch feature of the arm to engage the latch feature of the cover; the arm may retract at least partially into the slot when in the retracted position. The component may comprise a mechanism configured to actuate movement of the cover from the closed position to the open position; the mechanism to actuate movement of the cover may comprise a spring; the mechanism to actuate movement of the cover may be configured to engage the latch mechanism to move the arm from the retracted position as the cover is moved to the open position; the mechanism to actuate movement of the cover may comprise a cam surface configured to engage the arm of the latch mechanism; the mechanism to actuate movement of the cover may comprise a counterweight. The mechanism to actuate movement of the cover may be configured so that when the cover is moved from the closed position by application of the external force the arm of the latch mechanism is moved from the elevated position to the retracted position. The mechanism to actuate movement of the cover may be configured to move the cover to the open position upon release of the external force from the cover. The cover may comprise a door on a hinge. The mechanism to actuate movement of the cover may comprise a cam; the cam may be configured to engage the arm of the latch mechanism to move the arm to the elevated position during movement of the cover to the open position. The mechanism to actuate movement of the cover may comprise a link arm coupled to a disk providing a cam and a spring coupled to the disk; the link arm may be coupled to the cover to move the cover to the open position. A tray may be configured to fit in the compartment; the tray may be installed within the base under the cover; the tray may be configured for movement relative to the base. The base may comprise a structure comprising a first sidewall and a second sidewall to define the compartment and the latch mechanism is installed at the first sidewall. The mechanism to actuate movement of the cover may comprise a damper mechanism. The latch feature of the arm may comprise a magnet and the latch feature of the cover may comprise a magnet; and (1) the magnet of the arm engages by magnetic attraction the magnet of the cover when the arm is in the elevated position and the cover is in the closed position and (2) the magnet of the arm is disengaged from magnetic attraction the magnet of the cover as the arm is moved to the retracted position. The cover may comprise a set of opposing doors; the set of opposing doors may comprise a front door and a rear door; the latch mechanism may comprise a latch mechanism for the front door and a latch mechanism for the rear door. The cover may comprise a first door and a second door; the latch mechanism may comprise a latch mechanism for the first door comprising an arm and a latch mechanism for the second door comprising an arm; the mechanism to actuate movement the cover may comprise a mechanism to actuate movement of the first door relative to the base and a mechanism to actuate movement of the second door relative to the base. The mechanism to actuate movement of the first door may comprise a spring and a link arm; the spring of the mechanism to actuate movement of the first door may be configured to move the door toward the open position. The arm of the latch mechanism for the first door may be pivotally coupled to the base; the arm of the latch mechanism for the second door may be pivotally coupled to the base. The arm of the latch mechanism for the first door and the arm of the latch mechanism for the second door may be pivotally coupled to the base at a pivot. The arm of the latch mechanism for the first door may comprise a counterweight. The latch mechanism for the first door may comprise a spring to retain the arm in the elevated position. The latch mechanism for the first door may comprise a push-push latch to retain the arm in the retracted position; the latch mechanism for the second door may comprise a push-push latch to retain the arm in the retracted position; the arm of the latch mechanism for the first door may be moved to the elevated position as the first door is moved toward the open position. The base and cover may comprise at least one of (a) a vehicle trim component, (b) a console, (c) a floor console, (d) a center console, (e) a storage compartment.

The present invention also relates to a vehicle interior component configured to be operated by application of an external force from an occupant comprising: (a) a base providing a compartment; (b) a cover movable relative to the base from a closed position to an open position; (c) a mechanism to actuate movement of the cover to the open position; and (d) a latch configured to secure the cover to the base. The latch may comprise a projection configured to retract into a slot in a sidewall of the base when the cover is moved to the open position. The latch may comprise a concealed magnetic latch. The mechanism may comprise a linkage; the linkage may comprise a link arm coupled to the cover.

The present invention further relates to a vehicle interior component configured to be operated by application of an external force from an occupant comprising: (a) a base providing a compartment; (b) a cover movable relative to the base from a closed position to an open position; (c) a mechanism to actuate movement of the cover to the open position; and (d) a latch mechanism comprising a latch configured to secure the cover to the base. The mechanism to actuate movement of the cover may be configured to engage the latch mechanism when the cover is moved to the open position so that the latch can engage the cover when the cover is moved to the closed position. The mechanism to actuate movement of the cover may comprise at least one of (a) a disk on a flange of the cover; (b) a linkage with a disk and a link arm; (c) a disk with a link arm configured to nest with the disk when the cover is moved to the open position; (d) a disk and a link arm in planar alignment; (e) a link arm comprising a curved section; (f) a disk providing a cam surface; (g) a spring; (h) a torsion spring; (i) a coil spring. The latch mechanism may comprise an arm providing a latch feature configured to engage a latch feature of the cover; and the mechanism to actuate movement of the cover may engage the arm of the latch mechanism to move the arm of the latch mechanism for engagement with the latch feature of the cover. The mechanism to actuate movement of the cover may comprise a counterweight configured to at least one of: (a) facilitate movement of the cover to the open position; (b) provide mass intended to maintain the cover in the closed position; (c) provide a cam surface to engage the latch mechanism comprising the latch. The latch may comprise a magnetic latch. The mechanism to actuate movement of the cover may be configured to engage the latch mechanism to move an arm of the latch mechanism from a retracted position as the cover is moved to the open position.

The present invention further relates to a vehicle interior component configured to be operated by application of an external force from an occupant comprising: (a) a base providing a compartment; (b) a first door movable relative to the base from a closed position to an open position; (c) a second door moveable from a closed position to an open position relative to the base; (d) a first mechanism configured to actuate the first door for movement to the open position of the first door; (e) a second mechanism configured to actuate the second door for movement to the open position of the second door; (f) a first latch configured to secure the first door to the base; (g) a second latch configured to secure the second door the base. The first latch may comprise a first latch mechanism comprising an arm and a latch feature. The second latch may comprise a second latch mechanism comprising a projection providing a housing with a latch feature. The arm of the first latch mechanism may be configured for movement relative to the base between (1) an elevated position for the latch feature of the arm to engage a latch feature of the first door to secure the first door to the base and (2) a retracted position for the latch feature of the arm to disengage the latch feature of the first door to release the first door from the base. The arm of the second latch mechanism may be configured for movement relative to the base between (1) an elevated position for the latch feature of the arm to engage a latch feature of the second door to secure the second door to the base and (2) a retracted position for the latch feature of the arm to disengage the latch feature of the second door to release the second door from the base. The first latch may comprise a magnetic latch. The second mechanism to actuate movement of the second door may be configured to engage the second latch mechanism to move the projection from the retracted position as the second door is moved to the open position.

The present invention further relates to a vehicle interior component configured to be operated by application of an external force from an occupant comprising: (a) a base providing a compartment; (b) a cover movable relative to the base from a closed position to an open position; and (c) a latch configured to secure the cover to the base. The latch may comprise a magnetic latch feature for the cover and a magnetic latch feature for the base; the magnetic latch feature for the cover may comprise at least one magnet installed in the cover; the magnetic latch feature for the base may comprise at least one magnet; and the cover may be secured to the base by magnetic engagement of the magnetic latch feature for the cover with the magnetic latch feature for the base. The latch may comprise a magnetic latch mechanism with a projection providing the magnetic latch feature for the base configured to secure the cover to the base; the magnetic latch mechanism may comprise an arm with the magnetic latch feature for the base that is configured for an elevated position when the cover is retained to the base and for a retracted position when the cover is moved toward the open position. The arm may be configured to be retracted into a slot in a sidewall of the base when the arm is in the retracted position. At least one magnet of the magnetic latch feature for base may be installed in a housing and configured so that the at least one magnet for the magnetic latch feature for the base is not in direct contact with the at least one magnet of the magnetic latch feature for the cover when the cover is secured to the base by the latch.

The present invention further relates to a vehicle interior component configured to be operated by application of an external force from an occupant comprising: (a) a base providing a compartment; (b) a cover comprising a first door moveable relative to the base from a closed position to an open position and a second door moveable relative to the base from a closed position to an open position; and (c) a first latch mechanism for the first door configured to secure the first door to the base and a second latch mechanism for the second door configured to secure the second door to the base. The first door may comprise a latch feature, the second door may comprise a latch feature, the first latch mechanism may comprise a latch feature with the base and the second latch mechanism may comprise a latch feature with the base. Each latch feature may be substantially identical. The latch feature of the first latch mechanism with the base may comprise a magnet provided in a housing; the latch feature of the second latch mechanism with the base may comprise a magnet provided in a housing; the latch feature of the first door may comprise a magnet provided in a housing; the latch feature of the second door may comprise a magnet provided in a housing; the magnet of the first latch mechanism with base in the housing may be configured to provide for magnetic attraction without direct contact to the magnet of the first door in the housing; the magnet of the second latch mechanism with base in the housing may be configured to provide for magnetic attraction without direct contact to the magnet of the second door in the housing.

The present invention further relates to a vehicle interior component configured to be operated by application of an external force from an occupant comprising: (a) a base providing a compartment; (b) a cover comprising a first door movable relative to the base from a closed position to an open position and a second door relative to the base moveable from a closed position to an open position; and (c) a first latch mechanism for the first door configured to secure the first door to the base and a second latch mechanism for the second door configured to secure the second door to the base. The first latch mechanism and the second latch mechanism may be coupled to the base at a shared pivot. The first latch mechanism may comprise a spring at the pivot configured to compress as a projection of the first latch mechanism moves from an elevated position to engage the first door to a retracted position to disengage the first door. The first latch mechanism may comprise at least one magnet. The first door may be configured to move to the open position by rotation in a first direction when the first latch mechanism is unlatched; the first latch mechanism may be configured to unlatch the first door from the base by rotation is a second direction to the retracted position; the first direction may be opposite to the second direction. The first door may be opposed to the second door; the first door when in the open position may be configured to facilitate access to the compartment; and the second door when in the open position is configured to facilitate access to the compartment.

The present invention further relates to a vehicle interior component configured to be operated by application of an external force from an occupant comprising: (a) a base providing a compartment; (b) a cover comprising a first door movable relative to the base from a closed position to an open position and a second door moveable from a closed position to an open position relative to the base; and (c) a first latch mechanism for the first door configured to secure the first door to the base and a second latch mechanism for the second door configured to secure the second door to the base. The base may comprise a set of sidewalls comprising at least one sidewall providing a mechanism for actuating the first door. The first latch mechanism may be associated on the sidewall; the first latch mechanism may be configured to move between an elevated position relative to the sidewall to secure the first door in the closed position and a retracted position within a slot in the sidewall to disengage from the first door as the first door moves toward the open position. The first latch mechanism may be at least partially concealed in the sidewall when in the retracted position within the slot.

The present invention further relates to a vehicle interior component configured to be operated by application of an external force from an occupant comprising: (a) a base providing a compartment; (b) a door movable relative to the base from a closed position to an open position; and (c) a latch mechanism configured to secure the door to the base. The base may comprise a set of sidewalls comprising a sidewall providing an aperture; a projection of the latch mechanism may be configured to extend through the aperture in the sidewall to engage the cover to secure the cover to the base. The aperture may comprise a slot and the latch mechanism may comprise an arm with the projection movable between an elevated position and a retracted position and the projection of the arm may elevate (e.g. extend at least partially) through the slot when the arm is in the elevated position. The latch mechanism may be a magnetic latch mechanism; the projection may comprise a housing for at least one magnet.

The present invention further relates to a vehicle interior component configured to be operated by application of an external force from an occupant comprising: (a) a base providing an opening for a compartment; (b) a cover movable relative to the base from a closed position to an open position; and (c) a magnetic latch mechanism comprising an arm providing a magnetic latch feature configured to secure the cover to the base. The cover may comprise a magnetic latch feature configured to engage the magnetic latch feature of the arm. The arm may be configured for movement relative to the base between (1) an elevated position for the magnetic latch feature of the arm to engage the magnetic latch feature of the cover to secure the cover to the base and (2) a retracted position for the magnetic latch feature of the arm to disengage the magnetic latch feature of the cover to release the cover from the base. The magnetic latch feature may comprise at least one magnet installed in the cover; the magnetic latch feature may comprise at least one magnet installed in the arm. The magnetic latch may comprise a latch mechanism. The magnetic latch feature of the cover may translate relative to the magnetic latch feature of the arm as the arm moves to the retracted position. Magnetic attraction between the cover an arm may be across an interface. The magnetic latch feature of the cover may engage the magnetic latch feature of the arm at an interface; the interface may comprise a housing for the at least one magnet of the cover and a housing for the at least one magnet of the arm; and the latch may be secured at the interface by contact of the housing for the at least one magnet of the cover and the housing for the at least one magnet of the arm. The magnetic latch feature of the arm may engage by magnetic attraction the magnetic latch feature of the cover when the arm is elevated and the cover is in the closed position; the magnetic latch feature of the arm may disengage from magnetic attraction with the magnetic latch feature of the cover when the arm is in the retracted position. The magnetic latch feature of the arm and the magnetic latch feature of the cover may comprise a complementary configuration to establish magnetic attraction to close the cover to the base; the complementary configuration may comprise a first magnetic element from the magnetic latch feature of the arm providing a first magnetic field configured to engage a second magnetic element from the magnetic latch feature of the cover providing a second magnetic field. The first magnetic field may be aligned with the second magnetic field to engage and secure the cover to the base by magnetic attraction. The magnetic latch feature of the arm may be disengaged from the magnetic latch feature of the cover by external force to facilitate separation of the cover from the base for the cover to move to the open position.

The present application relates to a vehicle interior component configured to be operated by application of an external force from an occupant. The vehicle interior component may comprise a base providing a compartment, a cover movable relative to the base from a closed position to an open position and a latch mechanism configured to secure the cover to the base. The cover may comprise a latch feature. The latch mechanism may comprise an arm providing a latch feature. The arm may be configured for movement relative to the base between an elevated position for the latch feature of the arm to engage the latch feature of the cover to secure the cover to the base and a retracted position for the latch feature of the arm to disengage the latch feature of the cover to release the cover from the base. The base may comprise a structure comprising a first sidewall and a second sidewall to define the compartment. The latch mechanism may be installed at the first sidewall.

The present application relates to a vehicle interior component configured to be operated by application of an external force from an occupant. The vehicle interior component may comprise a base providing a compartment, a cover movable relative to the base from a closed position to an open position and a latch mechanism configured to secure the cover to the base. The cover may comprise a latch feature. The latch mechanism may comprise an arm providing a latch feature. The arm may be configured for movement relative to the base between an elevated position for the latch feature of the arm to engage the latch feature of the cover to secure the cover to the base and a retracted position for the latch feature of the arm to disengage the latch feature of the cover to release the cover from the base. The latch mechanism may be configured to retain the arm in the retracted position.

The present application relates to a vehicle interior component configured to be operated by application of an external force from an occupant. The vehicle interior component may comprise a base providing a compartment, a cover movable relative to the base from a closed position to an open position and a latch mechanism configured to secure the cover to the base. The cover may comprise a latch feature. The latch mechanism may comprise an arm providing a latch feature. The arm may be configured for movement relative to the base between an elevated position for the latch feature of the arm to engage the latch feature of the cover to secure the cover to the base and a retracted position for the latch feature of the arm to disengage the latch feature of the cover to release the cover from the base. The latch feature of the cover may comprise at least one magnet. The latch feature of the arm may comprise at least one magnet. The latch feature of the cover may engage the latch feature of the arm at an interface. The interface may comprise a housing for a magnet of the latch feature of the cover and a housing for a magnet of the latch feature of the arm.

FIGURES

FIGS. 7A through 7E are schematic side views of the operation of a vehicle interior component shown as a console assembly according to an exemplary embodiment.

FIGS. 8A through 8E are schematic side views of the operation of a vehicle interior component shown as a console assembly according to an exemplary embodiment.

FIGS. 21A through 21E are schematic side views of the operation of a vehicle interior component shown as a console assembly according to an exemplary embodiment.

FIGS. 22A through 22E are schematic side views of the operation of a vehicle interior component shown as a console assembly according to an exemplary embodiment.

FIGS. 28A through 28E are schematic side views of the operation of a vehicle interior component shown as a console assembly according to an exemplary embodiment.

DESCRIPTION

Figure 1A:
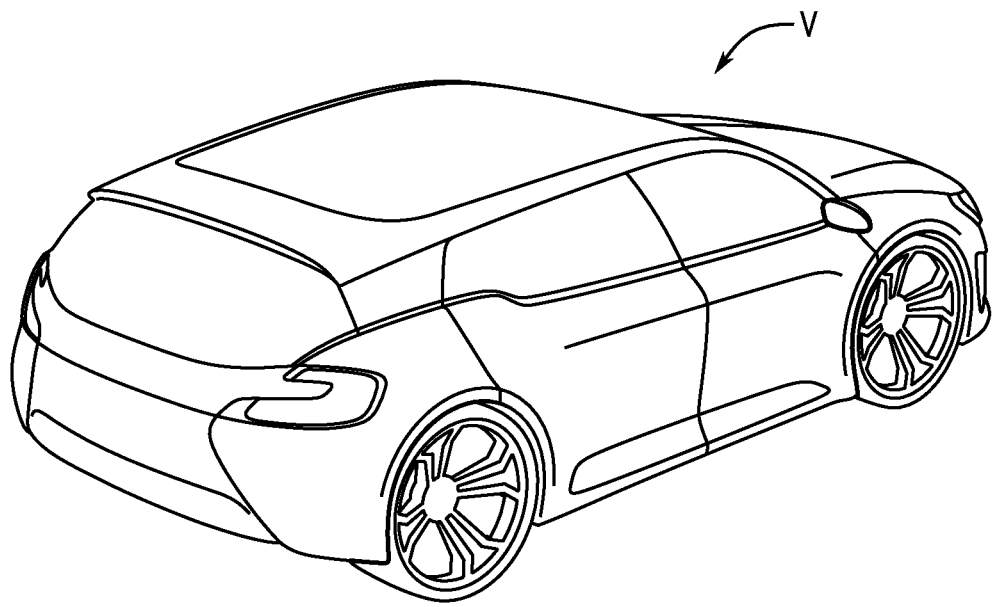
FIG. 1A is a schematic perspective view of a vehicle according to an exemplary embodiment.
Figure 1B:
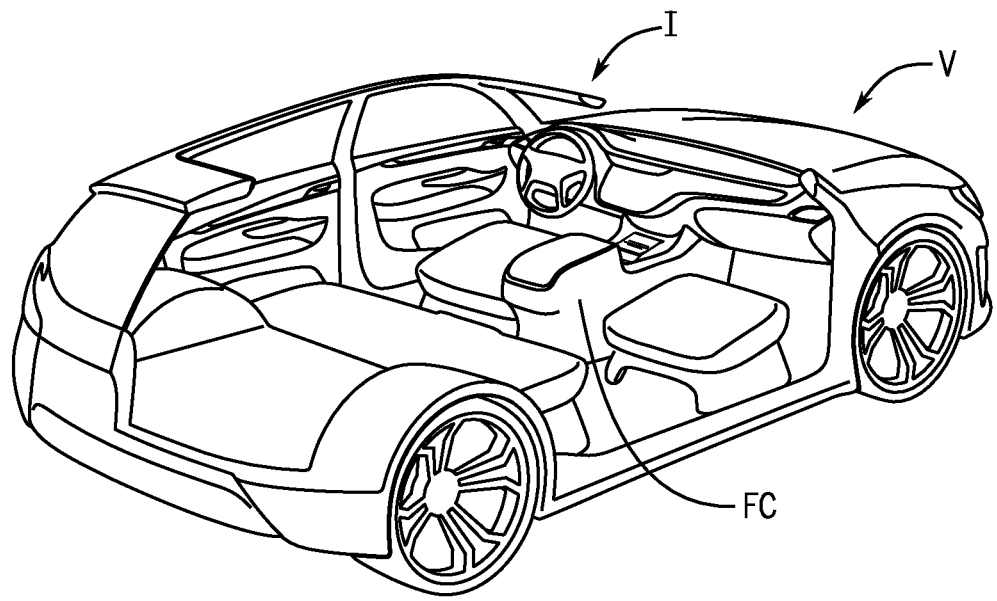
FIG. 1B is a schematic perspective view of a vehicle showing a vehicle interior according to an exemplary embodiment.

Referring to FIGS. 1A and 1B, a vehicle V is shown schematically including an interior I with a floor console FC. According to an exemplary embodiment, a console shown as floor console FC may comprise a door configured to move between a closed position and an open position; floor console FC may provide a storage compartment within floor console FC; the door may facilitate access of the storage compartment.

Referring to FIGS. 2A through 2D, a console/assembly shown as floor console/assembly FC is shown schematically in a vehicle interior according to an exemplary embodiment; as indicated, the floor console assembly FC provides a set of opposing doors shown as front door FD and rear door RD which may be opened and closed (e.g. to provide and/or restrict access to a storage compartment/volume within the base of the floor console).

Figure 3:
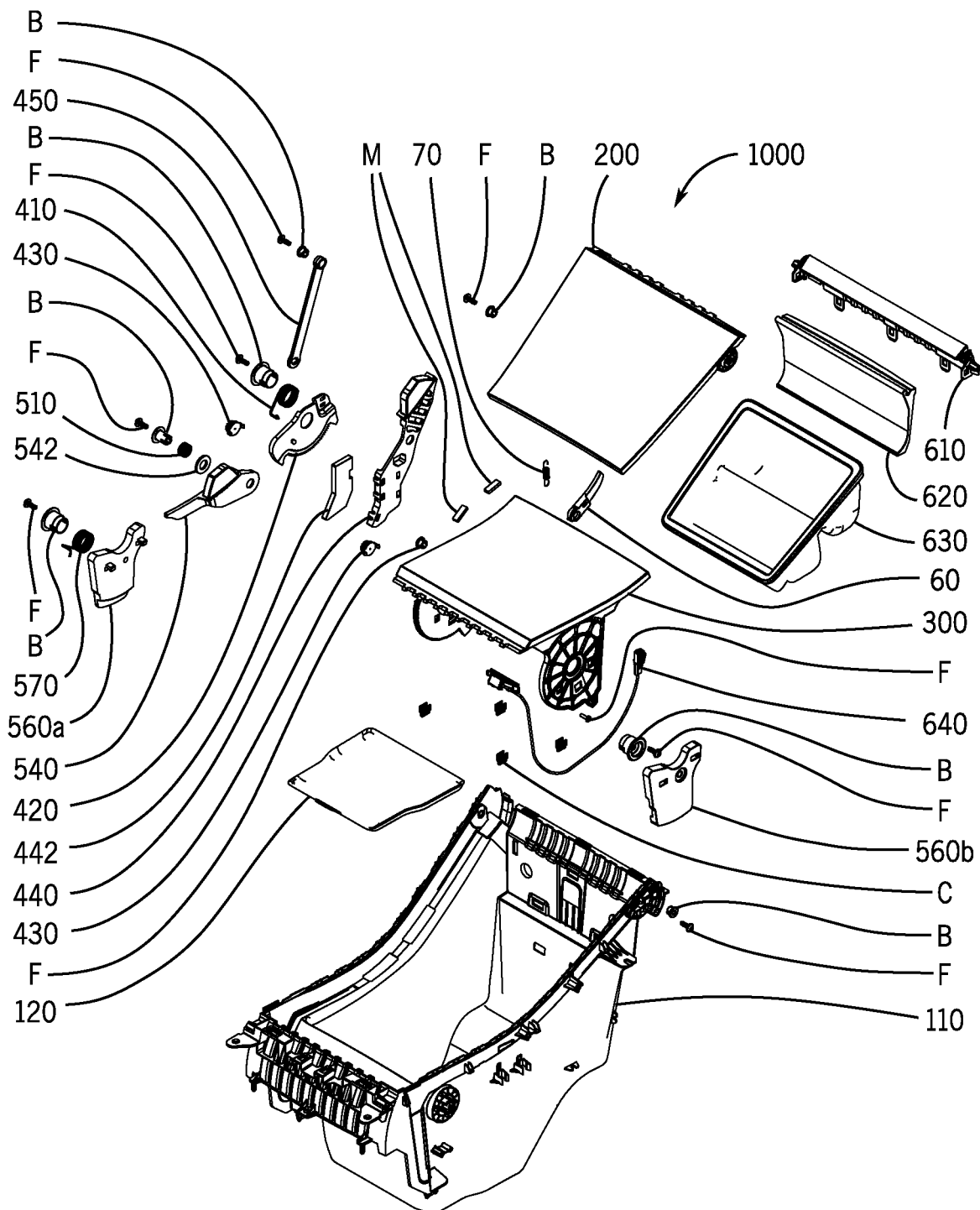
FIG. 3 is a schematic exploded perspective view of a vehicle interior component shown as a console assembly according to an exemplary embodiment.
Figure 4:
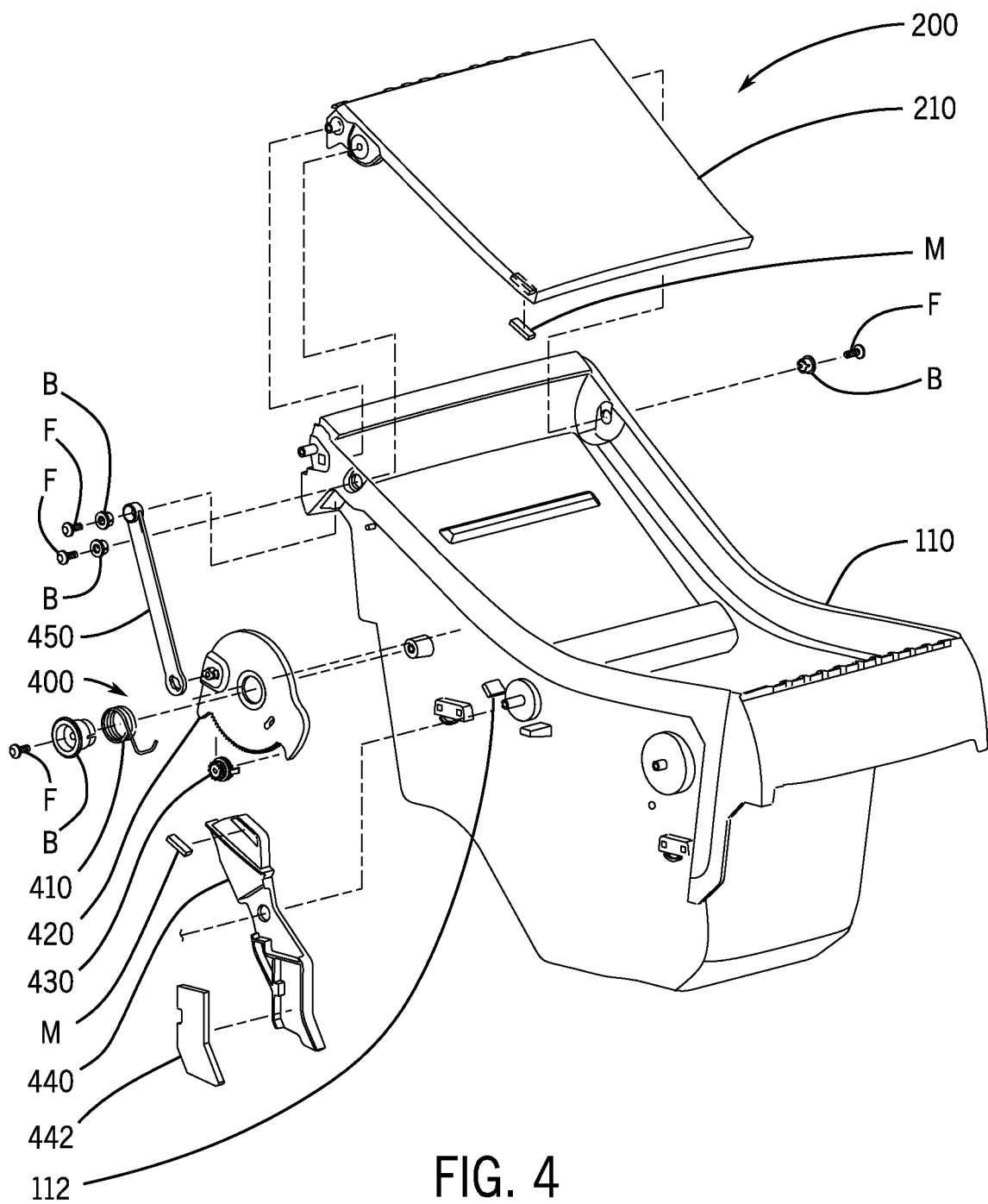
FIG. 4 is a schematic exploded perspective view of a vehicle interior component shown as a console assembly according to an exemplary embodiment.
Figure 5:
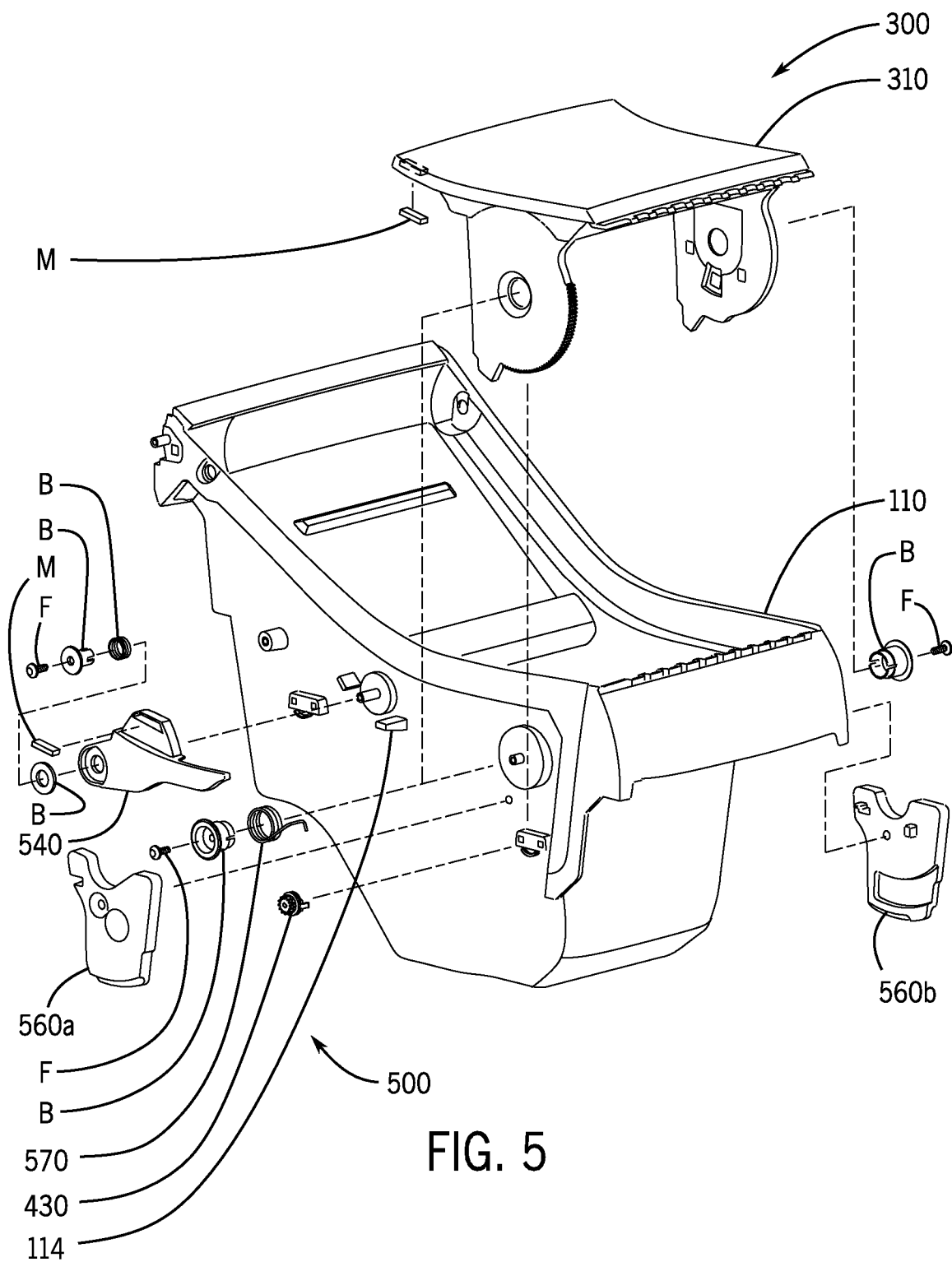
FIG. 5 is a schematic exploded perspective view of a vehicle interior component shown as a console assembly according to an exemplary embodiment.
Figure 6A:
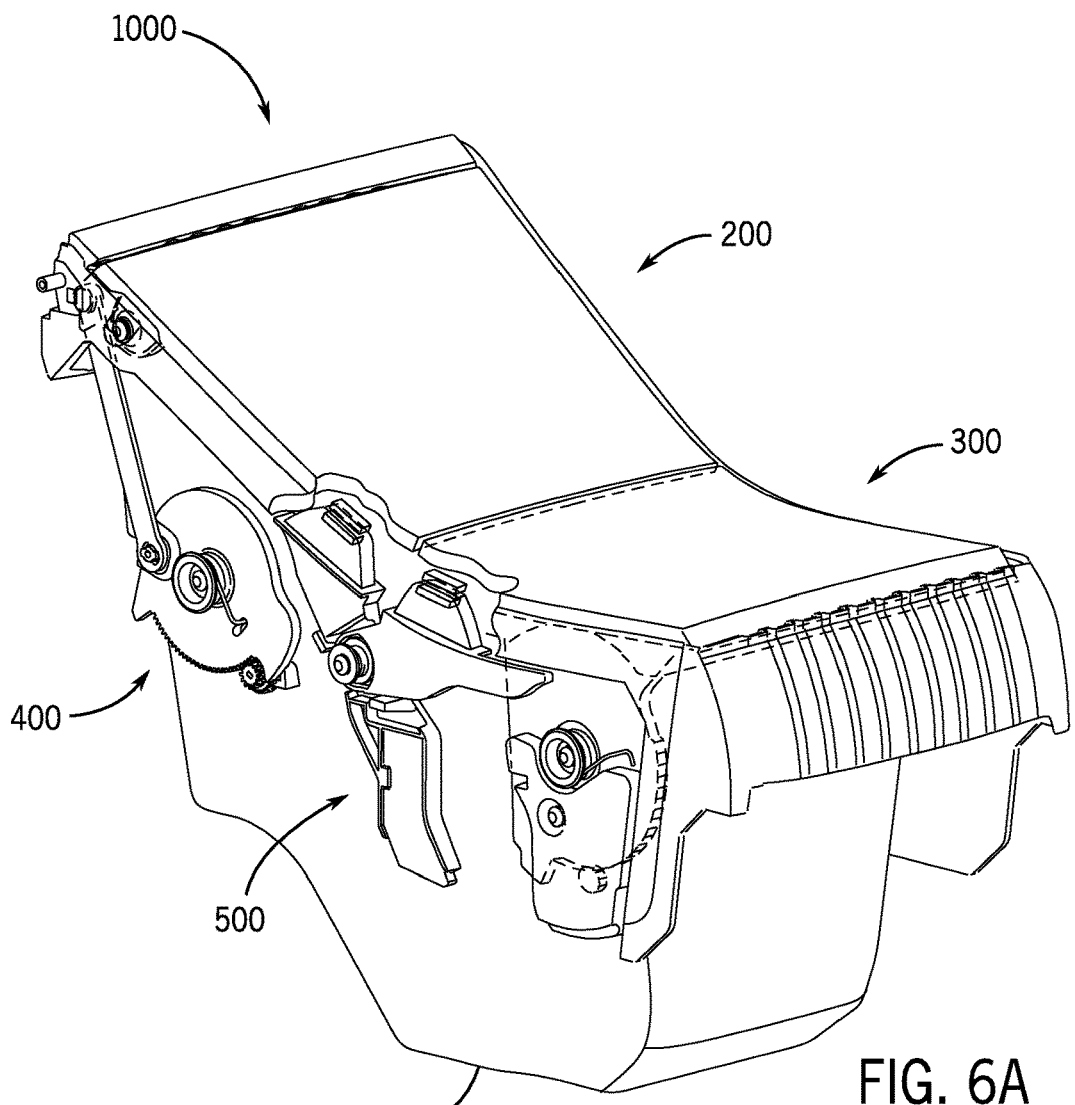
FIG. 6A is a schematic perspective view of a vehicle interior component shown as a console assembly according to an exemplary embodiment.
Figure 6B:
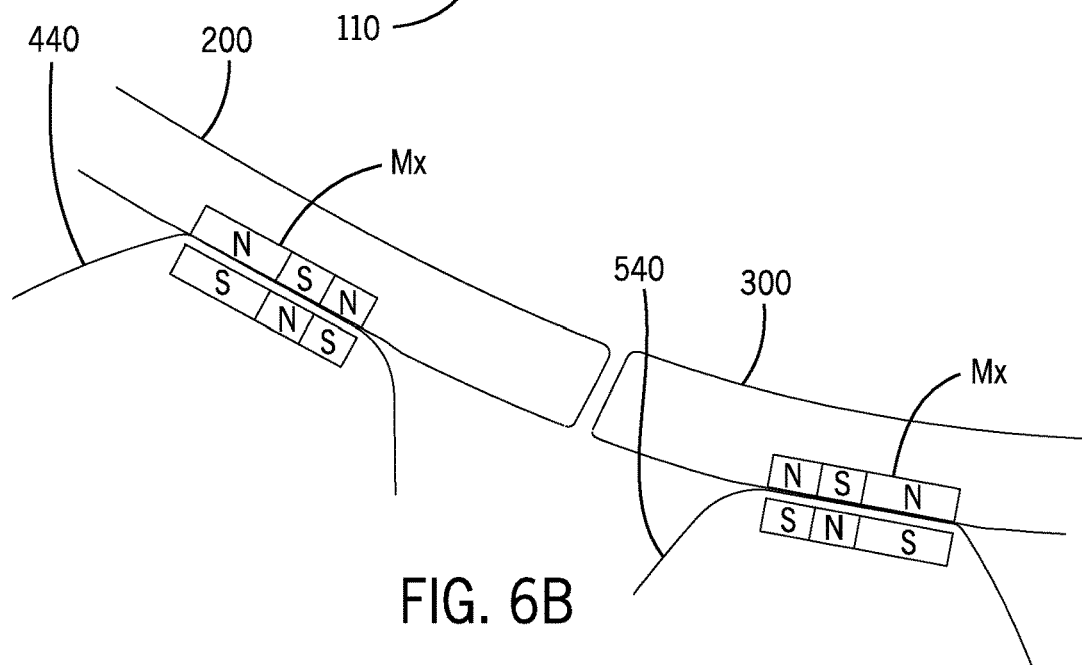
FIG. 6B is a schematic fragmentary perspective view of a magnet arrangement of a vehicle interior component shown as a console assembly according to an exemplary embodiment.
Figure 9A:
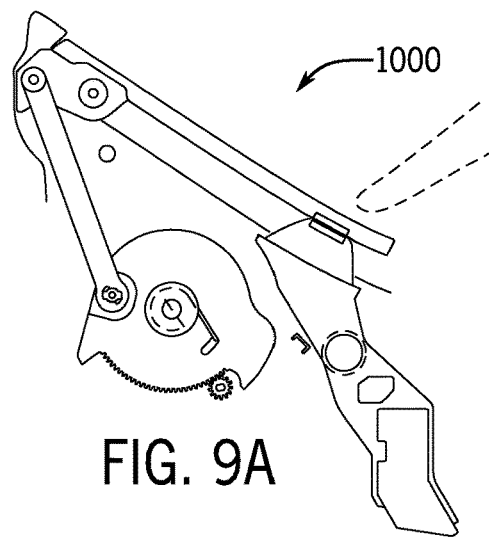
FIGS. 9A through 9E are schematic side views of the operation of a vehicle interior component shown as a console assembly according to an exemplary embodiment.
Figure 9B:
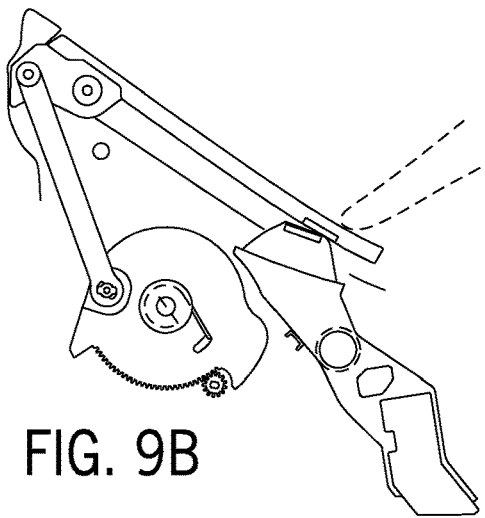
Figure 9C:
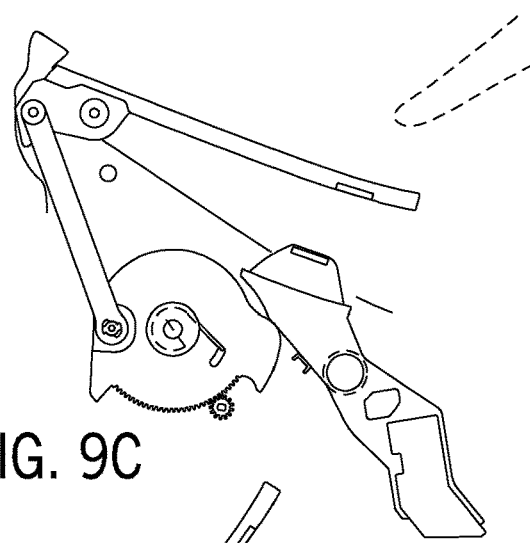
Figure 9D:
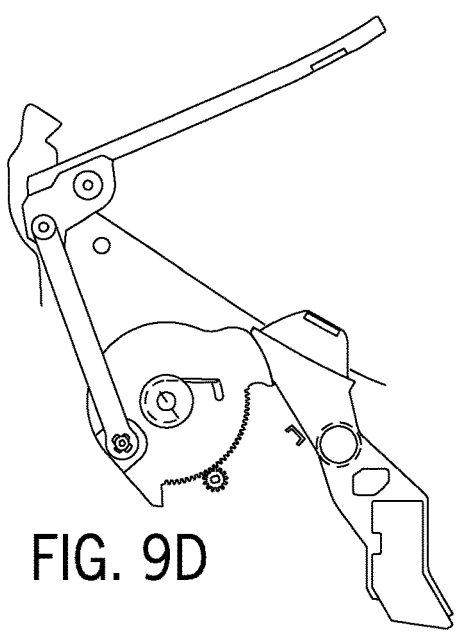
Figure 9E:
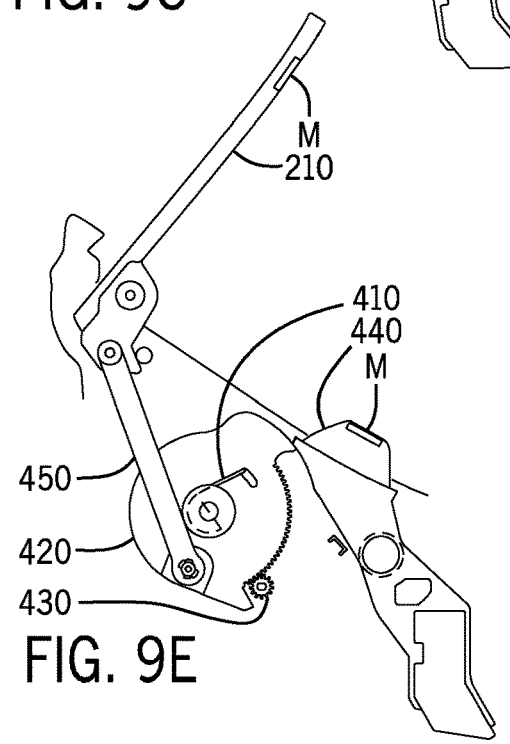
Figure 10A:
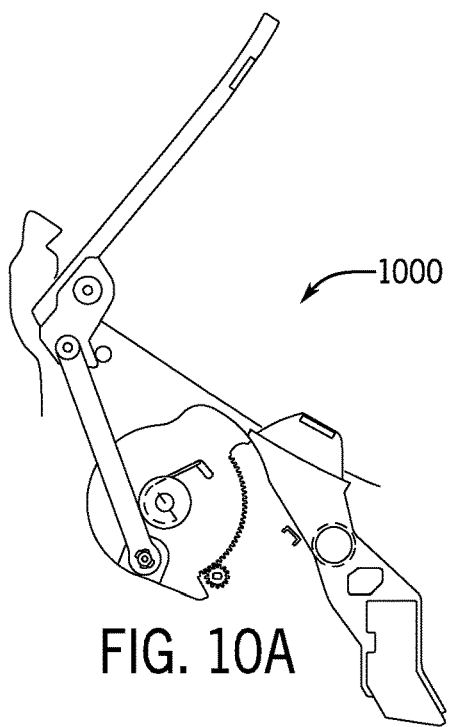
FIGS. 10A through 10E are schematic side views of the operation of a vehicle interior component shown as a console assembly according to an exemplary embodiment.
Figure 10B:
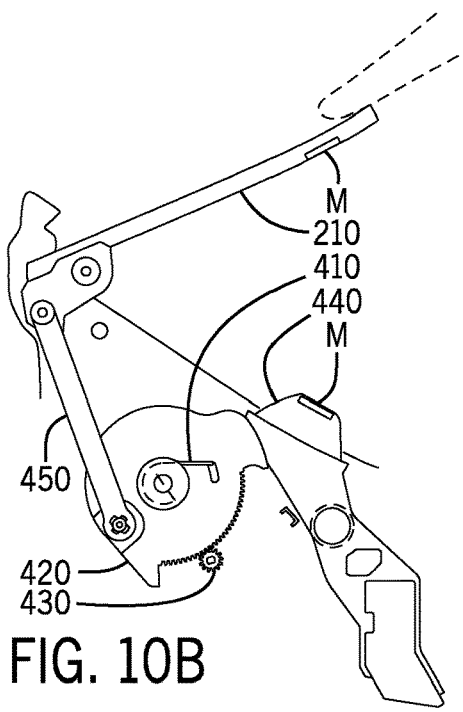
Figure 10C:
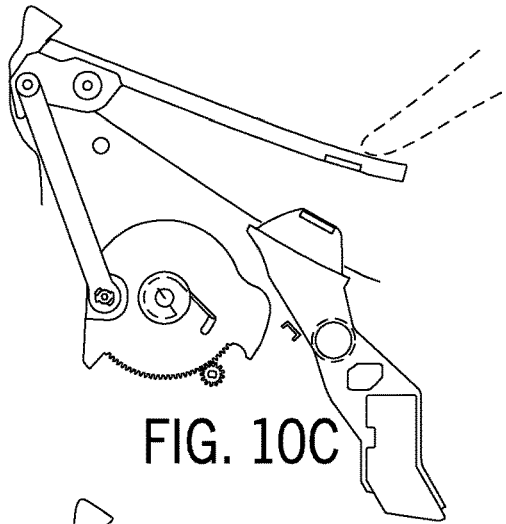
Figure 10D:
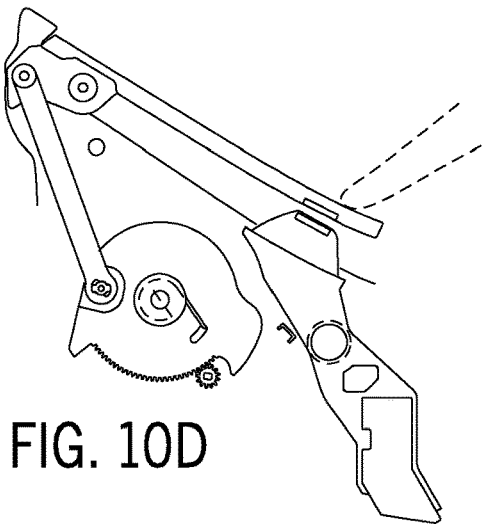
Figure 10E:
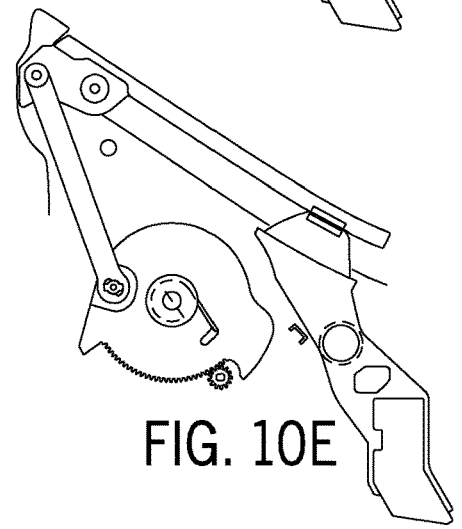
Figure 11A:
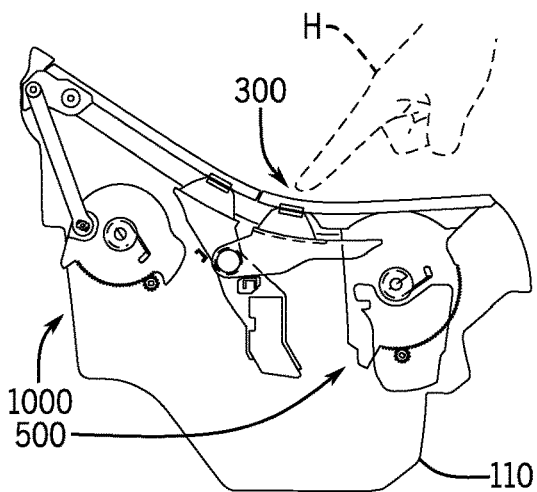
FIGS. 11A through 11F are schematic side views of the operation of a vehicle interior component shown as a console assembly according to an exemplary embodiment.
Figure 11B:
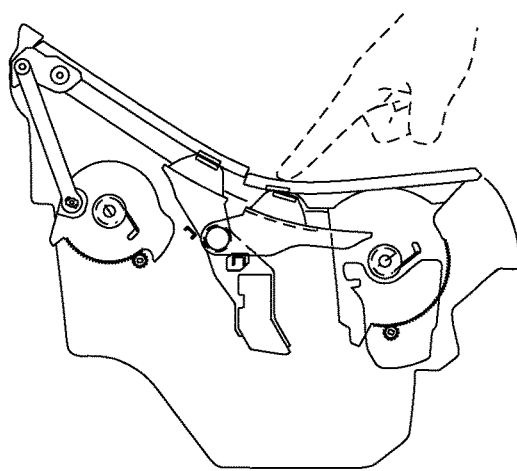
Figure 11C:
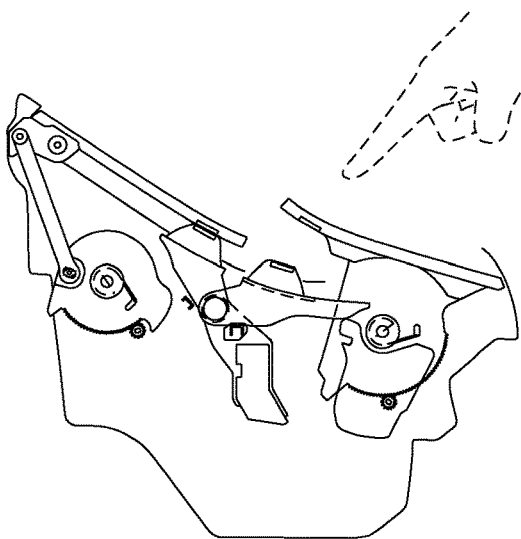
Figure 11D:
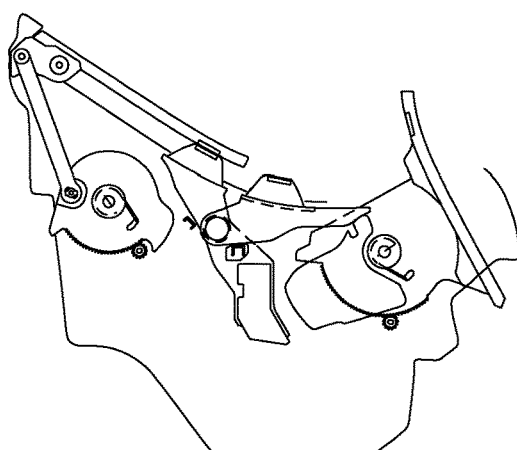
Figure 11E:
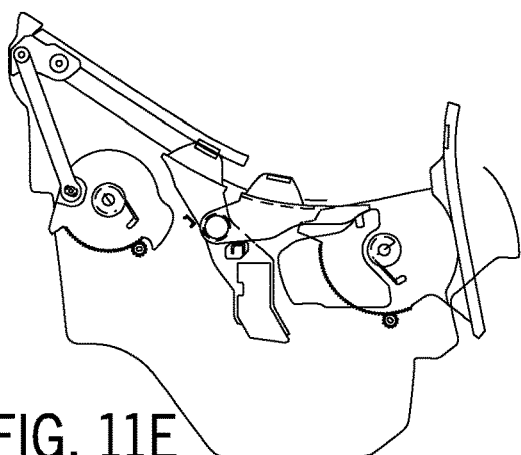
Figure 11F:
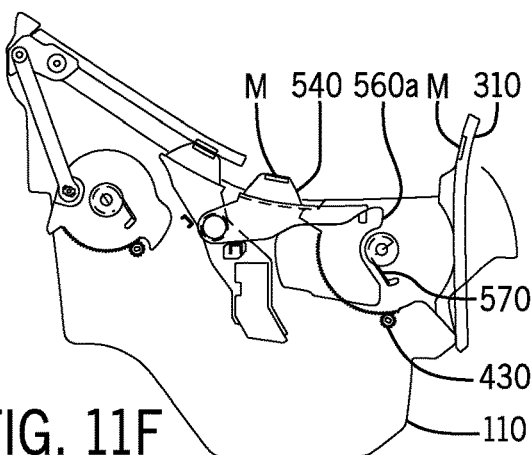
Figure 12A:
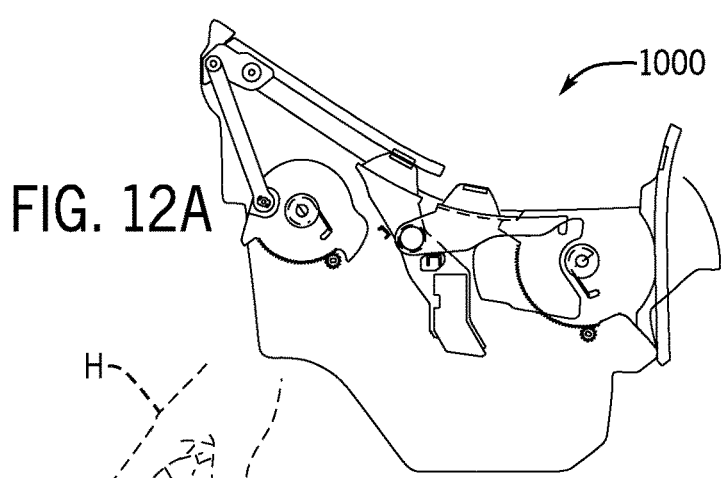
FIGS. 12A through 12E are schematic side views of the operation of a vehicle interior component shown as a console assembly according to an exemplary embodiment.
Figure 12B:
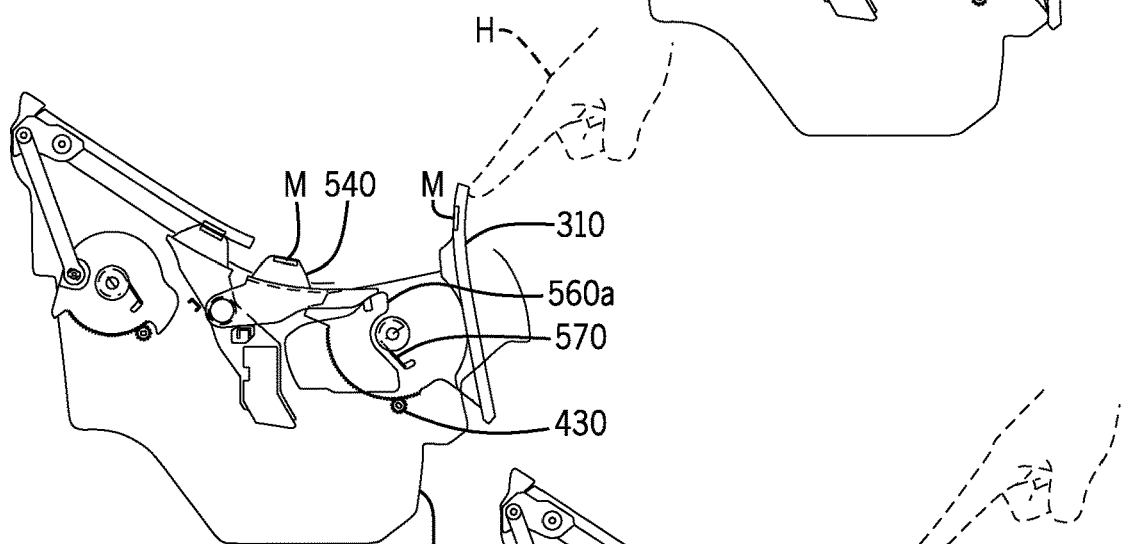
Figure 12C:
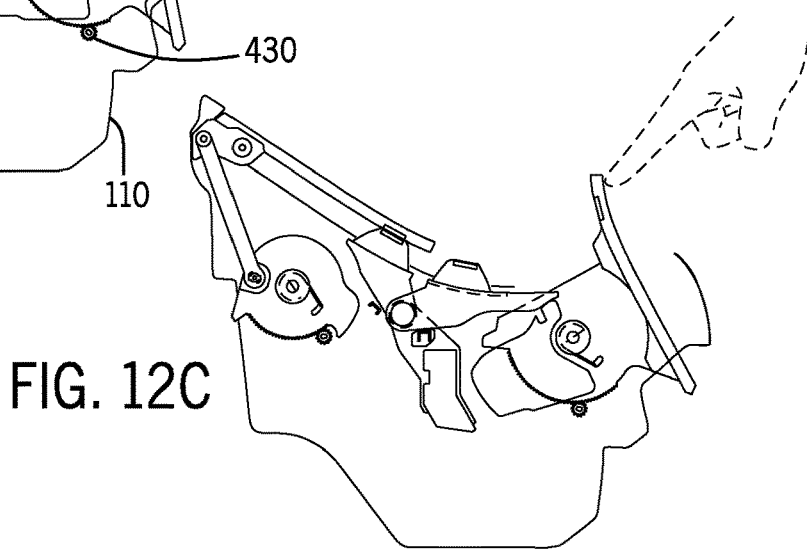
Figure 12D:
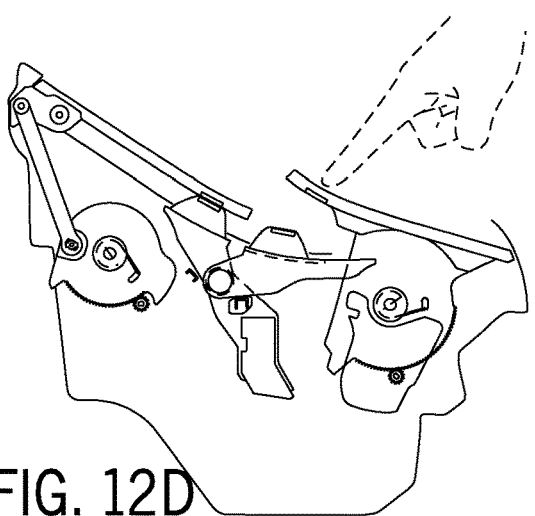
Figure 12E:
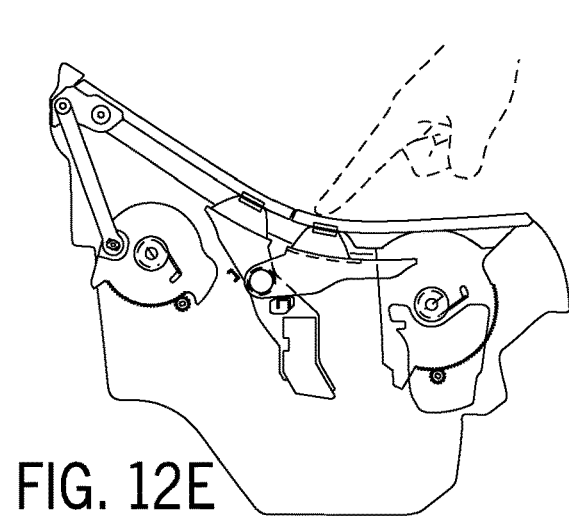
Figure 13A:
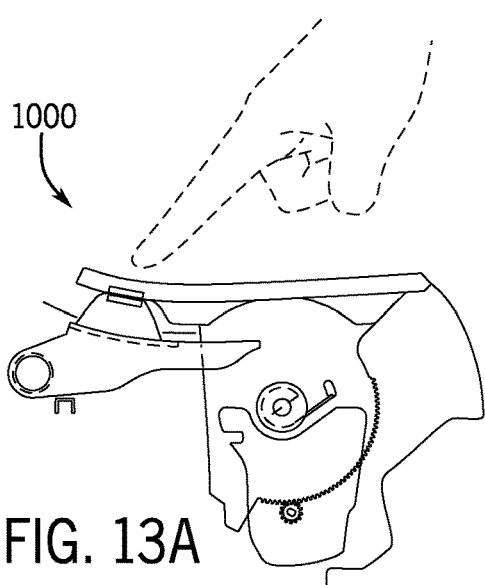
FIGS. 13A through 13F are schematic side views of the operation of a vehicle interior component shown as a console assembly according to an exemplary embodiment.
Figure 13B:
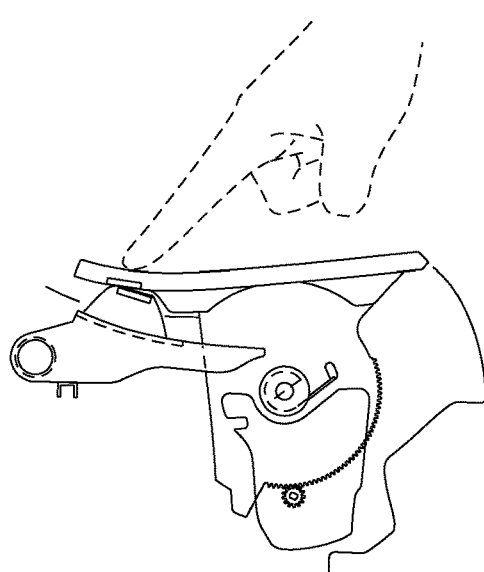
Figure 13C:
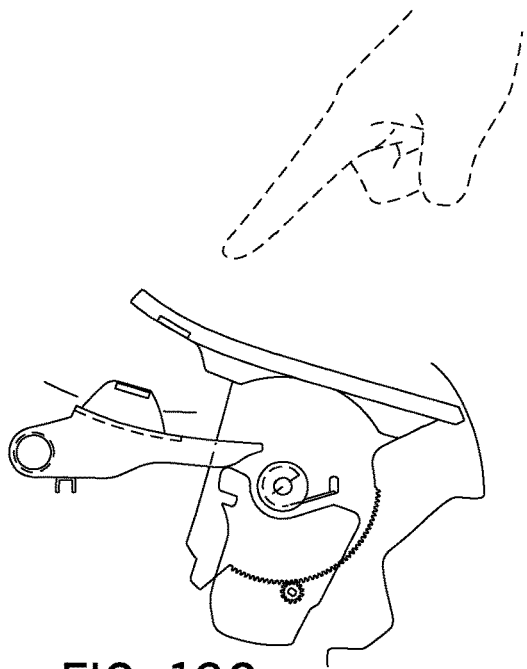
Figure 13D:
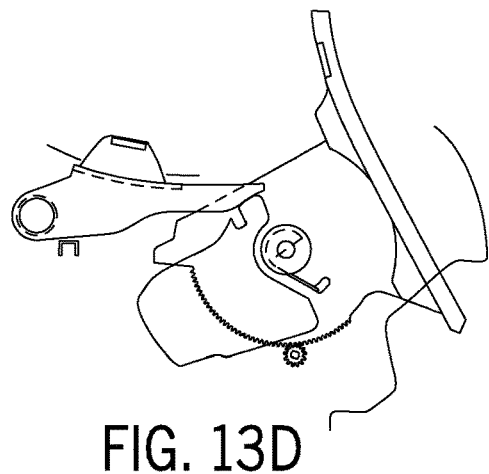
Figure 13E:
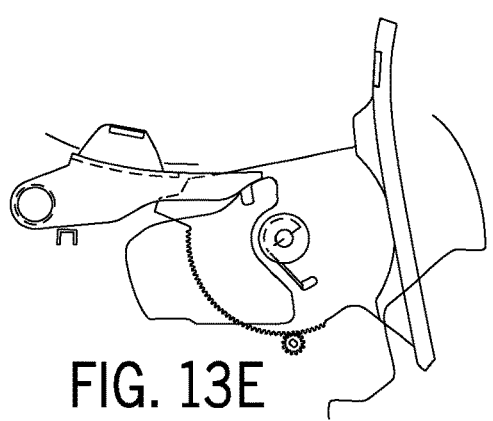
Figure 13F:
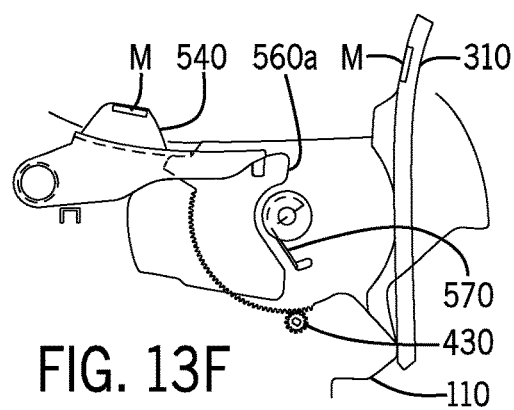
Figure 14A:
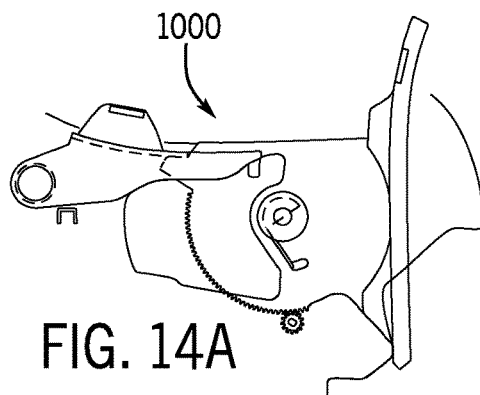
FIGS. 14A through 14E are schematic side views of the operation of a vehicle interior component shown as a console assembly according to an exemplary embodiment.
Figure 14B:
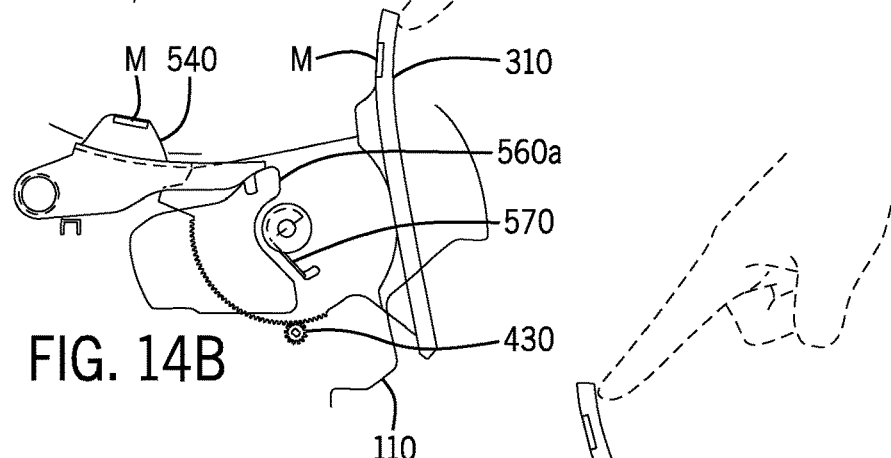
Figure 14C:
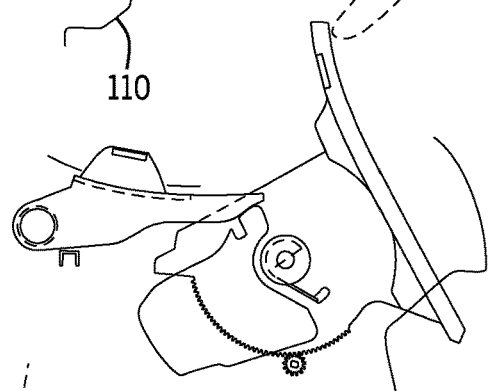
Figure 14D:
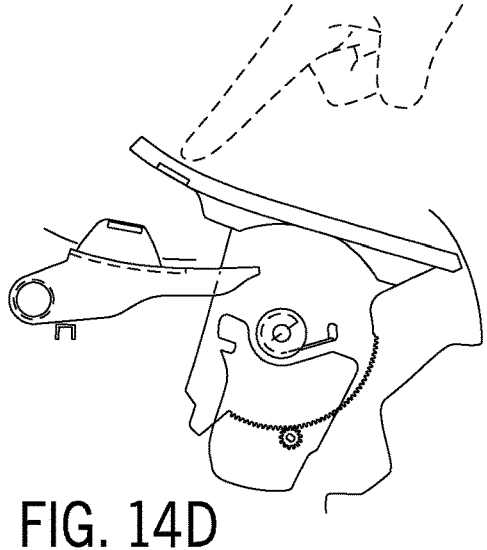
Figure 14E:
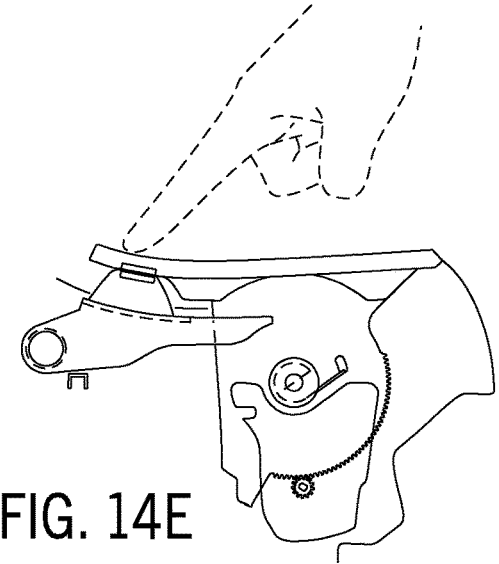
Figure 15A:
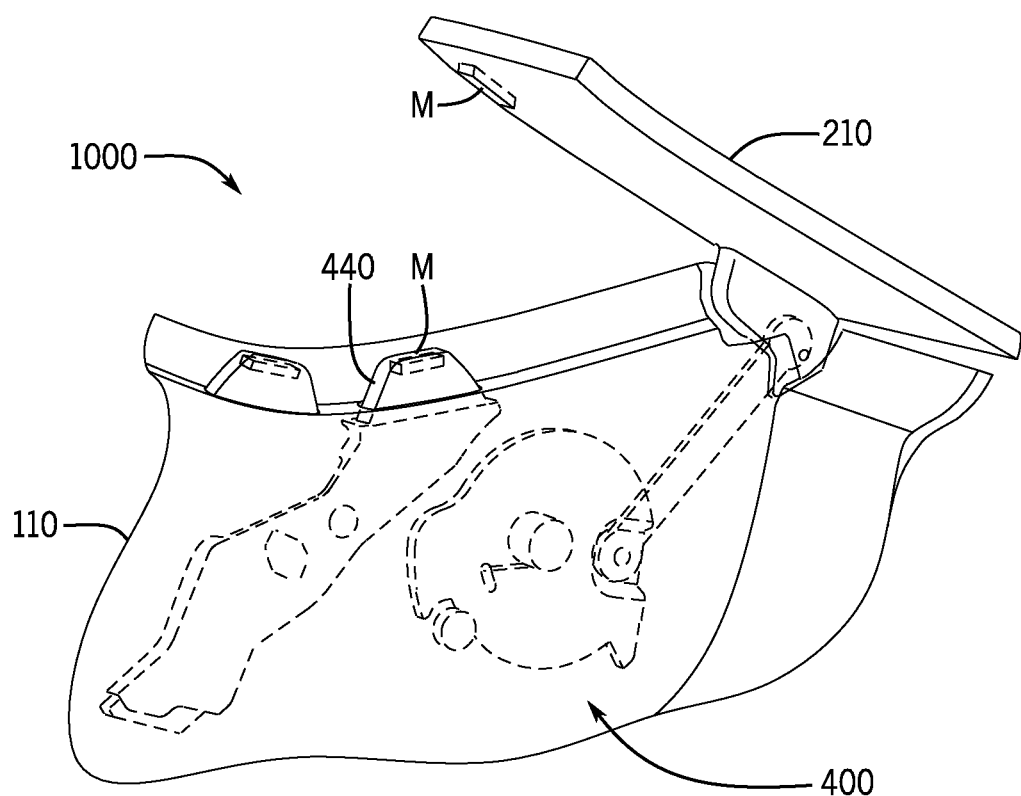
FIGS. 15A and 15B are schematic fragmentary perspective views of a vehicle interior component shown as a console assembly according to an exemplary embodiment.
Figure 15B:
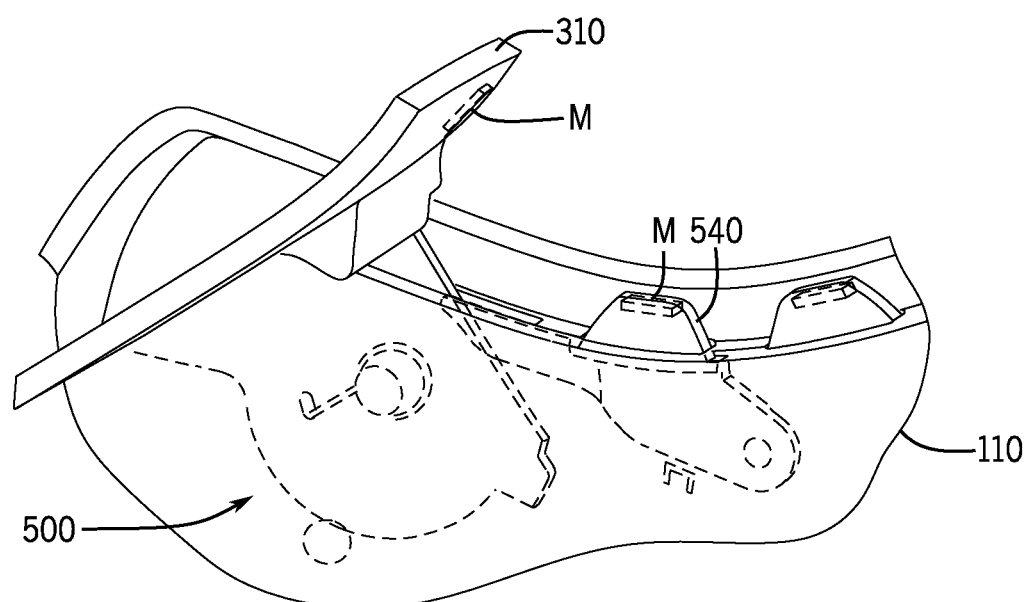

Referring to FIG. 3 through 6A, components of a console assembly shown as floor console assembly 1000 are indicated schematically according to an exemplary embodiment. As indicated schematically, the floor console assembly 1000 comprises a base shown as bin 110 providing the compartment with an opening and a cover comprising a set of opposing doors/assemblies shown as front door assembly 200 (with a mechanism/assembly 400) and a rear door assembly 300 (with a mechanism/assembly 500) sharing the opening/compartment of the base. FIG. 4 indicates the front door assembly 200 according to an exemplary embodiment; FIG. 5 indicates schematically the rear door assembly 300. FIG. 6A indicates the floor console assembly 1000 in assembled form. (As indicated schematically/representationally in the FIGURES, the components/subassemblies of the assembly may be secured with fasteners F such as screws/bolts with bushings/washers B and clips C and other indicated related hardware in a manner to provide secure/suitable attachment for the components/subassemblies for installation and use/operation.)

As indicated schematically in FIG. 3, the floor console assembly 1000 may comprise an internal tray/assembly with tray/bin 630 installed (e.g. free and/or hinged within base under the front door to contain one or more electronic devices) with components including bracket/mounting 620 and trim/strip 610; the floor console assembly may also comprise a lighting arrangement shown schematically/representationally as comprising a LED lamp 640 to be installed (e.g. within base); the floor console may also comprise one or more modules to provide electronic power (e.g. for electronic devices and/or LED lighting, etc.). See also FIGS. 6A, 17 and 20. A spring/lock arrangement (shown schematically as comprising lock 60 and spring 70) may be provided for the floor console assembly 1000 (e.g. conventional inertia lock to retain the cover/door closed in the event of impact loading) according to an exemplary embodiment. See FIG. 3. Referring to FIGS. 16A-16B, 17-19 and FIG. 20, components of a console assembly shown as floor console assembly 2000x and 2000 are shown according to an exemplary embodiment (as indicated with certain components/subassemblies substantially identical to components/subassemblies of console assembly 1000, compare FIGS. 3-6A and 15A-15B with FIGS. 16A-16B and 17-20).

Front Door Assembly of Console

Referring to FIG. 4, the front door assembly 200 with mechanism/assembly 400 is shown schematically according to an exemplary embodiment. The front door assembly 200 comprises a cover/door 210 with a set of flanges to provide a hinge arrangement with the base 110 and is pivotally coupled to the mechanism/assembly 400 by a link arm 450. The front door assembly 200 comprises a latch arrangement shown schematically as a magnetic latch arrangement comprising a magnet M in a slot or housing of the cover/door 210 and a magnet M in a slot or housing at an end/projection of an arm 440. See also FIGS. 3 and 6A. According to an exemplary embodiment, mechanism/assembly 400 is configured to actuate/operate movement of the cover/door 210 from a closed position to an open position. As indicated schematically, mechanism/assembly 400 comprises the link arm 450 pivotally coupled to a cam/disk 420 with a spring shown as torsion spring 410 on a post/bushing for rotation relative to the base 110 (e.g. with the spring configured to urge the door to the open position relative to the base). According to an exemplary embodiment, a damper mechanism shown as comprising a gear damper 430 (e.g. a rotary damper on a pivot/post) to engage with a gear rack on cam/disk 420 is provided for the mechanism/assembly 400. As indicated schematically according to an exemplary embodiment, the arm 440 of the latch mechanism is mounted on a pivot post for rotary movement in a defined path of travel (e.g. to provide for an elevated position and retracted position for the end of the arm configured to engage as the latch arrangement, e.g. with magnet M); arm 440 may be provided at an end with a mass shown as counterweight 442 (e.g. to provide an inertial mass intended to facilitate positioning of the arm/cover). As shown schematically according to an exemplary embodiment in FIG. 4, the arm 440 may be configured with a cam surface to engage the cam/disk 420 during the path of travel; the arm 440 may engage a stop 112 on the base 110 at a terminal position in the path of travel. See also FIGS. 3 and 15A-15B.

Figure 16A:
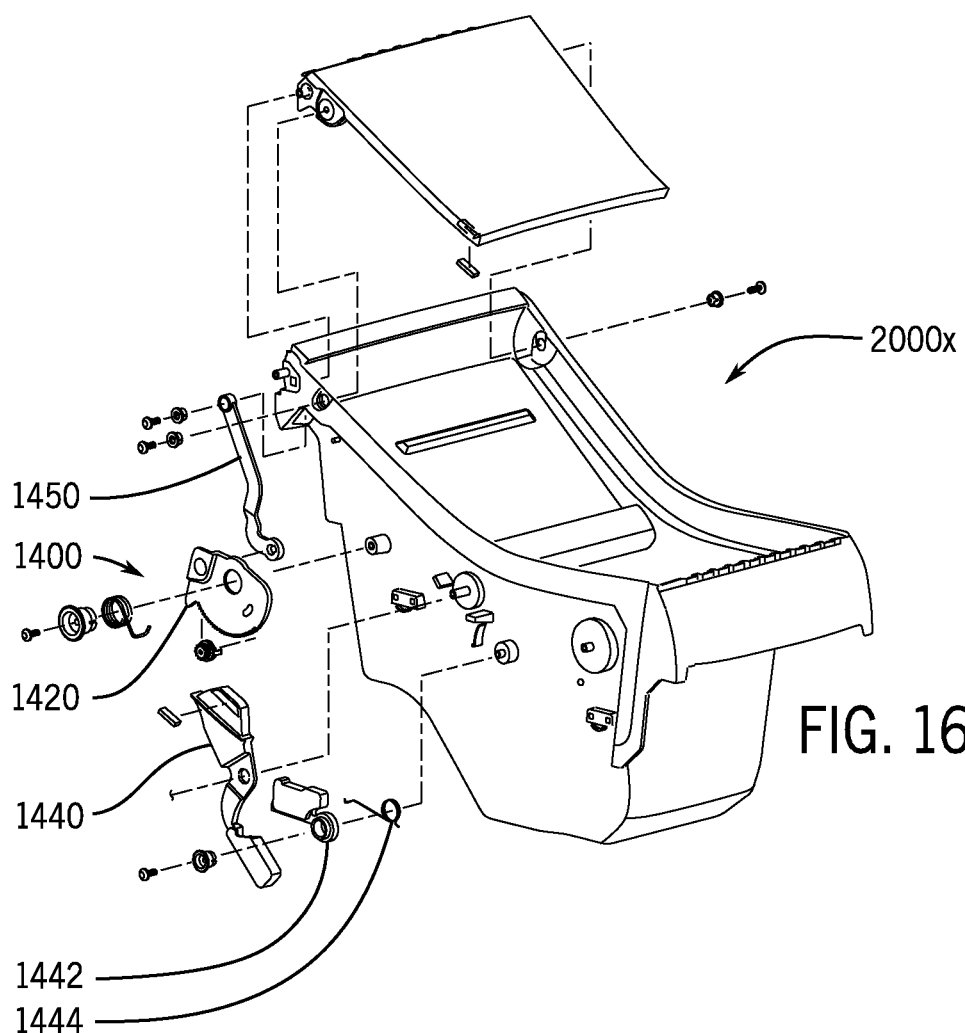
FIG. 16A is a schematic exploded perspective view of a vehicle interior component shown as a console assembly according to an exemplary embodiment.
Figure 16B:
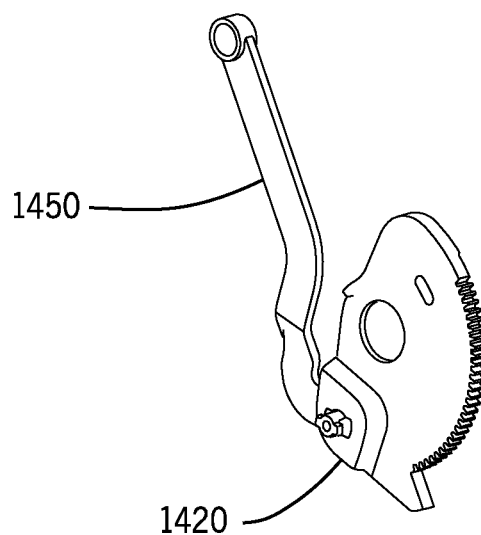
FIG. 16B is a schematic perspective view of a component of a vehicle interior component according to an exemplary embodiment.

As shown schematically in FIGS. 16A and 16B according to an exemplary embodiment, the floor console assembly 2000x comprises a front door assembly with mechanism/assembly 1400. See also FIGS. 3-4 and 15A-15B (as indicated with certain components/subassemblies substantially identical to components/subassemblies of console assembly 1000) and FIG. 20. As shown in FIG. 16A, the front door assembly comprises the cover/door pivotally coupled to the base to the mechanism/assembly 1400 by a link arm 1450 and a cam/disk 1420 (e.g. in a generally planar/aligned arrangement). See also FIG. 16B (showing link arm 1450 with end coupled to and partially nested into a recess in cam/disk 1420). The front door assembly comprises a latch arrangement shown schematically as a magnetic latch arrangement comprising a magnet on a projection/housing at an end of an arm 1440. According to an exemplary embodiment, mechanism/assembly 1400 for the front door assembly is configured to actuate/operate movement of the cover/door from a closed position to an open position. As indicated schematically, mechanism/assembly 1400 comprises the link arm 1450 pivotally coupled to the cam/disk 1420 with a spring shown as torsion spring on a post/bushing for rotation relative to the base (e.g. with the spring configured to urge the door to the open position relative to the base). As indicated schematically according to an exemplary embodiment, the arm 1440 of the latch mechanism is mounted on a pivot post for rotary movement in a defined path of travel (e.g. to provide for an elevated position and retracted position for the end of the arm configured to engage as the latch arrangement, e.g. with magnet). As shown schematically, the arm 1440 may be configured with a cam surface to engage the cam/disk 1420 during the path of travel; the arm 1440 may engage a stop on the base at a terminal position in the path of travel. According to an exemplary embodiment spring/mass arrangement (shown schematically as comprising mass 1442 and spring 1444) may be provided for the floor console assembly (e.g. conventional inertia mass/lock to retain the front cover/door closed in the event of impact loading) according to an exemplary embodiment. See also FIG. 3 (e.g. providing counterweight 442).

Figure 17:
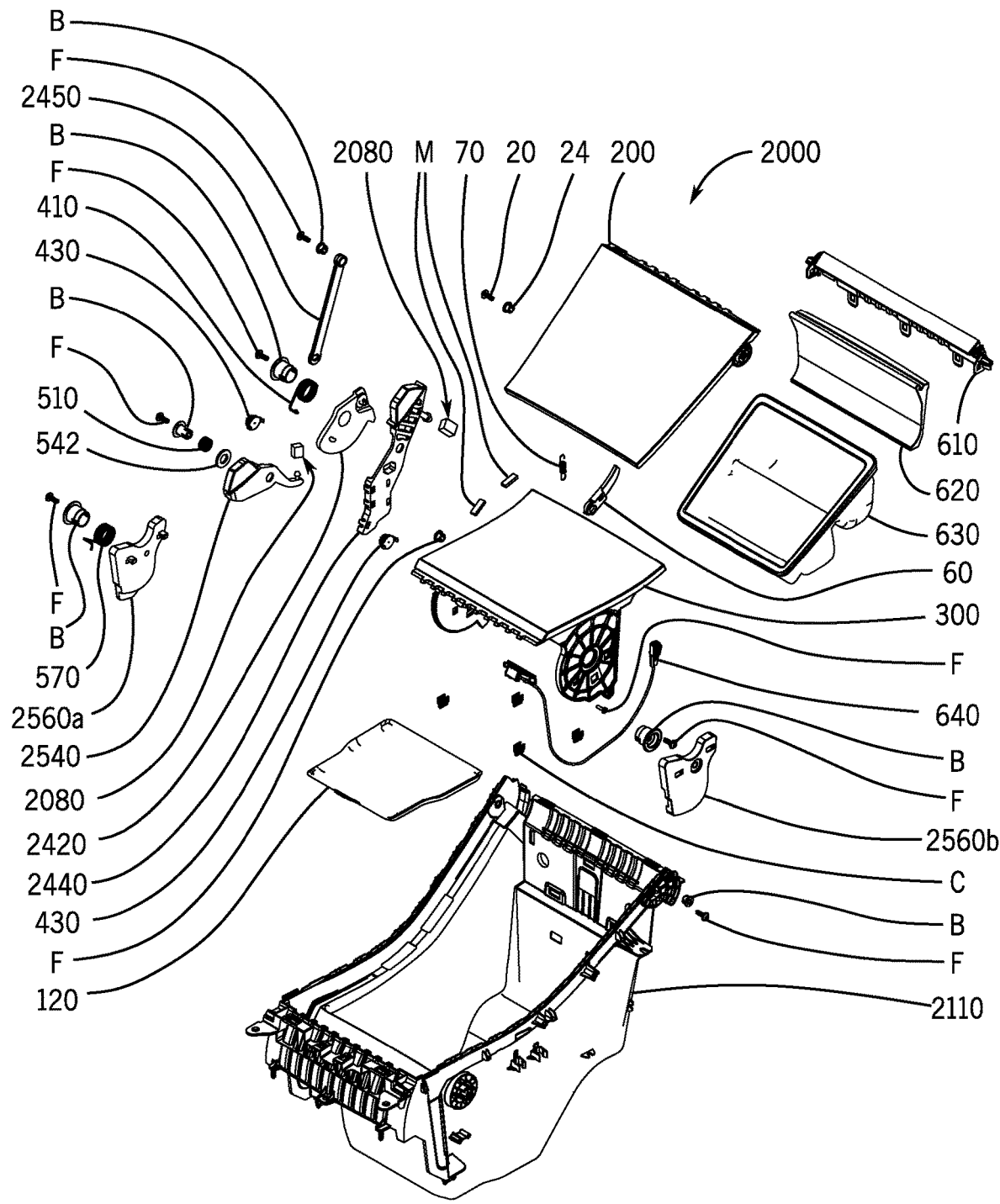
FIG. 17 is a schematic exploded perspective view of a vehicle interior component shown as a console assembly according to an exemplary embodiment.
Figure 18:
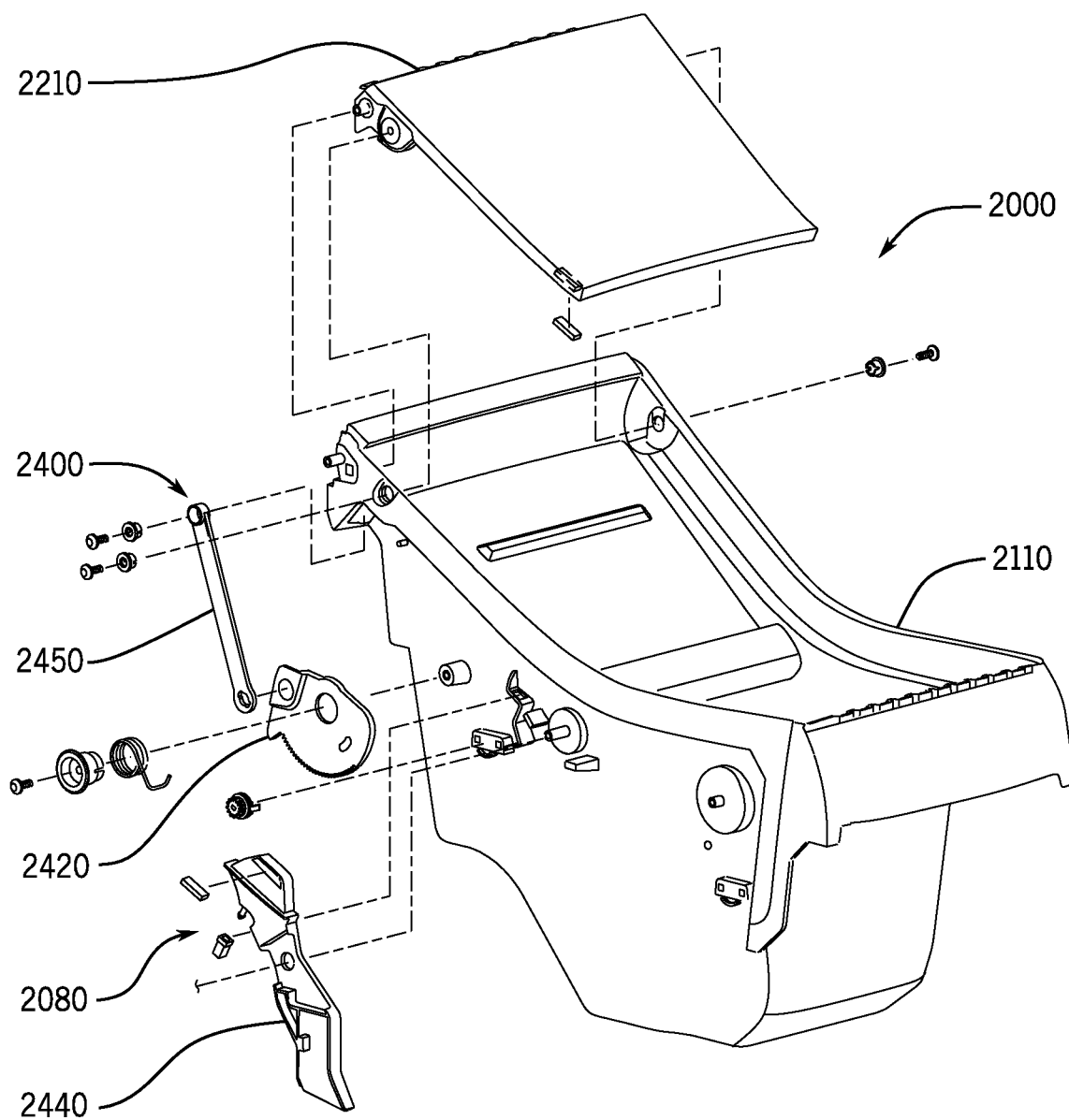
FIG. 18 is a schematic exploded perspective view of a vehicle interior component shown as a console assembly according to an exemplary embodiment.
Figure 20:
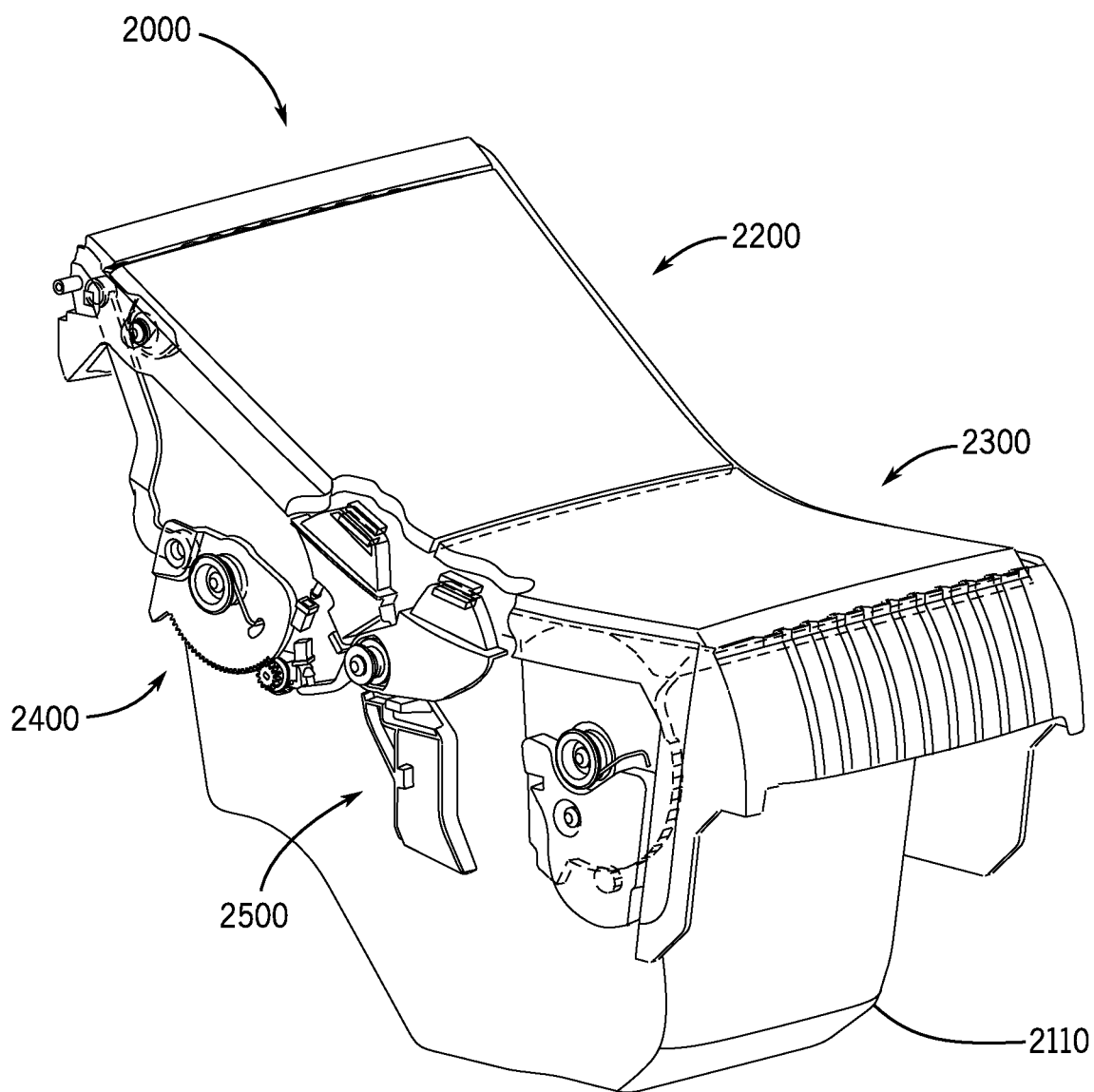
FIG. 20 is a schematic perspective view of a vehicle interior component shown as a console assembly according to an exemplary embodiment.
Figure 23A:
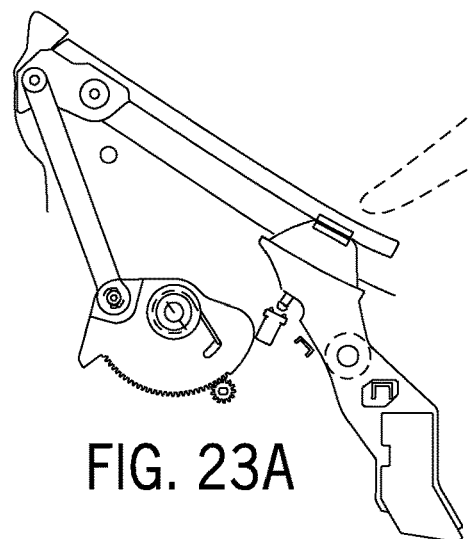
FIGS. 23A through 23E are schematic side views of the operation of a vehicle interior component shown as a console assembly according to an exemplary embodiment.
Figure 23B:
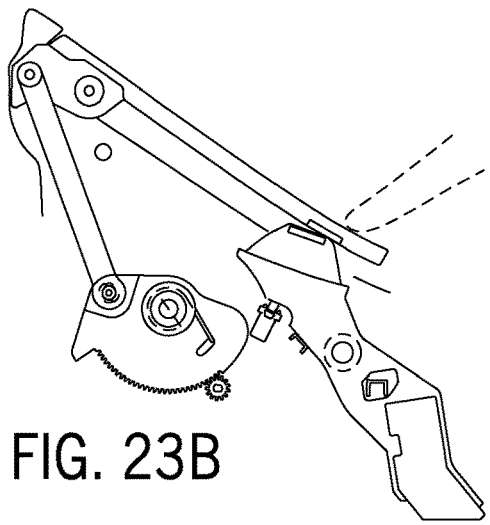
Figure 23C:
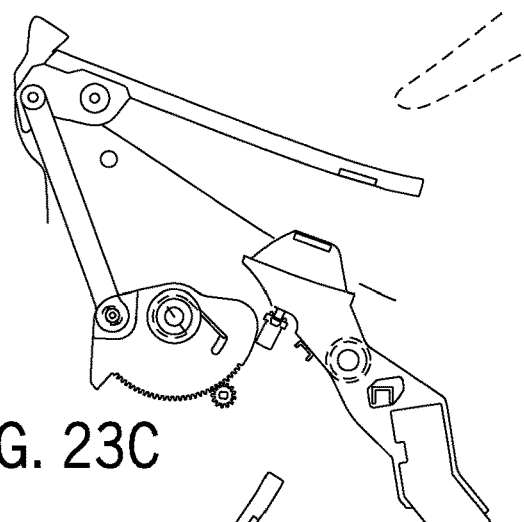
Figure 23D:
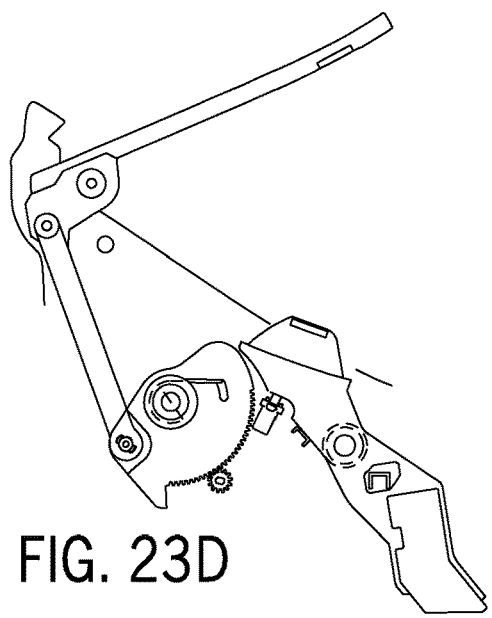
Figure 23E:
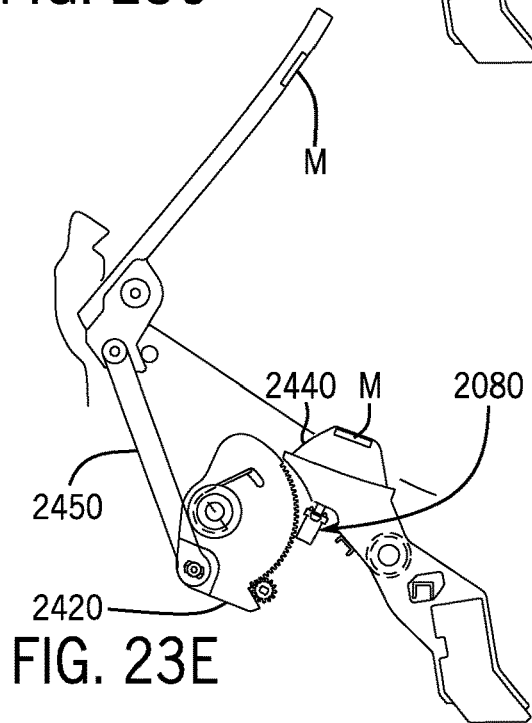
Figure 24B:
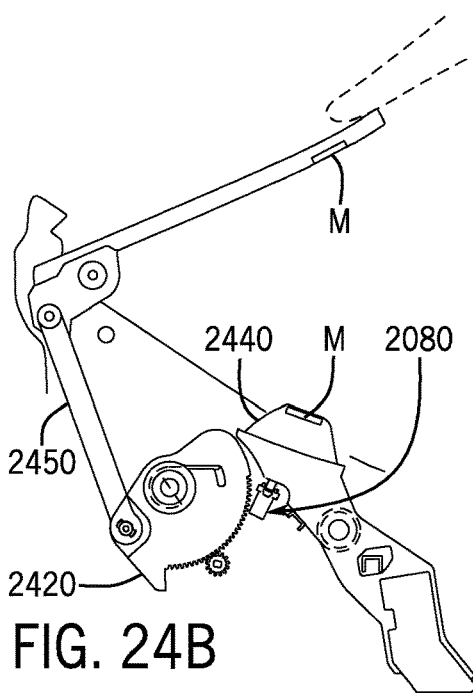
FIGS. 24A through 24E are schematic side views of the operation of a vehicle interior component shown as a console assembly according to an exemplary embodiment.
Figure 24A:
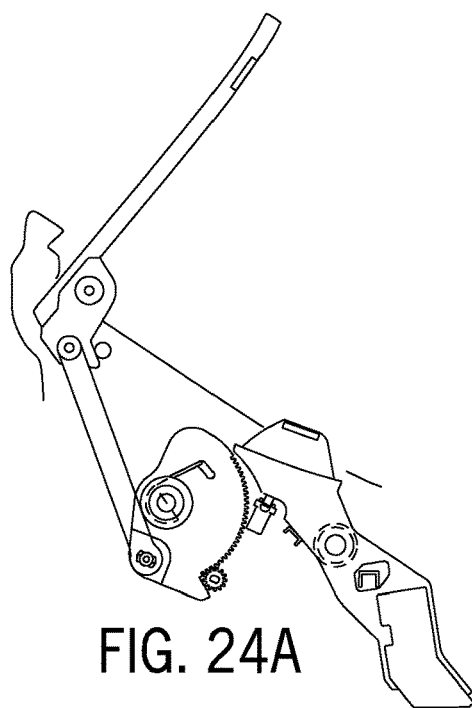
Figure 24C:
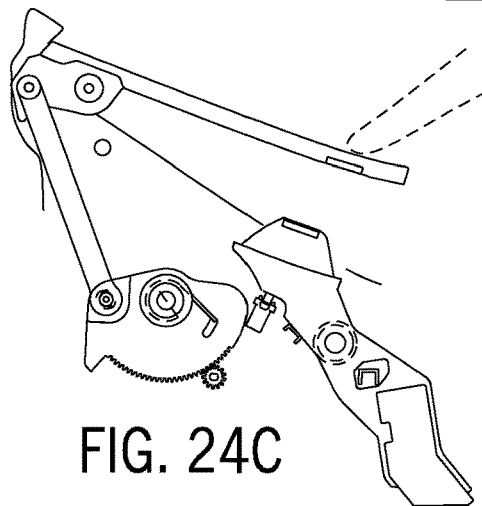
Figure 24D:
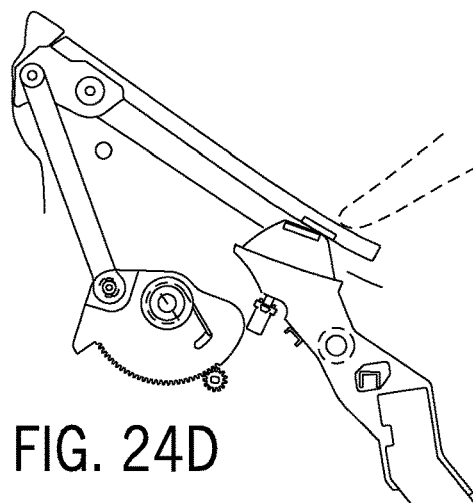
Figure 24E:
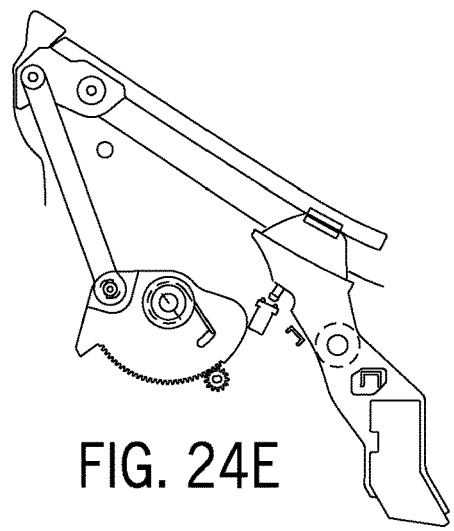
Figure 25A:
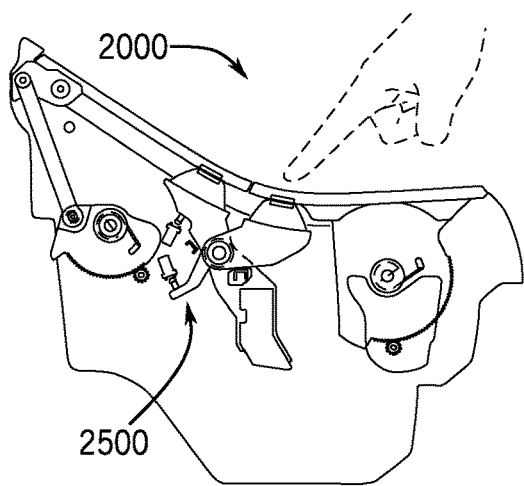
FIGS. 25A through 25F are schematic side views of the operation of a vehicle interior component shown as a console assembly according to an exemplary embodiment.
Figure 25B:
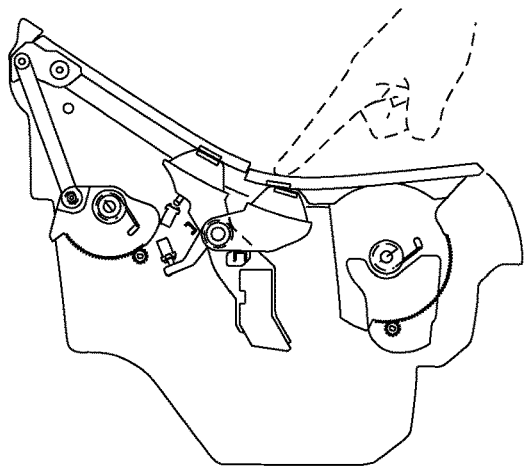
Figure 25C:
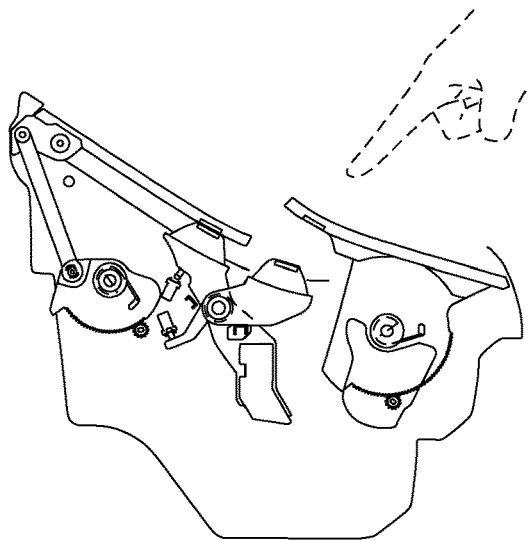
Figure 25D:
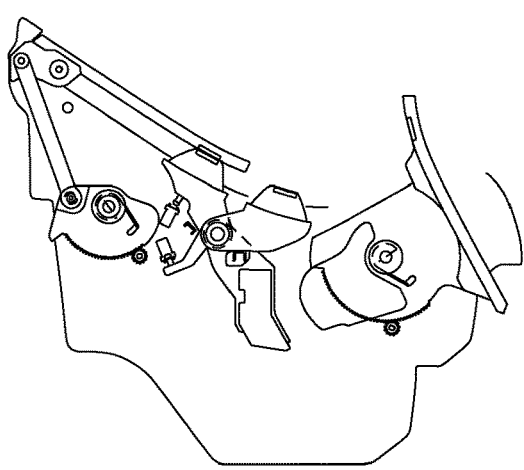
Figure 25E:
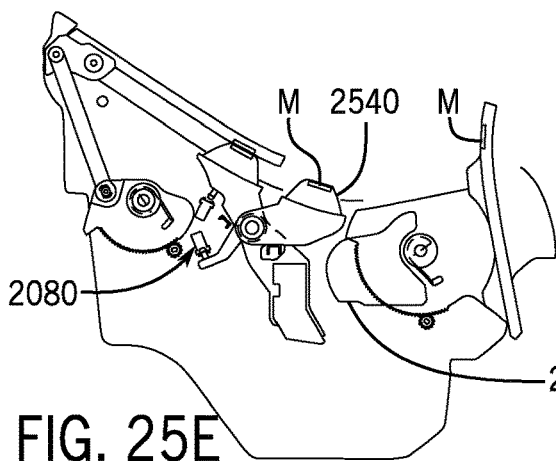
Figure 25F:
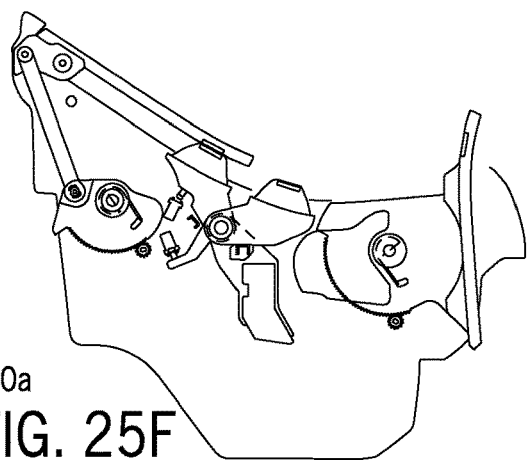
Figure 26A:
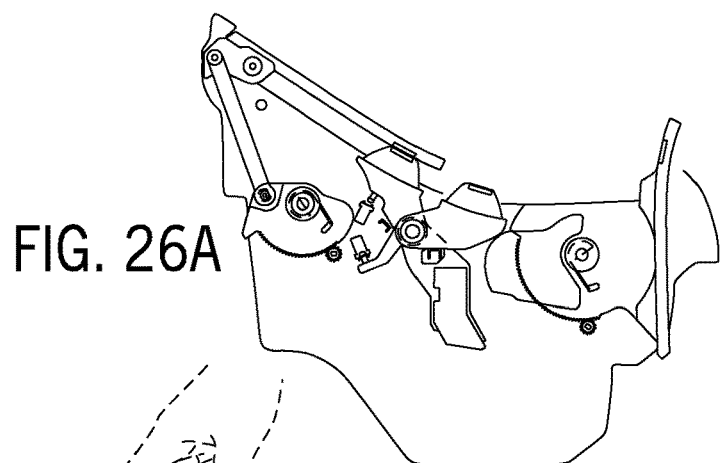
FIGS. 26A through 26E are schematic side views of the operation of a vehicle interior component shown as a console assembly according to an exemplary embodiment.
Figure 26B:
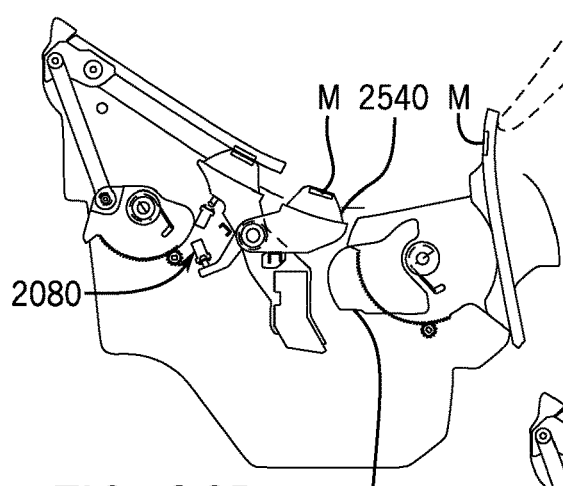
Figure 26C:
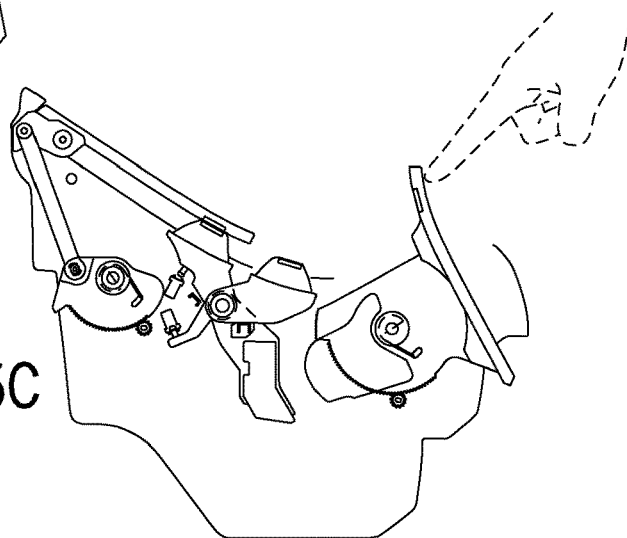
Figure 26D:
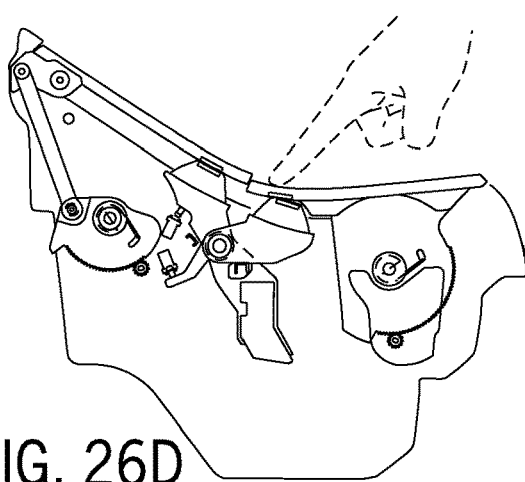
Figure 26E:
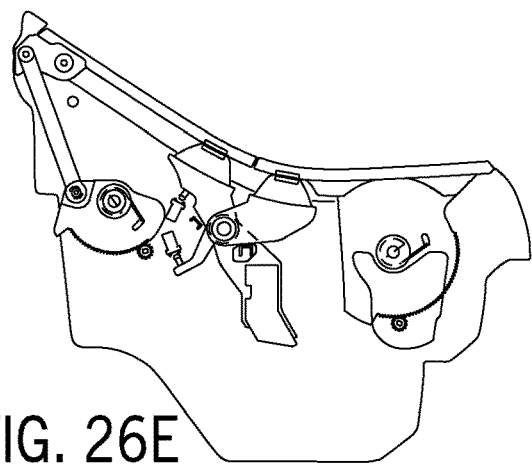
Figure 27A:
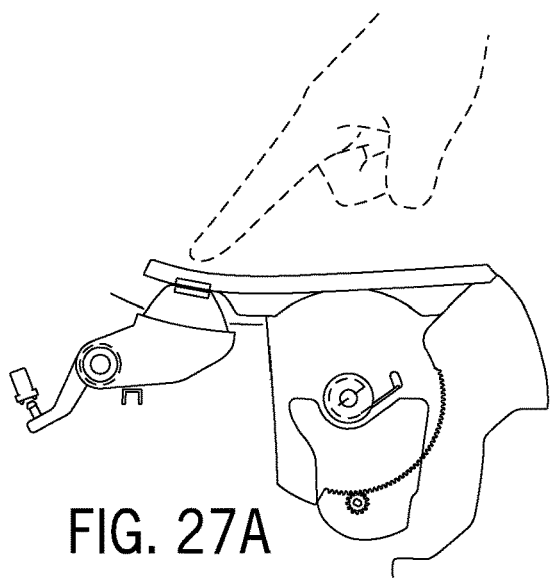
FIGS. 27A through 27F are schematic side views of the operation of a vehicle interior component shown as a console assembly according to an exemplary embodiment.
Figure 27B:
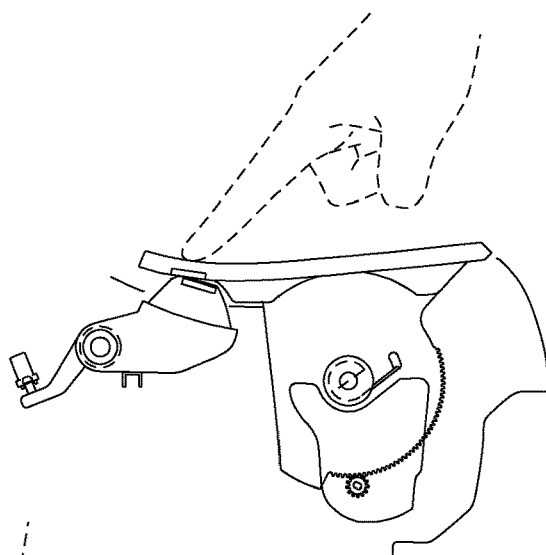
Figure 27C:
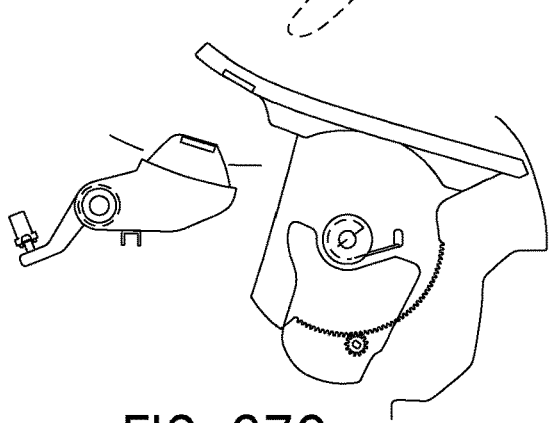
Figure 27D:
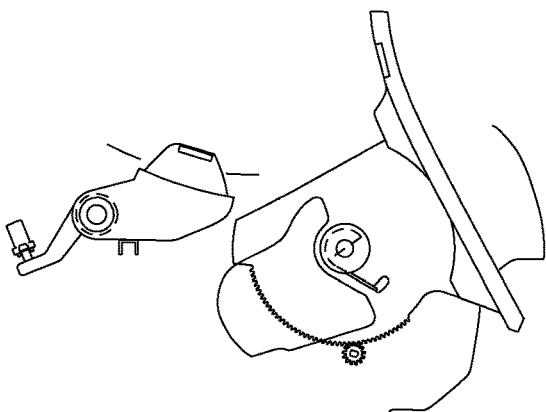
Figure 27E:
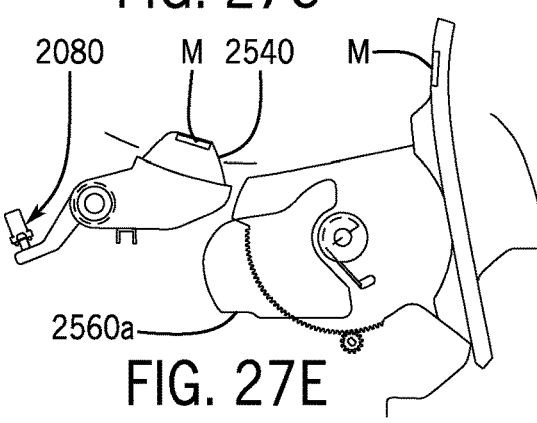
Figure 27F:
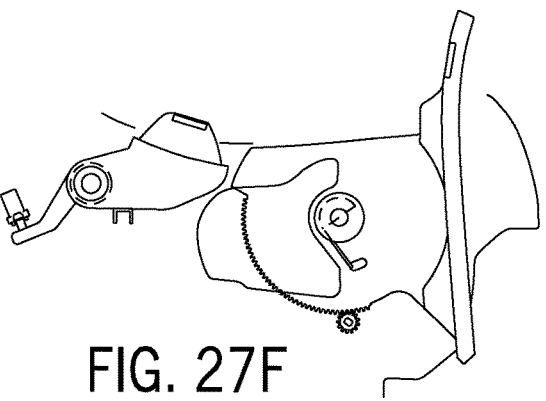

As shown schematically in FIGS. 17, 18 and 20 according to an exemplary embodiment, the floor console assembly 2000 comprises a front door assembly 2200 with mechanism/assembly 2400. See also FIGS. 3-4 and 15A-15B (as indicated with certain components/subassemblies substantially identical to components/subassemblies of console assembly 1000) and FIGS. 20 and 29A-29B. As shown in FIGS. 17, 18 and 20, the front door assembly 2200 comprises the cover/door 2210 pivotally coupled to the base 2110 by the mechanism/assembly 2400 having a link arm 2450 and a cam/disk 2420 (e.g. in a generally planar/aligned arrangement); a latch arrangement shown schematically as a magnetic latch arrangement comprising a magnet on a projection/housing at an end of an arm 2440 is provided. According to an exemplary embodiment, mechanism/assembly 2400 for the front door assembly 2200 is configured to actuate/operate movement of the cover/door 2210 from a closed position to an open position. As indicated schematically, mechanism/assembly 2400 comprises the link arm 2450 pivotally coupled to the cam/disk 2420 with a spring shown as torsion spring on a post/bushing for rotation relative to the base (e.g. with the spring configured to urge the door to the open position relative to the base). As indicated schematically according to an exemplary embodiment, the arm 1440 of the latch mechanism is mounted on a pivot post for rotary movement in a defined path of travel (e.g. to provide for an elevated position and retracted position for the end of the arm configured to engage as the latch arrangement, e.g. with magnet). See also FIGS. 29A-29B. As shown schematically, the arm 2440 may be configured with a cam surface to engage the cam/disk 2420 during the path of travel; the arm 2440 may engage a stop on the base at a terminal position in the path of travel. As shown schematically according to an exemplary embodiment in FIGS. 17-18 and 29A-29B, the front door assembly may comprise a latch arrangement (shown as a push-push latch 2080 with a post/plunger on the arm 2440 and base/receptor) to retain the arm 2440 in the retracted position. See also FIGS. 36A-36B.

Rear Door Assembly of Console

Referring to FIG. 5, the rear door assembly 300 with mechanism/assembly 500 is shown schematically according to an exemplary embodiment. The rear door assembly 300 comprises a cover/door 310 with a set of flanges to provide a hinge arrangement with the base 110 and is coupled to the mechanism/assembly 500 (e.g. mounted at a pivot point). The rear door assembly 300 comprises a latch arrangement shown schematically as a magnetic latch arrangement comprising a magnet M in a slot or housing of the cover/door 310 and a magnet M in a slot or housing on a projection of arm 540. See also FIGS. 6A and 15A-15B. According to an exemplary embodiment, mechanism/assembly 500 is configured to actuate/operate movement of the cover/door 310 from a closed position to an open position. As indicated schematically, mechanism/assembly 500 comprises a cam/disk shown as a counterweight 560*a* (e.g. on a flange of door 310 along with counterweight 560*b* on the opposing flange of door 310) with a spring shown as torsion spring 570 on a post/bushing for rotation relative to the base 110 (e.g. with the spring configured to urge the door to the open position relative to the base). According to an exemplary embodiment, a damper mechanism shown as comprising a gear damper 430 (e.g. a rotary damper on a pivot/post) is provided to engage with a gear rack on a flange of the door 310. As indicated schematically according to an exemplary embodiment, the arm 540 is mounted on a pivot post for rotary movement in a defined path of travel (e.g. to provide for an elevated position and retracted position for the projection of the arm configured to engage as the latch arrangement, e.g. with magnet M); arm 540 may be provided at an end with a cam surface to engage the cam/disk shown as counterweight 560*a* (e.g. to facilitate positioning of the arm) during the path of travel; the arm 540 may engage a stop 114 on the base 110 at a terminal position in the path of travel. See also FIGS. 15A-15B.

Figure 19:
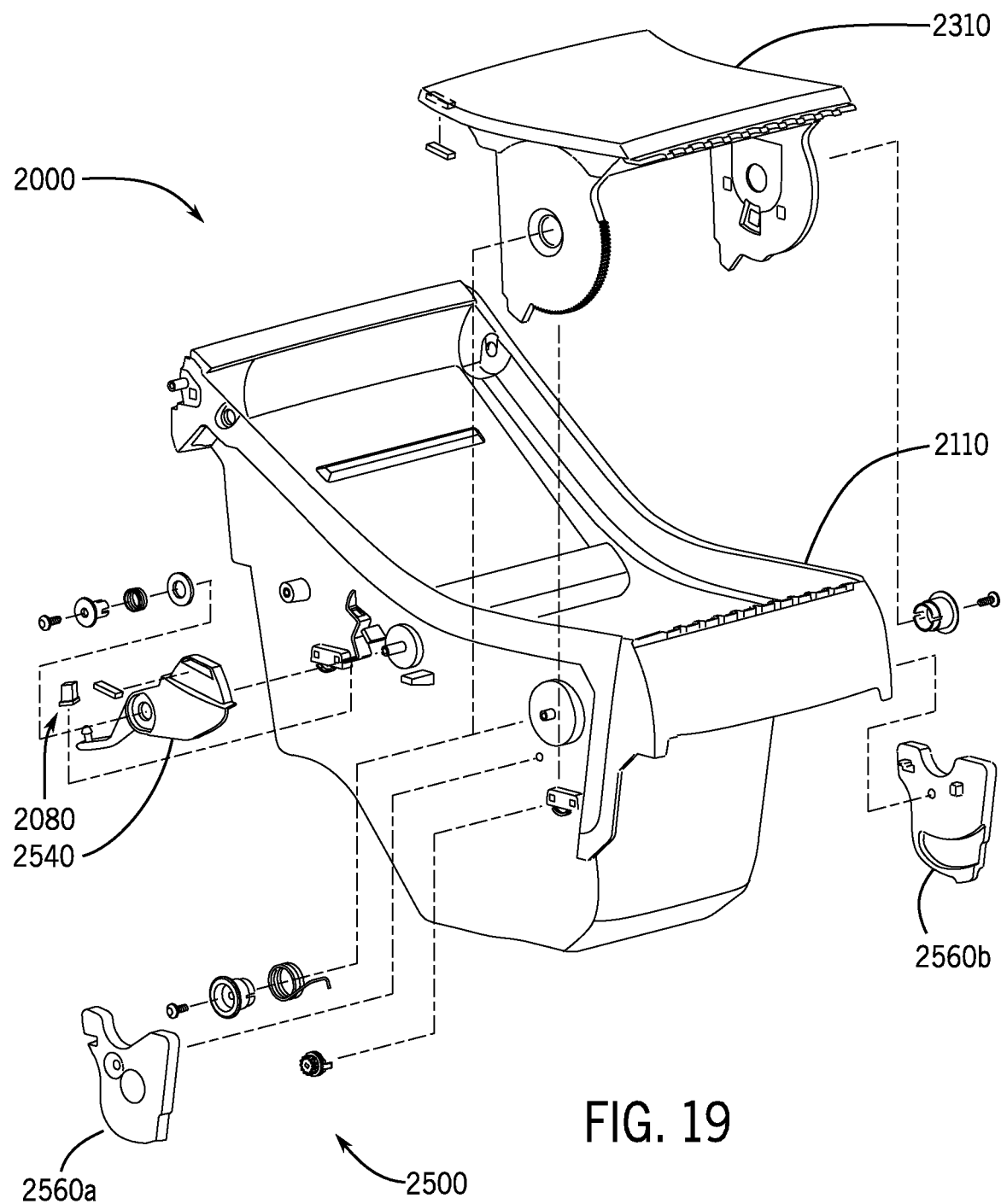
FIG. 19 is a schematic exploded perspective view of a vehicle interior component shown as a console assembly according to an exemplary embodiment.

Referring to FIGS. 19 and 20, components of console assembly shown as floor console assembly 2000 are shown schematically according to an exemplary embodiment. See also FIGS. 3 and 5 and 15A-15B (as indicated with certain components/subassemblies substantially identical to components/subassemblies of console assembly 1000) and FIG. 20. As shown schematically in FIGS. 19 and 20 according to an exemplary embodiment, the floor console assembly 2000 comprises a rear door assembly 2300 with mechanism/assembly 2500. As shown in FIGS. 19 and 20, the rear door assembly 2300 comprises a cover/door 2310 with a set of flanges to provide a hinge arrangement with the base 2110 and is coupled to the mechanism/assembly 2500 (e.g. mounted at a pivot point). The rear door assembly 2300 comprises a latch arrangement shown schematically as a magnetic latch arrangement comprising a magnet in a slot or housing of the cover/door and a magnet in a slot or housing on a projection of arm 2540. See also FIGS. 29A-29B. According to an exemplary embodiment, mechanism/assembly 2500 is configured to actuate/operate movement of the rear cover/door 2310 from a closed position to an open position. As indicated schematically, mechanism/assembly 2500 comprises a cam/disk shown as a counterweight 2560*a* (e.g. on a flange of door along with counterweight 2560*b* on the opposing flange of the door) with a spring shown as torsion spring on a post/bushing for rotation relative to the base 2110 (e.g. with the spring configured to urge the door to the open position relative to the base). According to an exemplary embodiment, a damper mechanism shown as comprising a gear damper (e.g. a rotary damper on a pivot/post) is provided to engage with a gear rack on a flange of the door. As indicated schematically according to an exemplary embodiment, the arm 2540 is mounted on a pivot post for rotary movement in a defined path of travel (e.g. to provide for an elevated position and retracted position for the projection of the arm configured to engage as the latch arrangement, e.g. with magnet). As shown schematically according to an exemplary embodiment in FIGS. 19 and 29A-29B, the rear door assembly may comprise a latch arrangement (shown as a push-push latch 2080 with a post/plunger on the end of the arm 2540 and base/receptor) to retain the arm 2540 in the retracted position. See also FIGS. 36A-36B.

Console Assembly

As shown schematically according to an exemplary embodiment in FIG. 6A, when assembled the floor console assembly 1000 comprises a base 110 with a cover that may comprise a front door assembly 200 with mechanism/assembly 400 and a rear door assembly 300 with a mechanism/assembly 500. As shown schematically according to an exemplary embodiment in FIG. 20, when assembled the floor console assembly 2000 comprises a base 2110 with a cover that may comprise a front door assembly 2200 with mechanism/assembly 2400 and a rear door assembly 2300 with a mechanism/assembly 2500. As indicated schematically in FIGS. 6A and 20, the front door assembly and rear door assembly of the floor console assembly may be provided in any of a variety of arrangements according to an exemplary embodiment. See also FIGS. 2A-2D, 15A-15B, 29A-29B and 30A-30B. According to an exemplary embodiment, the components of the console assembly may be formed from materials such as plastic materials and metals (e.g. for mechanism components, fasteners, etc.) and other materials/elements, etc. of a type suitably and/or conventionally used for automotive/vehicle interior components.

As indicated schematically in FIGS. 15A-15B and 29A-29B according to an exemplary embodiment, the cover (e.g. any/each door) of the floor console assembly may be selectively opened and closed as facilitated by the mechanism/assembly; the cover may be retained in a closed position by the latch arrangement (e.g. by the magnetic latch mechanism comprising the arm with magnet to engage the cover with magnet). See also FIGS. 2A-2D, 30A-30B and 34. As shown schematically according to an exemplary embodiment in FIGS. 15A-15B, 29A-29B and 34, a magnetic latch arrangement may be provided with a set of magnets M in a configuration to provide magnetic forces (e.g. magnetic attraction) to establish retention of the cover/door to the base when the cover/door is in the closed position relative to the base. See also FIG. 6B (according to an embodiment shown schematically using a set of magnets Mx for the cover/door and with the base configured to establish magnetic attraction when aligned according to complementary magnetic polarity, e.g. multi-pole complementary south/S—north/N magnetic polarity).

As indicated schematically in FIGS. 2A-2D, 3, 6A-6B, 15A-15B, 29A-29B and 34, the structural components for the magnetic latch arrangement may be formed from a variety of suitable materials including plastic materials (e.g. non-magnetic/non-metallic) for associated parts such as housings, etc.; the magnetic components may comprise any of a variety of suitable magnet components (e.g. magnets configured to provide suitable magnetic forces for retention/separation of the cover/door in operation); according to an exemplary embodiment, the magnetic latch arrangement may comprise a combination of magnetic components (e.g. magnets) and metallic components that may be retained by the magnetic components (e.g. by magnetic attraction) (e.g. a magnet element and a ferro-magnetic element). See also FIGS. 2A-2D and 3, 6A, 17, 20 and 30A-30B (e.g. a magnetic material element M may be paired with a ferro-magnetic material element M in a set to provide a magnetic latch arrangement according to an exemplary embodiment).

As indicated schematically according to an exemplary embodiment in FIGS. 15A-15B and 29A-29B, the base of the floor console assembly may comprise a set of sidewalls that provide a slot for the arm of the latch mechanism of each door (e.g. the projection/housing of each arm comprising the latch feature such as magnet); the arm of the latch mechanism extends from the slot in the elevated position and is retracted from the slot when in the retracted position. As indicated schematically according to an exemplary embodiment, the latch mechanism may be at least partially concealed within the sidewall of the base from general view according to an exemplary embodiment. See e.g. FIGS. 2A-2D, 6A-6B, 15A-15B, 20, 29A-29B and 30A-30B.

As indicated schematically, the latch mechanism for the cover (e.g. each door) may be provided in an asymmetrical arrangement (e.g. with arrangement at/on one sidewall) according to an exemplary embodiment as shown in FIGS. 15A-15B and 29A-29B and 34; according to an exemplary embodiment, the latch mechanism for the cover may be provided on each of the opposing sidewalls (e.g. in a dual latch arrangement with duplication of components on each sidewall to provide additional/symmetrical retaining force).

Figure 29A:
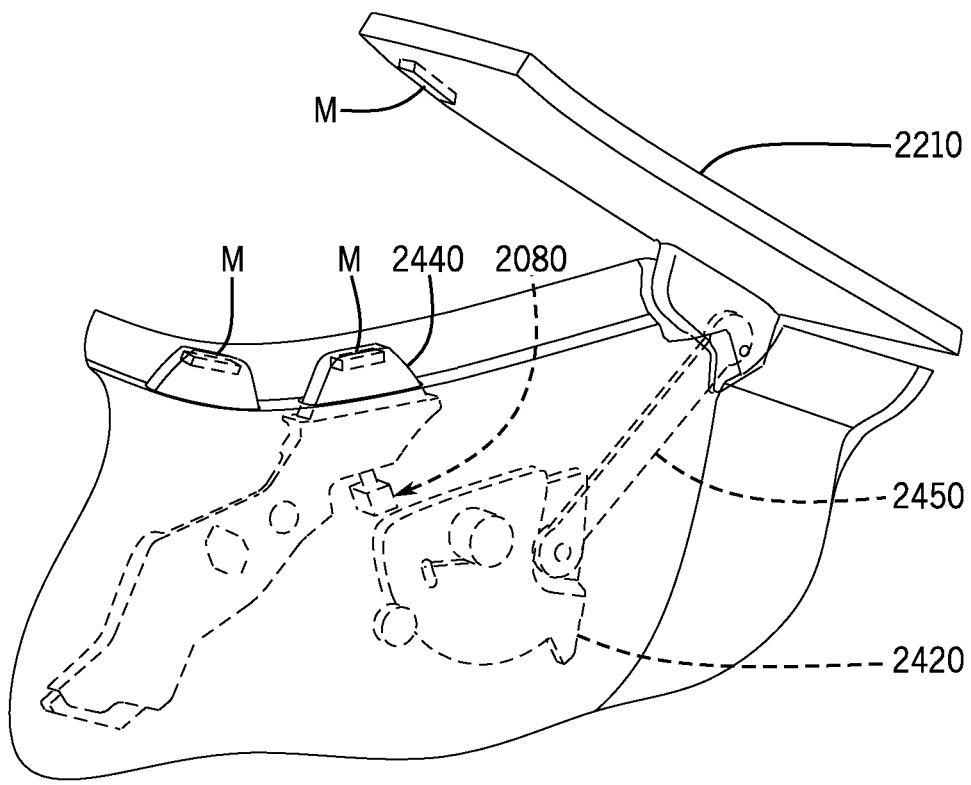
FIGS. 29A and 29B are schematic fragmentary perspective views of a vehicle interior component shown as a console assembly according to an exemplary embodiment.
Figure 29B:
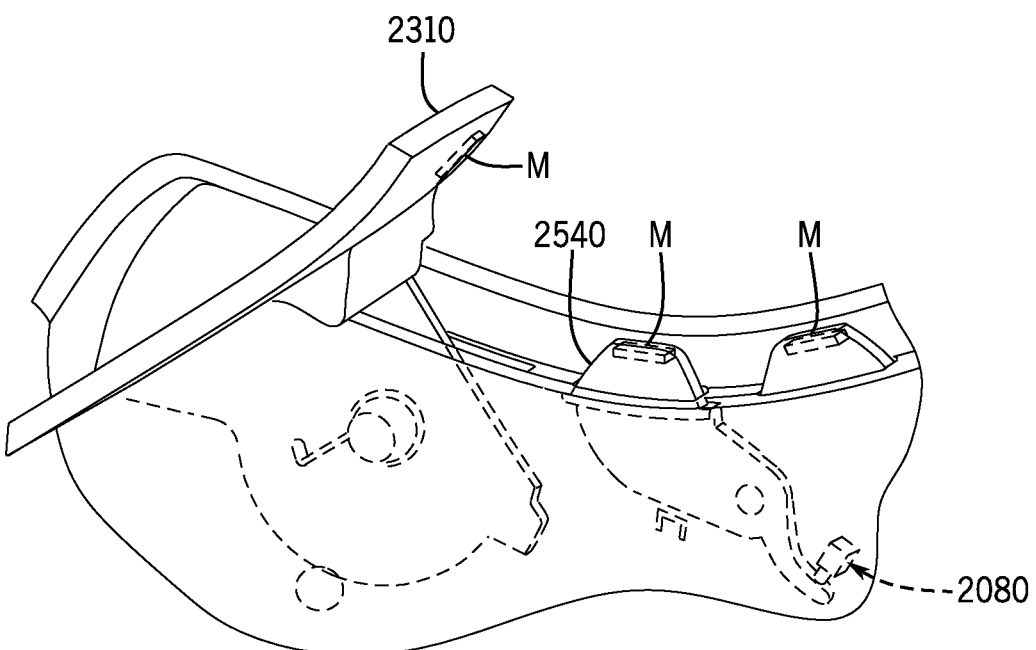

As indicated schematically according to an exemplary in FIGS. 29A-29B, the latch mechanism may comprise a latch (shown as a push-push latch arrangement 2080) to retain the arm 2440 and 2540 of the latch mechanism in a retracted position (and to act as a stop for the arm). See also FIGS. 36A-36B (push-push latch arrangement 4200 according to an exemplary embodiment).

Operation of Front Door of Console

Referring to FIGS. 7A-7E, 8A-8E, 9A-9E and 10A-10E, operation of the front door assembly of a console assembly shown as floor console assembly 1000 is shown schematically according to an exemplary embodiment. See also FIGS. 21A-21E, 22A-22E, 23A-23E and 24A-24E.

As indicated schematically in FIGS. 7A-7E and 9A-9E, the cover/front door 210 can be moved from a closed position to an open position. As shown schematically, when the cover/door 210 is closed the latch arrangement/mechanism is engaged and is intended to retain the cover/door 210 in the closed position (e.g. closed relative to the base/bin 110 against the force of the spring 410); the end/housing of the arm 440 of the latch mechanism is urged into an elevated position so that magnet M in the end/housing of the arm 440 can engage magnet M in housing of the door 210; engagement of the magnet arrangement (e.g. magnetic attraction/force through each corresponding housing) retains the cover/door in the closed position relative to the base. See FIGS. 7A and 9A. By application of an external force shown as the hand/finger (e.g. shown as hand H in FIG. 7A) of a vehicle occupant, the closed door 210 is rotated/pushed (e.g. downward) and the end/housing of arm 440 of the latch mechanism with magnet M is rotated/translated into a retracted position; when the end/housing of the arm 440 of the latch mechanism is on the retracted position the magnet M in the end/housing of the arm 440 is moved out of complete engagement with magnet M in housing of cover/door 210 (e.g. to reduce the magnetic attraction/force to disengage the latch arrangement) and as to allow the force of spring 410 to move the cover/door 210 toward the open position. See FIGS. 7B and 9B. As the cover/door 210 moved to the fully open position by operation of the link 450 coupled to the cam/disk 420 (and spring 410), the cam/disk 420 engages a cam/surface on the arm 440 to return the end/housing on the arm 440 to the elevated position (e.g. with the magnetic latch arrangement ready for re-engagement when the door is moved to the closed position). See FIGS. 7C-7E and 9C-9E.

As indicated schematically in FIGS. 8A-8E and 10A-10E, the cover/front door 210 can be moved from the open position to the closed position. As shown schematically, when the cover/door 210 is open relative to the base the cover/door will tend to remain open (e.g. by force of the spring 410). See FIGS. 8A and 10A. By application of an external force shown as the hand/finger (e.g. shown as hand H in FIG. 8B) of a vehicle occupant, the open door 210 is rotated/pushed (e.g. downward) toward the closed position (e.g. against the force of spring 410). See FIGS. 8B-8D and 10B-10D. As the cover/door 210 is moved to the fully closed position the housing with magnet M of the cover 210 engages the end/housing with magnet M on the arm 440 (e.g. in the elevated position) and the latch arrangement/mechanism (e.g. magnetic latch arrangement) is re-engaged to retain the door 210 in the closed position. See FIGS. 8E and 10E.

Referring to FIGS. 21A-21E, 22A-22E, 23A-23E and 24A-24E, operation of the front door assembly is shown schematically for a console assembly shown as floor console assembly 2000 according to an exemplary embodiment.

As indicated schematically in FIGS. 21A-21E and 22A-22E, the cover/front door can be moved from a closed position to an open position. As shown schematically, when the cover/door is closed the latch arrangement/mechanism is engaged and is intended to retain the cover/door in the closed position (e.g. closed relative to the base/bin against the force of the spring of the mechanism/assembly 2400); the end/housing of the arm 2440 of the latch mechanism is urged into an elevated position so that magnet M in the end/housing of the arm 2440 can engage magnet M in housing of the door; engagement of the magnet arrangement (e.g. magnetic attraction/force through each corresponding housing) retains the cover/door in the closed position relative to the base; post of the arm 2440 is disengaged from the latch mechanism shown as push-push latch 2080 (with latch base/receptor). See FIGS. 21A and 23A. By application of an external force shown as the hand/finger of a vehicle occupant, the closed door is rotated/pushed (e.g. downward) and the end/housing of arm 2440 is rotated/pushed toward the retracted position so that the post of the arm 2440 is engaged and latched with the latch mechanism shown as push-push latch 2080 (with latch base/receptor); the end/housing of arm 2440 of the latch mechanism with magnet M is rotated/translated into a retracted position; when the end/housing of the arm 2440 of the latch mechanism is in the retracted position the magnet M in the end/housing of the arm 2440 is moved out of complete engagement with magnet M in housing of cover/door (e.g. to reduce the magnetic attraction/force to disengage the latch arrangement) and as to allow the force of spring to move the cover/door toward the open position. See FIGS. 21B and 23B. The cover/door is moved to the fully open position by operation of the link 2450 coupled to the cam/disk 2420 (and spring); the arm 2440 is retained in the retracted position by the push-push latch 2080. See FIGS. 21C-21E and 23C-23E. As shown schematically in FIGS. 21E and 23E, when the cover/door is in the open position the post of the arm 2440 remains engaged with the push-push latch 2080 (with latch base/receptor) to retain the arm 2440 in the retracted position.

As indicated schematically in FIGS. 22A-22E and 24A-24E, the cover/front door can be moved from the open position to the closed position. As shown schematically, when the cover/door is open relative to the base the cover/door will tend to remain open (e.g. by force of the spring 410 as shown schematically in FIG. 7E); the post of the arm 2440 remains engaged with the push-push latch 2080 (with latch base/receptor) to retain the arm 2440 in the retracted position. See FIGS. 22A and 24A. By application of an external force shown as the hand/finger of a vehicle occupant, the open door is rotated/pushed (e.g. downward) toward the closed position (e.g. against the force of spring of the mechanism/assembly 2400). See FIGS. 22B-22C and 24B-24C. As the cover/door is moved toward and slightly past the fully closed position the housing with magnet M of the cover engages the end/housing with magnet M on the arm 2440 (which is in the retracted position); as the cover/door is moved (slightly) past the fully closed position the post of the arm 2440 disengages from the push-push latch 2080 (with latch base/receptor) to release the arm 2440 from the retracted position. See FIGS. 22D and 24D. As the external force is released from the cover/door and the arm 2440 moves to the elevated position, the magnet M of the cover engages the magnet M of the arm 2440 and the latch arrangement/mechanism (e.g. magnetic latch arrangement) is re-engaged to retain the door in the closed position. See FIGS. 22E and 24E. As shown schematically in FIGS. 22E and 24E, with the cover/door in the closed position the post of the arm 2440 is disengaged with the push-push latch 2080 (with latch base/receptor) and the arm 2440 is in the elevated position (e.g. actuated into the elevated position by the spring).

As shown schematically, in common use/operation by application of an external force (e.g. such as from hand H of a vehicle occupant) the cover/front door when in the closed position is able to be moved to the open position as indicated and when in the open position is able to be moved to the closed position. See e.g. FIGS. 2A-2D, 7A-7E and 8A-8E.

Operation of Rear Door of Console

Referring to FIGS. 11A-11F, 12A-12E, 13A-13F and 14A-14E, operation of the rear door assembly of the floor console assembly is shown schematically according to an exemplary embodiment. See also FIGS. 25A-25E, 26A-26E, 27A-27E and 28A-28E.

As indicated schematically in FIGS. 11A-11F and 13A-13F, the cover/rear door 310 can be moved from a closed position to an open position. As shown schematically, when the cover/door 310 is closed the latch arrangement/mechanism is engaged and is intended to retain the cover/door 310 in the closed position (e.g. closed relative to the base/bin 110 against the force of the spring 570); the projection/housing of the arm 540 of the latch mechanism is urged into an elevated position so that magnet M in the projection/housing of the arm 540 can engage magnet M in housing of the door 310; engagement of the magnet arrangement (e.g. magnetic attraction/force through each corresponding housing) retains the cover/door in the closed position relative to the base. See FIGS. 11A and 13A. By application of an external force shown as the hand/finger (e.g. shown as hand H in FIG. 11A) of a vehicle occupant, the closed door 310 is rotated/pushed (e.g. downward) and the projection/housing of arm 540 of the latch mechanism with magnet M is rotated/translated into a retracted position; when the projection/housing of the arm 540 of the latch mechanism is in the retracted position the magnet M in the projection/housing of the arm 540 is moved out of complete engagement with magnet M in housing of cover/door 310 (e.g. to reduce the magnetic attraction/force to disengage the latch arrangement) and as to allow the force of spring 570 with counterweights 560a and 560b to move the cover/door 310 toward the open position. See FIGS. 11B and 13B. As the cover/door 310 moved to the fully open position (e.g. by operation of the counterweights 560a/560b and spring 570), the cam surface of counterweight 560a engages a cam/surface on the arm 540 to return the projection/housing on the arm 440 to the elevated position (e.g. with the magnetic latch arrangement ready for re-engagement when the door is moved to the closed position). See FIGS. 11C-11F and 13C-13F.

As indicated schematically in FIGS. 12A-12E and 14A-14E, the cover/rear door 310 can be moved from the open position to the closed position. As shown schematically, when the cover/door 310 is open relative to the base the cover/door will tend to remain open (e.g. by force of the spring 570). See FIGS. 12A and 14A. By application of an external force shown as the hand/finger (e.g. shown as hand H in FIG. 12B) of a vehicle occupant, the open door 310 is rotated/pushed (e.g. downward) toward the closed position (e.g. against the force of spring 570). See FIGS. 12B-12D and 14B-14D. As the cover/door 310 moved to the fully closed position the housing with magnet M of the cover 310 engages the projection/housing with magnet M on the arm 540 (e.g. in the elevated position) and the latch arrangement/mechanism (e.g. magnetic latch arrangement) is re-engaged to retain the door 310 in the closed position. See FIGS. 12E and 14E.

Referring to FIGS. 25A-25F, 26A-26E, 27A-27F and 28A-28E, operation of the rear door assembly is shown schematically for a console assembly shown as floor console assembly 2000 according to an exemplary embodiment.

As indicated schematically in FIGS. 25A-25F and 27A-27F, the cover/rear door can be moved from a closed position to an open position. As shown schematically, when the cover/door is closed the latch arrangement/mechanism is engaged and is intended to retain the cover/door in the closed position (e.g. closed relative to the base/bin against the force of the spring of the mechanism/assembly 2500); the projection/housing of the arm 2540 of the latch mechanism is urged into an elevated position so that magnet M in the projection/housing of the arm 2540 can engage magnet M in housing of the door; engagement of the magnet arrangement (e.g. magnetic attraction/force through each corresponding housing) retains the cover/door in the closed position relative to the base; end/post of the arm 2540 is disengaged from the latch mechanism shown as push-push latch 2080 (with latch base/receptor). See FIGS. 25A and 27A. By application of an external force shown as the hand/finger of a vehicle occupant, the closed door is rotated/pushed (e.g. downward) and the projection/housing of arm 2540 is rotated/pushed toward the retracted position so that the end/post of the arm 2540 is engaged and latched with the latch mechanism shown as push-push latch 2080 (with latch base/receptor); the projection/housing of arm 2540 of the latch mechanism with magnet M is rotated/translated into a retracted position; when the projection/housing of the arm 2540 of the latch mechanism is in the retracted position the magnet M in the projection/housing of the arm 2540 is moved out of complete engagement with magnet M in housing of cover/door (e.g. to reduce the magnetic attraction/force to disengage the latch arrangement) and as to allow the force of spring to move the cover/door toward the open position. See FIGS. 25B and 27B. The cover/door is moved to the fully open position by operation of the mechanism/assembly 2500; the arm 2540 is retained by the push-push latch 2080 in the retracted position (e.g. with the push-push latch engaged to retain the end/post of the arm). See FIGS. 25C-25E and 27C-27E. As shown schematically in FIGS. 25F and 27F, with the cover door in the open position the end/post of the arm 2540 remains engaged with the push-push latch 2080 (with latch base/receptor) to retain the arm 2540 in the retracted position.

As indicated schematically in FIGS. 26A-26E and 28A-28E, the cover/front door can be moved from the open position to the closed position. As shown schematically, when the cover/door is open relative to the base the cover/door will tend to remain open (e.g. by force of the spring of the mechanism/assembly 2500); the end/post of the arm 2540 remains engaged with the push-push latch 2080 (with latch base/receptor) to retain the arm 2540 in the retracted position. See FIGS. 26A and 28A. By application of an external force shown as the hand/finger of a vehicle occupant, the open door is rotated/pushed (e.g. downward) toward the closed position (e.g. against the force of spring of the mechanism/assembly 2500). See FIGS. 26B-26C and 28B-28C. As the cover/door is moved toward and slightly past the fully closed position the housing with magnet M of the cover engages the projection/housing with magnet M on the arm 2540 (which is in the retracted position); as the cover/door is moved (slightly) past the fully closed position the end/post of the arm 2540 disengages from the push-push latch 2080 (with latch base/receptor) to release the arm 2540 from the retracted position. See FIGS. 26D and 28D. As the external force is released from the cover/door and the arm 2540 moves to the elevated position, the magnet M of the cover engages the magnet M of the arm 2540 and the latch arrangement/mechanism (e.g. magnetic latch arrangement) is re-engaged to retain the door in the closed position. See FIGS. 26E and 28E. As shown schematically in FIGS. 26E and 28E, the end/post of the arm 2540 is disengaged with the push-push latch 2080 (with latch base/receptor) and the arm 2540 is in the elevated position (e.g. actuated into the elevated position by a spring).

As shown schematically, in common use/operation by application of an external force (e.g. such as from hand H of a vehicle occupant) the cover/rear door when in the closed position is able to be moved to the open position as indicated and when in the open position is able to be moved to the closed position. See e.g. FIGS. 2A-2D, 11A-11F and 12A-12E.

Operation of Magnetic Latch Arrangement/Latch Mechanism

According to an exemplary embodiment shown schematically in FIGS. 35A-35E, 36A-36B and 37A-37E, the floor console assembly with a magnetic latch arrangement comprising magnet M installed on cover 4120 (e.g. in a housing on cover) and magnet M installed on arm 4130 (e.g. in a projection/housing on arm) of the mechanism/subassembly (shown partially) to operate the cover 4120. See also FIGS. 3 and 6A and 30A-34 (general schematic/representational views of floor console assembly with mechanism/assembly for cover/door). As shown schematically, the floor console assembly may comprise a latch arrangement 4200 for an arm configured to retain the arm of the mechanism/assembly in a retracted position for unlatching to enable the magnetic latch arrangement for the cover 4120 and base/arm 4110/4130 to disengage and the cover 4120 to separate from the base 4110 for opening; as indicated schematically, the arm 4130 is movable between an elevated position (e.g. against a stop 4134) and a retracted position (e.g. engaged with the latch arrangement 4200) coupled to a spring 4160 (shown schematically) tending to urge the arm 4130 toward the elevated position. See FIGS. 35A-35E and 37A-37F.

Figure 35A:
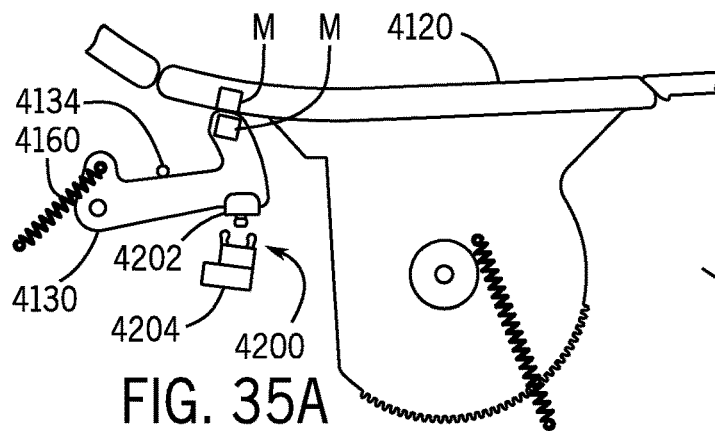
FIGS. 35A through 35E are schematic side views of the operation of a vehicle interior component shown as a console assembly according to an exemplary embodiment.
Figure 35B:
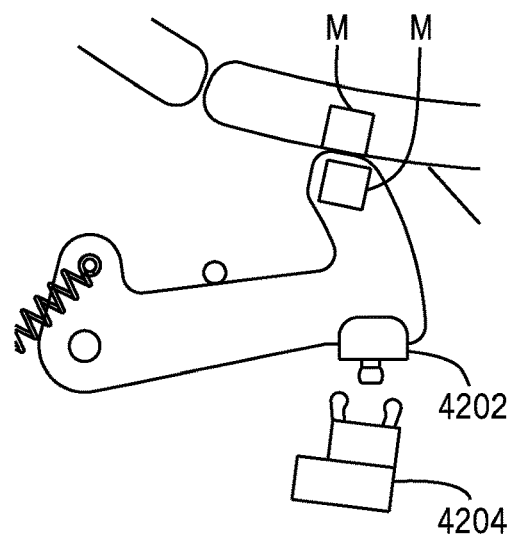
Figure 35C:
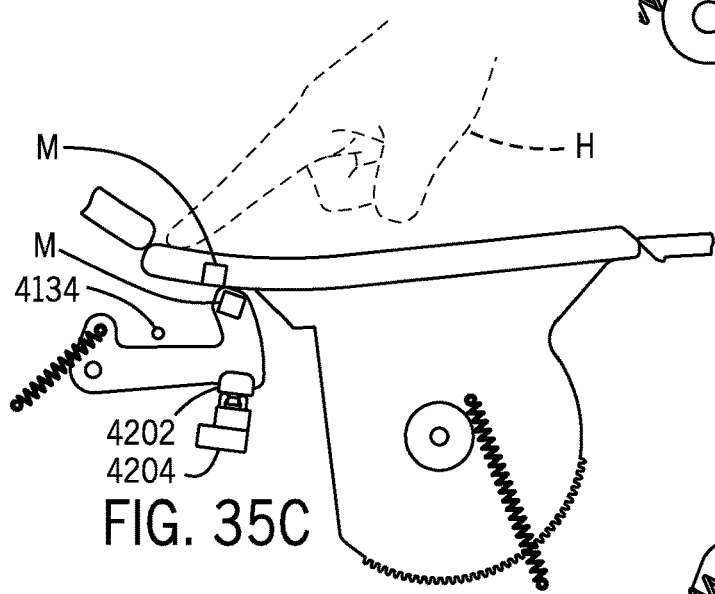
Figure 35D:
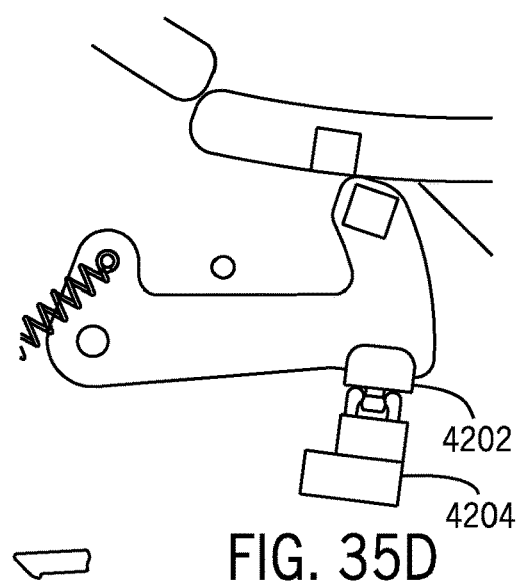
Figure 35E:
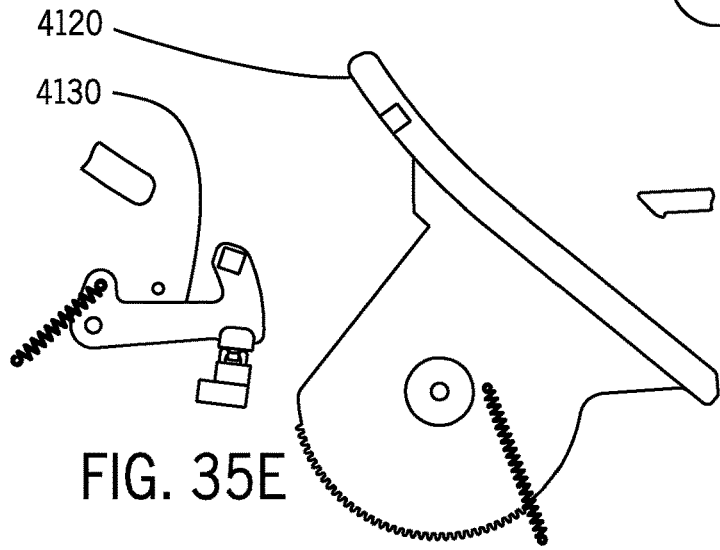
Figure 36A:
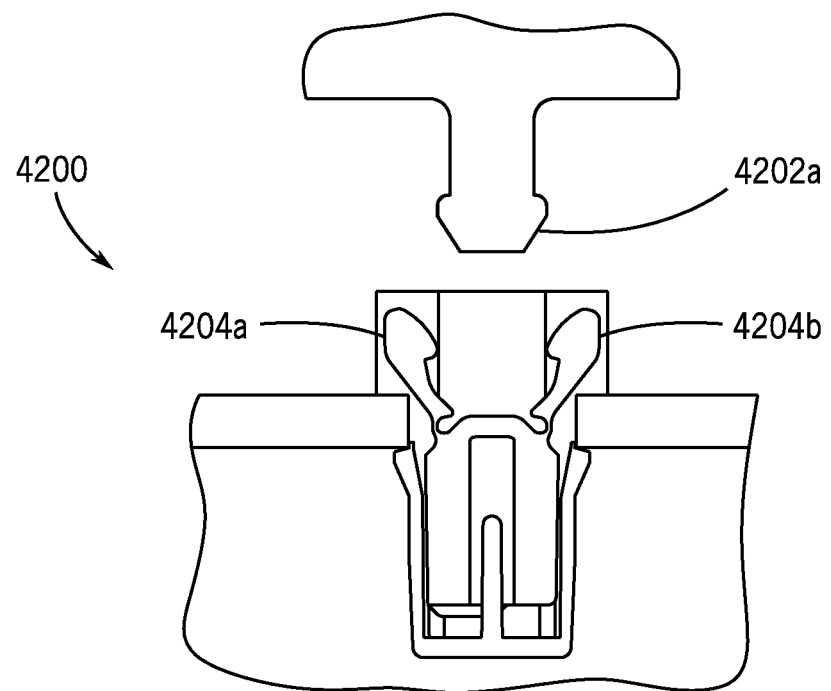
FIGS. 36A and 36B are schematic partial side views of a latch component of a vehicle interior component according to an exemplary embodiment.
Figure 36B:
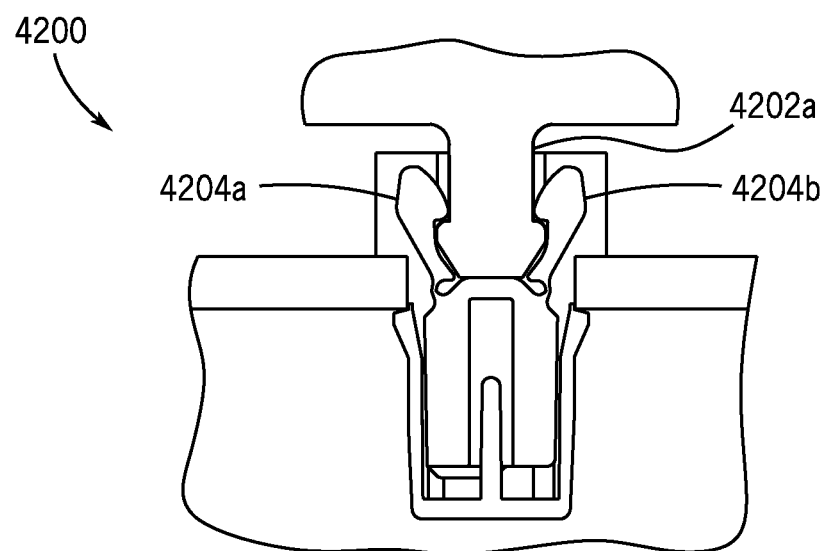
Figures 37A, 37B:
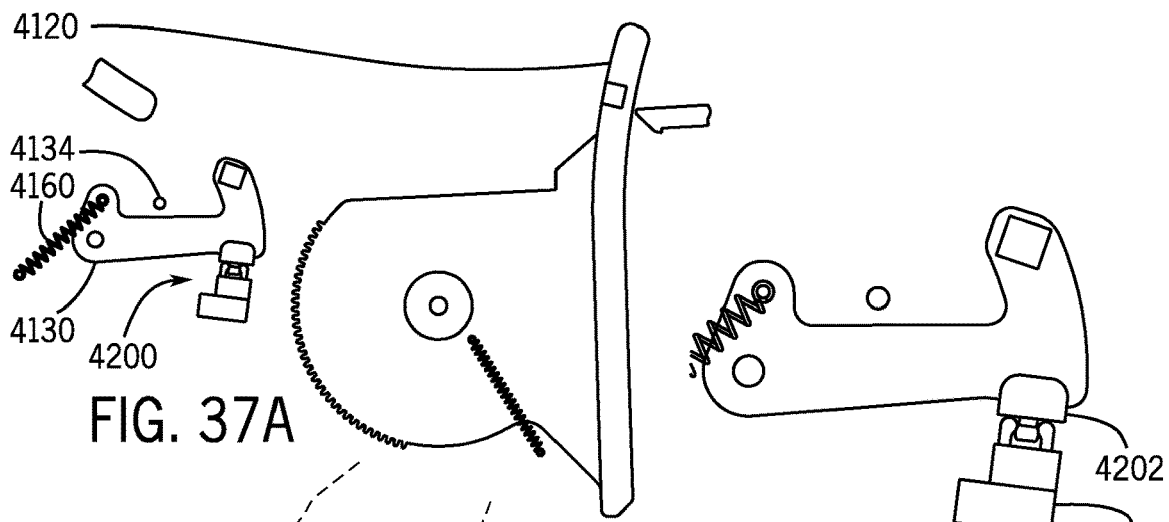
FIGS. 37A through 37F are schematic side views of the operation of a vehicle interior component shown as a console assembly according to an exemplary embodiment.
Figures 37C, 37D:
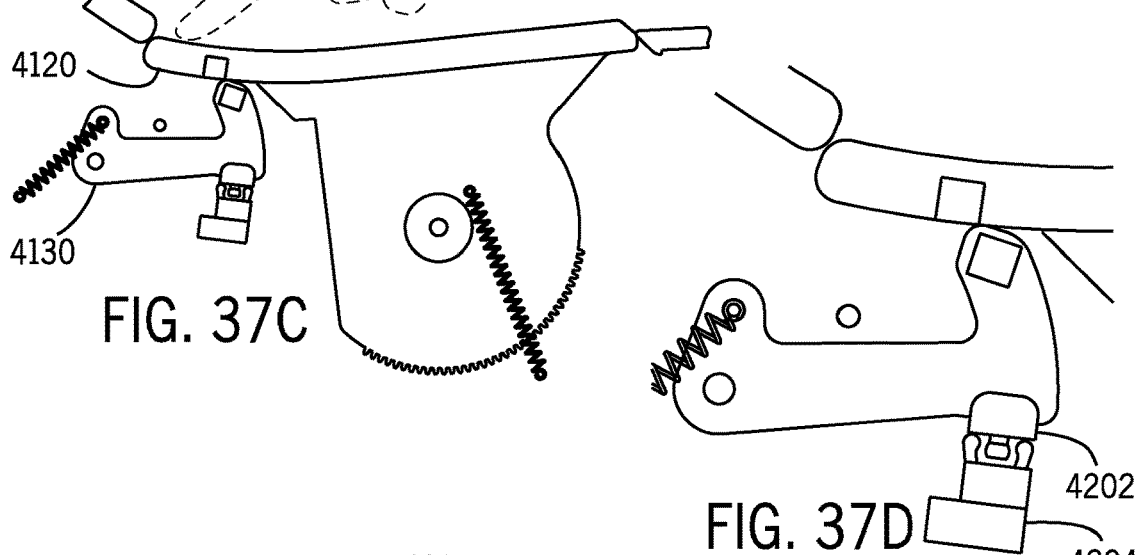
Figures 37E, 37F:
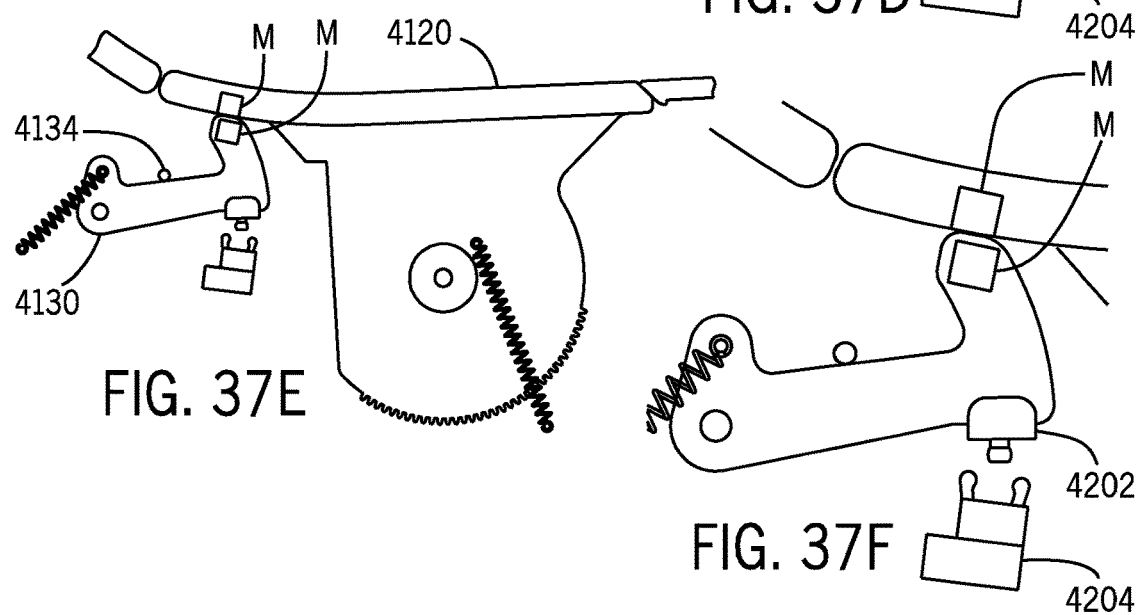

As shown schematically in FIGS. 35A-35E and 36A and 36B, according to an exemplary embodiment the latch arrangement 4200 for arm 4130 may comprise a push-push latch (e.g. of a conventional type); according to an exemplary embodiment, the push-push latch arrangement may comprise a base 4204 (e.g. latch receptor) providing a pocket with a retaining mechanism shown as grippers 4204a and 4204b into which a pin or plunger 4202 shown as post 4202a will be engaged. As shown in FIGS. 36A and 36B, when pin/post 4202a is separated from base 4204 the insertion of the pin/post 4202a into the base 4204 (e.g. pocket with grippers 4204a/4204b) will engage the latch mechanism to retain pin/post 4202a in base 4204 (e.g. latching action); when pin/post 4202a is retained in base 4204 then pushing on pin/post 4202a will cause base 4204 to release/disengage with pin/post 4202a (e.g. unlatching action). See also FIGS. 17-20 and 21A-E through 29A-29E (exemplary embodiment implementation of latch arrangement shown as push-push latch arrangement for arm of latch mechanism).

Referring to FIGS. 35A-35E a sequence of opening the cover from the base is shown schematically according to an exemplary embodiment. As shown, the cover 4120 is closed and the magnetic latch arrangement is engaged; the projection/housing with arm 4130 is in an elevated position (e.g. actuated by a spring and against a stop) and the latch arrangement 4200 for arm (e.g. push-push latch mechanism) is disengaged. See FIGS. 35A and 35B. To open the cover 4120 from the base an external force (shown as a downward force applied by the hand H of a vehicle operator) is applied to the cover 4120 which moves the projection/housing of the arm 4130 toward the retracted position (e.g. moved against the spring force) to disengage the magnetic latch arrangement (e.g. by shifting relative position of the magnets to effect a reduction in magnetic attraction/force between the magnets); the latch arrangement 4200 for arm (e.g. push-push latch mechanism) is engaged and the arm 4130 is retained in the retracted position. See FIGS. 35C and 35D. As shown in FIG. 35E, when the magnetic latch arrangement is disengaged and the latch arrangement 4200 is engaged (e.g. to keep the magnetic latch arrangement from re-engaging) the cover 4120 (e.g. by action of a spring) is urged to the open position.

Referring to FIGS. 37A-37E a sequence of closing the open cover relative to the base is shown schematically according to an exemplary embodiment. As shown, the cover 4120 is open and the magnetic latch arrangement is disengaged; the projection/housing with arm 4130 is in a retracted position with the latch arrangement 4200 for arm (e.g. push-push latch mechanism) is engaged (retained against the force of the spring 4160 actuating the arm). See FIGS. 37A and 37B. To close the cover 4120 from the base an external force (shown as a downward force applied by the hand H of a vehicle operator) is applied to the cover 4120 (e.g. against a force such as from a spring urging the door open) which moves the projection/housing of the arm 4130 toward the retracted position to disengage the latch arrangement 4200 (e.g. push-push latch arrangement); the latch arrangement 4200 for arm (e.g. push-push latch mechanism) is disengaged and the arm 4130 is moved (e.g. by the force of the spring) to the elevated position (e.g. against a stop 4134 ready for engagement of the magnetic latch arrangement). See FIGS. 35C-35D. As shown schematically in FIGS. 35E and 35F, when the external force (e.g. downward force) on the cover 4120 is released the arm 4130 is urged to the elevated position and magnetic latch arrangement is engaged to retain the cover to the base (while the latch arrangement 4200 remains disengaged).

Exemplary Embodiments—Latch Arrangement

Figure 30A:
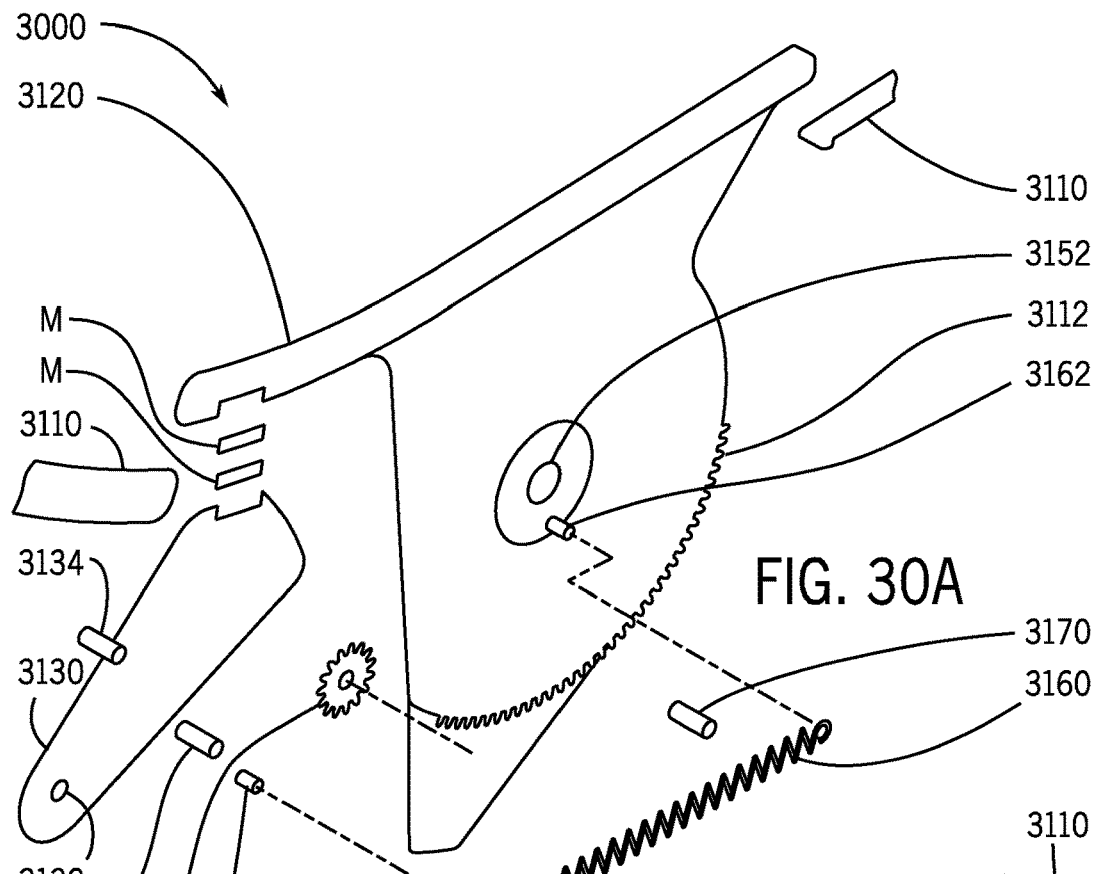
FIGS. 30A and 30B are schematic partial exploded views of components for a vehicle interior component according to an exemplary embodiment.
Figure 30B:
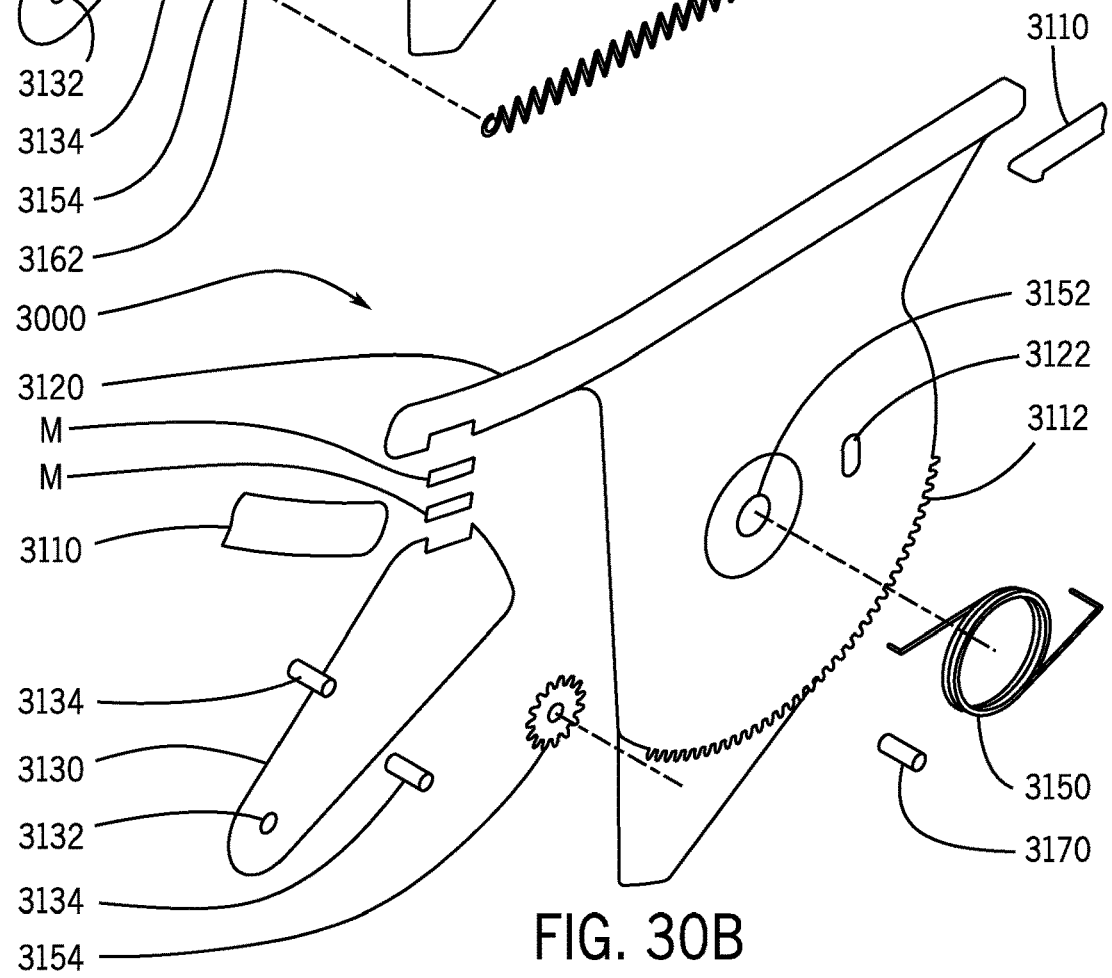
Figure 31A:
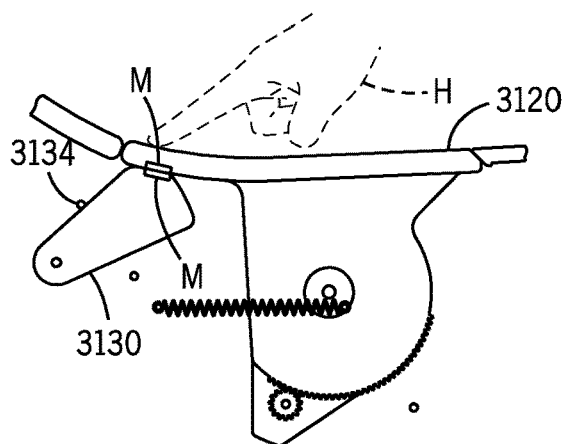
FIGS. 31A through 31F are schematic side views of the operation of a vehicle interior component shown as a console assembly according to an exemplary embodiment.
Figure 31B:
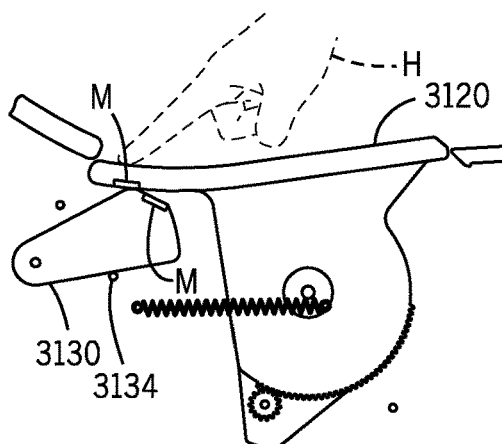
Figure 31C:
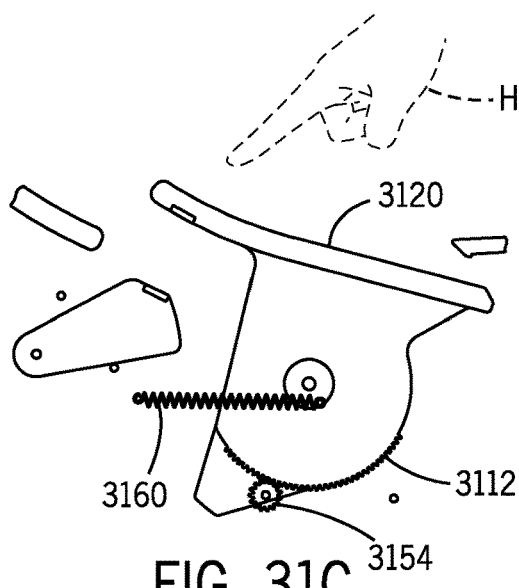
Figure 31D:
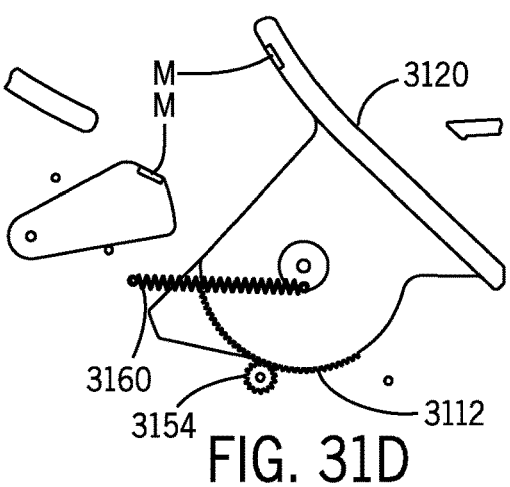
Figure 31E:
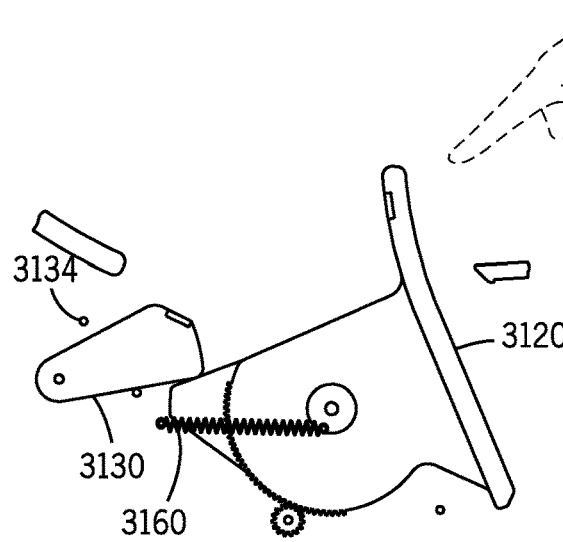
Figure 31F:
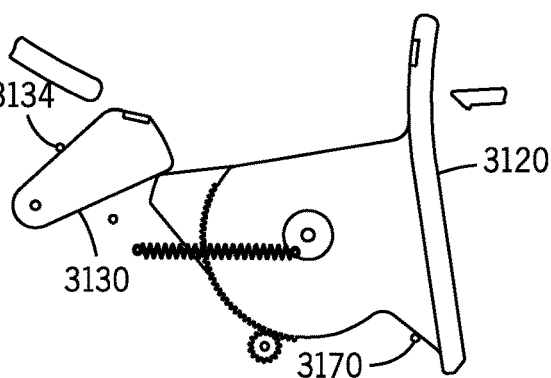
Figure 34:
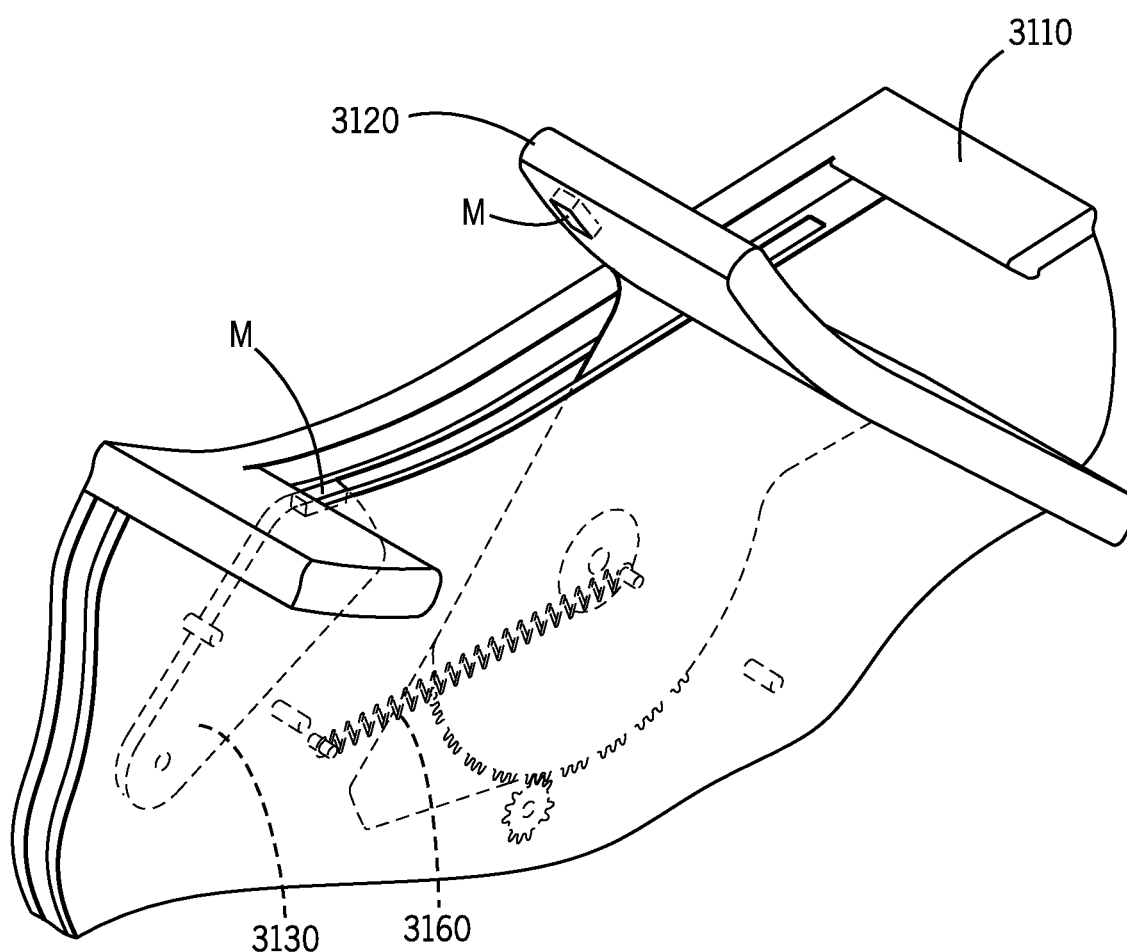
FIG. 34 is a schematic partial perspective view of a vehicle interior component shown as a console assembly according to an exemplary embodiment.

Referring to FIGS. 30A-30B and 34 according to an exemplary embodiment shown schematically, a floor console assembly 3000 may comprise a base 3110 (shown partially) (see also base 110 in FIG. 3) and a door 3120 configured to move between a closed position and an open position. According to an exemplary embodiment, door 3120 may be latched on to base 3110 by a magnet. As shown schematically in FIGS. 2A-2D, a vehicle occupant may push door 3120 inward (e.g. with hand H) to unlatch door 3120 from base 3110 (i.e. to disengage the magnet from base 3110). According to an exemplary embodiment, door 3120 may be spring-loaded to move towards the open position after door 3120 is unlatched from base 3110.

Figure 2A:
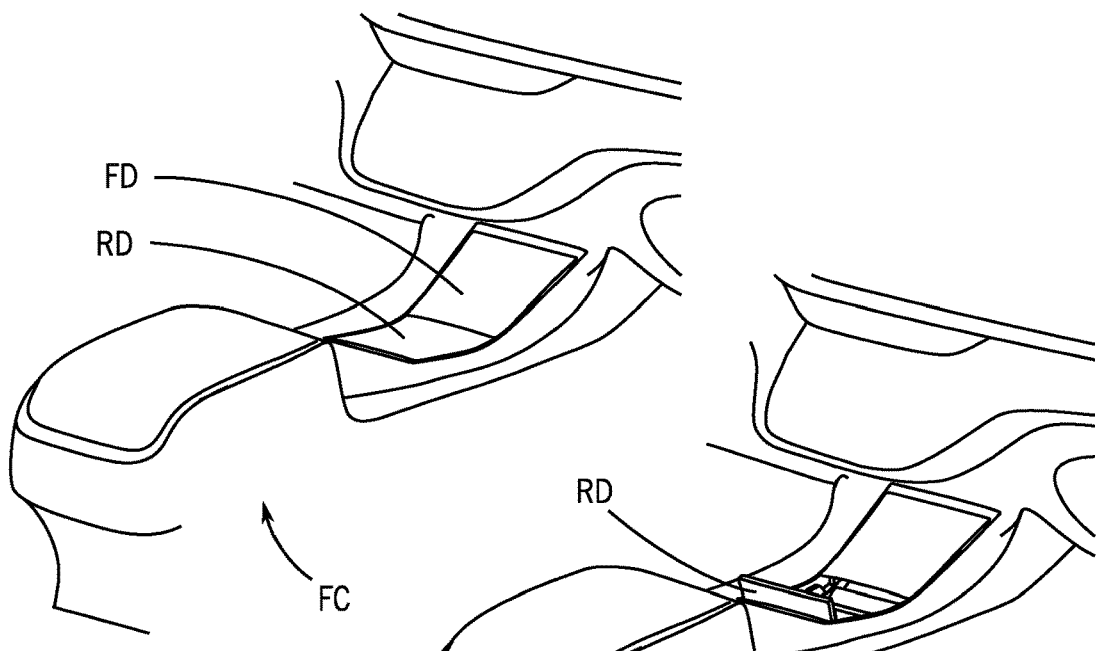
FIGS. 2A through 2D are schematic perspective views of a vehicle interior component shown as a console assembly according to an exemplary embodiment.
Figure 2B:
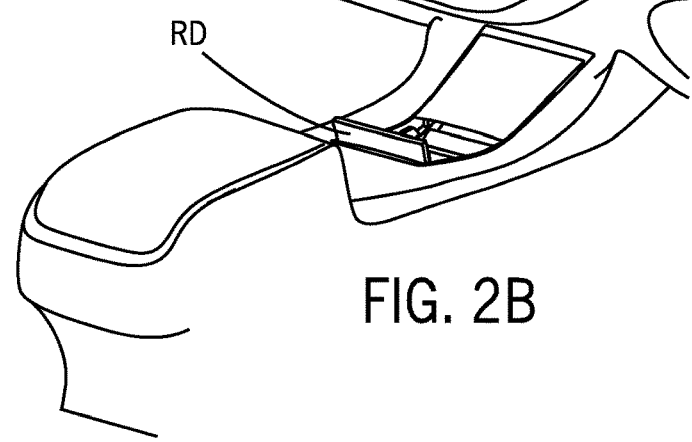
Figure 2C:
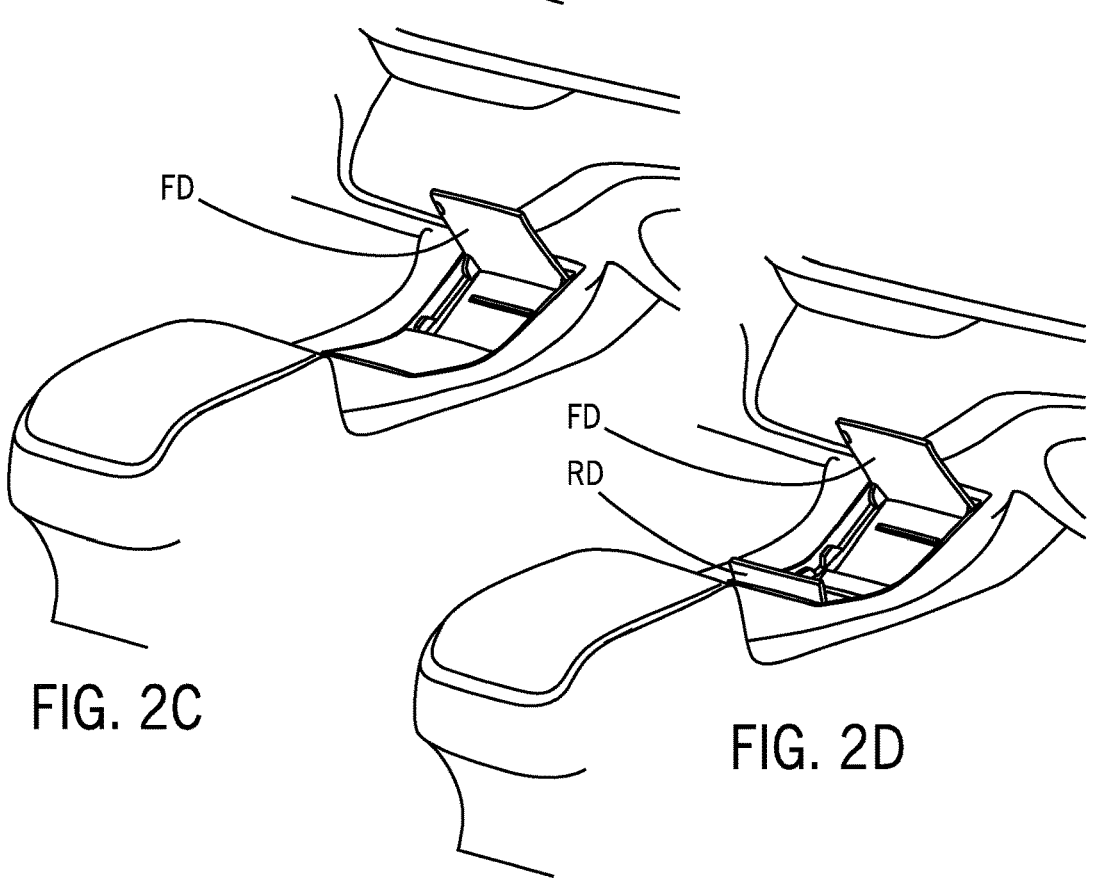
Figure 2D:
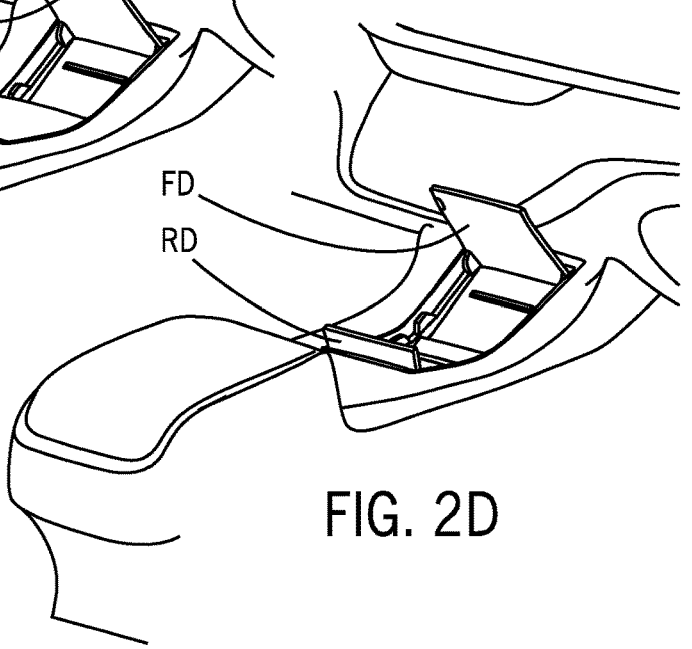

As shown schematically in FIG. 2C, door (shown as 3120 in FIGS. 30A and 30B and in FIG. 34) is partially open; door 3120 is configured to rotate towards the open position without input from a vehicle occupant after door 3120 is unlatched from base 3110. As shown schematically in FIG. 2D, door 3120 is at the open position.

As shown schematically in FIG. 30A, floor console assembly 3000 comprises a base 3110, a door 3120 and a cam 3130. As shown schematically in FIG. 30A, door 3120 is mounted on base 3110 by a pin 3152; door 3120 is configured to rotate around pin 3152 relative to base 3110. According to an exemplary embodiment, door 3120 is configured to move between a closed position and an open position. As shown schematically in FIG. 30A, door 3120 provides a magnet M; cam 3130 provides a magnet M; magnet M on door 3120 and magnet M on cam 3130 are configured to engage one another when door 3120 is at the closed position according to an exemplary embodiment. As shown schematically in FIG. 30A, cam 3130 is mounted on a pin 3132 on base 3110; cam 3130 is configured to pivot around pin 3132 according to an exemplary embodiment; base 3110 also provides a first stop 3134 (i.e. the top stop 3134 in FIG. 30A) and a second stop 3134 (i.e. the bottom stop 3134 in FIG. 30A) configured to constrain the range of motion of cam 3130 (i.e. between first stop 3134 and second stop 3134). As shown schematically in FIG. 30A, a first pin 3162 is mounted on base 3110; a second pin 3162 is mounted on door 3120; floor console 3000 also comprises a spring shown as an extension spring 3160. According to an exemplary embodiment, a first end of extension spring 3160 is attached to first pin 3162 on base 3110; a second end of extension spring 3160 is attached to second pin 3162 on door 3120. According to an exemplary embodiment, extension spring 3160 is configured to rotate door 3120 towards the open position.

As shown schematically in FIG. 30A, base 3110 provides a stop 3170. According to an exemplary embodiment, stop 3170 is configured to stop door 3120 at the open position (e.g. counter the tension from extension spring 3160). As shown schematically in FIG. 30A, floor console 3000 comprises a damper shown as a rotary damper 3154; door 3120 provides teeth 3112 configured to engage with rotary damper 3154. According to an exemplary embodiment, rotary damper 3154 is configured to provide a smooth motion for door 3120 between the closed position and the open position. See also FIG. 34.

As shown schematically in FIG. 30B, floor console assembly 3000 comprises base 3110, door 3120 and a cam 3130. As shown schematically in FIG. 30B, door 3120 is mounted on base 3110 by pin 3152; door 3120 is configured to rotate around pin 3152 relative to base 3110. According to an exemplary embodiment, door 3120 is configured to move between a closed position and an open position. As shown schematically in FIG. 30B, door 3120 provides a magnet M; cam 3130 provides a magnet M; magnet M on door 3120 and magnet M on cam 3130 are configured to engage one another when door 3120 is at the closed position according to an exemplary embodiment. As shown schematically in FIG. 30B, cam 3130 is mounted on a pin 3132 on base 3110; cam 3130 is configured to pivot around pin 3132 according to an exemplary embodiment; base 3110 also provides a first stop 3134 (i.e. the top stop 3134 in FIG. 30B) and a second stop 3134 (i.e. the bottom stop 3134 in FIG. 30B) configured to constrain the range of motion of cam 3130 (i.e. between first stop 3134 and second stop 3134). As shown schematically in FIG. 30B, a spring shown as a torsion spring 3150 is mounted at pin 3152; a first end of torsion spring 3150 is mounted on base 3110; a second end of torsion spring 3150 is mounted on a slot 3122 provided in door 3120. According to an exemplary embodiment, torsion spring 3150 is configured to provide torque at pin 3152 to rotate door 3120 towards the open position. According to an exemplary embodiment, floor console 3100 may utilize torsion spring 3150 and extension spring 3160 to provide torque at pin 3152 to rotate door 3120; floor console 3100 may utilize torsion spring 3150 or extension spring 3160 to provide torque at pin 3152 to rotate door 3120. As shown schematically in FIG. 30B, base 3110 provides a stop 3170. According to an exemplary embodiment, stop 3170 is configured to stop door 3120 at the open position (e.g. counter the tension from torsion spring 3150). As shown schematically in FIG. 30B, floor console 3000 comprises a damper shown as rotary damper 3111; door 3120 provides teeth 3112 configured to engage with rotary damper 3154. According to an exemplary embodiment, rotary damper 3154 is configured to provide a smooth motion for door 3120 between the closed position and the open position.

As shown schematically in FIGS. 31A to 31F, door 3120 moves from the closed position to the open position. As shown schematically in FIG. 31A, door 3120 is at the closed position; magnet M on door 3120 and magnet M on cam 3130 are engaged to keep door 3120 at the closed position; cam 3130 is engaged with first stop 3134. As shown schematically in FIG. 31B, a vehicle occupant pushes on door 3120 (e.g. with hand H) to disengage magnet M on door 3120 and magnet M on cam 3120; cam 3130 is engaged with second stop 3134. As shown schematically in FIGS. 31C and 31D, door 3120 is partially open; extension spring 3160 progressively shortens to pull door 3120 towards the open position; rotary damper 3154 is engaged with teeth 3112 on door 3120. According to an exemplary embodiment, rotary damper 3154 is configured to provide a smooth motion for door 3120 as door 3120 moves between the closed position and the open position. As shown schematically in FIG. 31E, door 3120 is partially open; door 3120 engages with cam 3130; cam 3130 is pushed towards first stop 3134. As shown schematically in FIG. 31F, door 3120 is at the open position; door 3120 engages with stop 3170; cam 3130 engages with first stop 3134.

As shown schematically in FIGS. 32A to 32F, door 3120 moves from the open position to the closed position. As shown schematically in FIG. 32A, door 3120 is at the open position. As shown schematically in FIGS. 32B to 32D, a vehicle occupant pushes door 3120 (e.g. with hand H) towards the closed position; extension spring 3160 is progressively elongated. As shown schematically in FIG. 32E, the distance between magnet M on door 3120 and magnet M on cam 3130 is in proximity to provide magnetic force (e.g. magnetic attraction) to pull door 3120 towards the closed position. See also FIG. 34. As shown schematically in FIG. 32F, magnet M on door 3120 and magnet M on cam 3130 are engaged with one another (e.g. by magnetic attraction); door 3120 is at the closed position.

As shown schematically in FIGS. 32A to 32F, door 3120 moves from the open position to the closed position. As shown schematically in FIG. 32A, door 3120 is at the open position. As shown schematically in FIGS. 32B to 32D, a vehicle occupant pushes door 3120 (e.g. with hand H) towards the closed position; extension spring 3160 is progressively elongated. As shown schematically in FIG. 32E, the distance between magnet M on door 3120 and magnet M on cam 3130 is in proximity to provide magnetic force (e.g. magnetic attraction) to pull door 3120 towards the closed position. See also FIG. 34. As shown schematically in FIG. 32F, magnet M on door 3120 and magnet M on cam 3130 are engaged with one another (e.g. by magnetic attraction); door 3120 is at the closed position.

As shown schematically in FIGS. 33A to 33F, door 3120 moves from the closed position to the open position (e.g. by external force from the fingers/hand of a vehicle occupant). As shown schematically in FIGS. 33A to 33F, the floor console provides a space/slot configured to facilitate movement of door 3120 between the closed position and the open position (e.g. space for fingers of vehicle occupant).

Figure 33A:
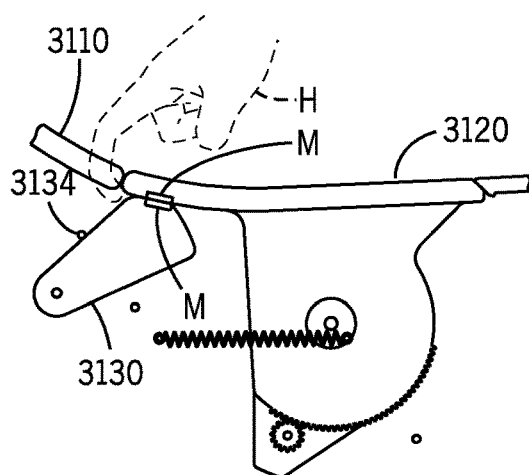
FIGS. 33A through 33F are schematic side views of the operation of a vehicle interior component shown as a console assembly according to an exemplary embodiment.
Figure 33B:
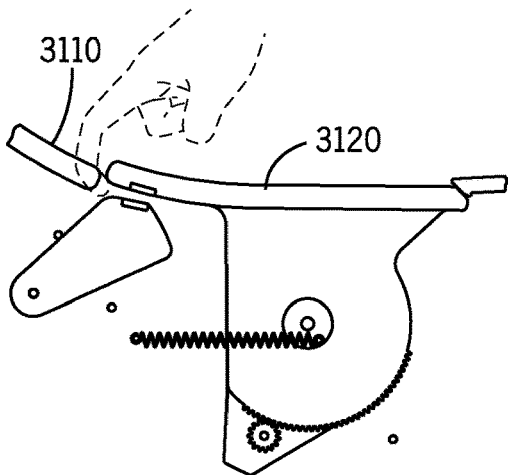
Figure 33C:
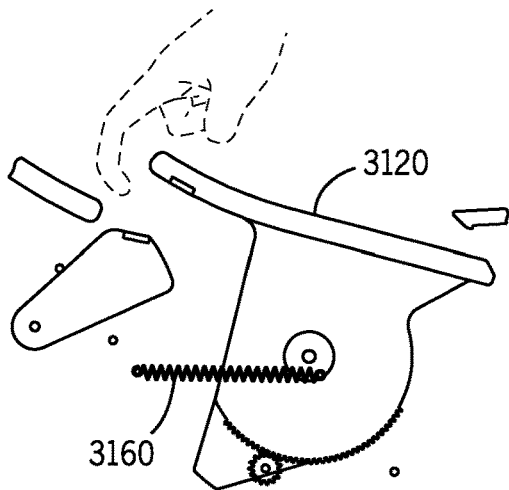
Figure 33D:
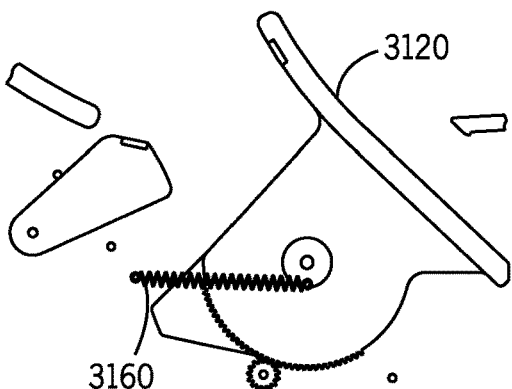
Figure 33E:
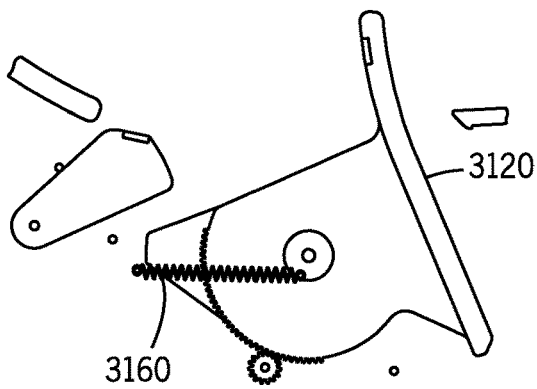
Figure 33F:
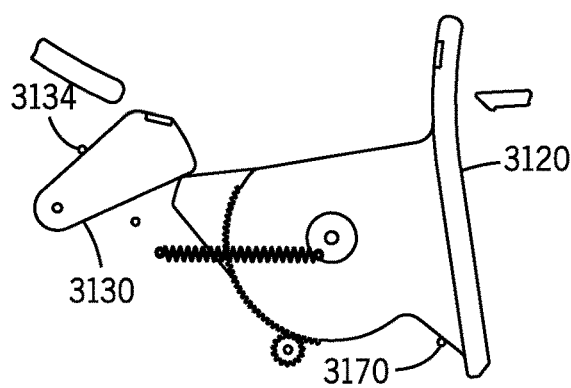

As shown schematically in FIG. 33A, door 3120 is at the closed position; magnet M on door 3120 and magnet M on cam 3130 are engaged to keep door 3120 at the closed position; cam 3130 is engaged with first stop 3134. As shown schematically in FIG. 33B, a vehicle occupant pulls door 3120 to disengage magnet M on door 3120 and magnet M on cam 3130 (e.g. hand H fits through slot on the floor console to grip door 3120). As shown schematically in FIGS. 33C and 33E, door 3120 is partially open; extension spring 3160 progressively shortens to pull door 3120 towards the open position. As shown schematically in FIG. 33E, door 3120 is partially open; door 3120 engages with cam 3130. As shown schematically in FIG. 33F, door 3120 is at the open position; door 3120 engages with stop 3170; cam 3130 engages with first stop 3134.

Figure 32A:
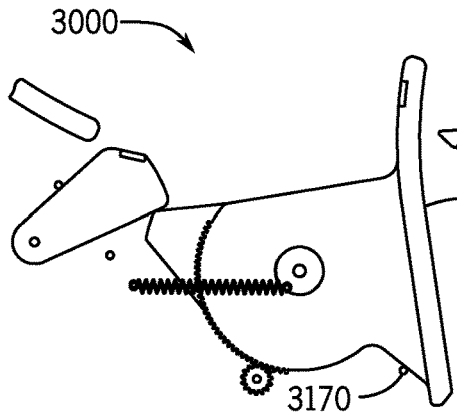
FIGS. 32A through 32F are schematic side views of the operation of a vehicle interior component shown as a console assembly according to an exemplary embodiment.
Figure 32B:
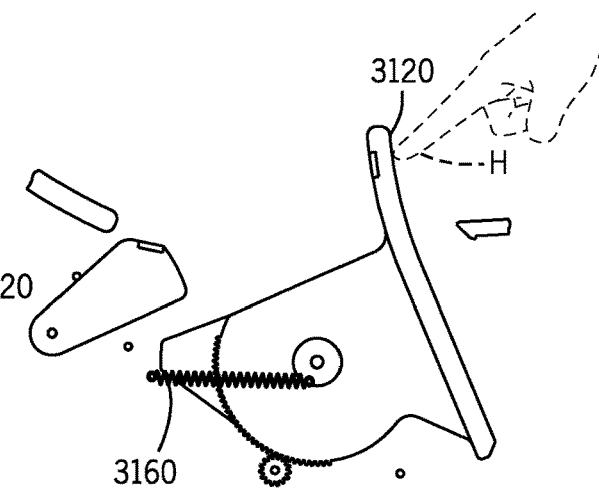
Figure 32C:
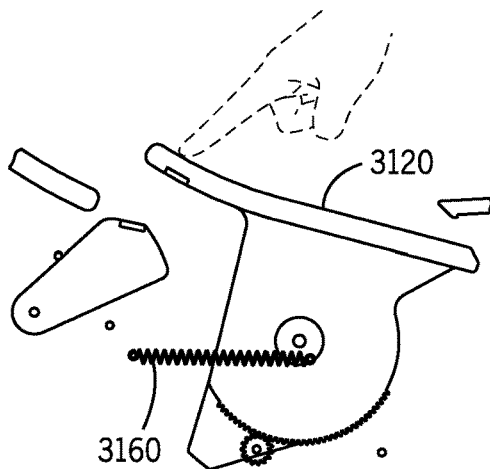
Figure 32D:
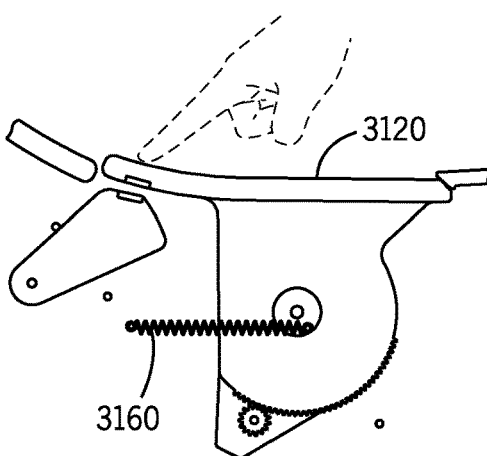
Figure 32E:
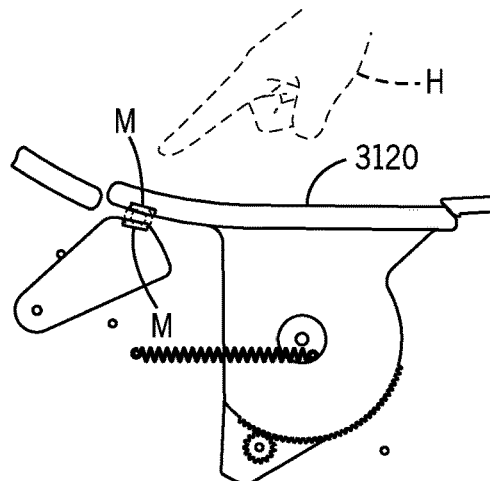

As shown schematically in FIG. 32E, door 3120 is near the closed position; magnet M on door 3120 and magnet M on cam 3130 are in proximity to establish a magnetic attraction (i.e. a magnetic force between the magnet M on door 3120 and magnet M on cam 3130 to overcome the spring force to open door 3120) to pull door 3120 towards the closed position. (As indicated schematically in FIGS. 2A-2D and 34, the door may also be retained against movement by friction force, interference fit for other mechanical engagement/component.) According to an exemplary embodiment, components shown as magnet M on door 3120 and magnet M on cam 3130 may be made from any material that is a permanent magnet and/or any material that can be magnetized. According to an exemplary embodiment, the component identified as magnet M on door 3120 and magnet M on cam 3130 may be formed or constructed of materials that will establish a complementary magnetic attraction as indicated schematically in FIGS. 32E and 32F. For example, the set or pair of components identified as magnets may be a pair of magnetic material and magnetic metal as to establish the arrangement indicated in FIGS. 31A to 31F, 32A to 32F, and 33A to 33F. See also FIG. 34. According to an exemplary embodiment, magnetic materials may include ferromagnetic materials, paramagnetic materials and/or diamagnetic materials in a complementary form. See FIG. 34.

Figure 32F:
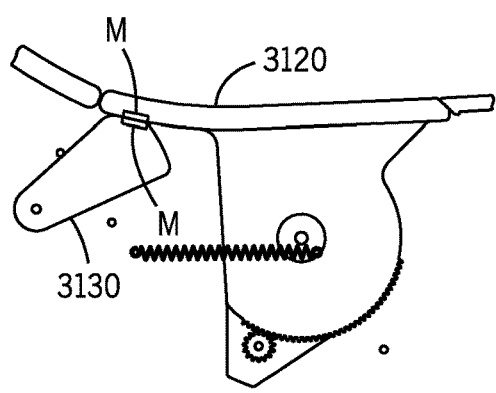

According to an exemplary embodiment, the set of components could comprise elements in a variety of forms, shapes and/or configurations. For example, the components may comprise a paired set of materials or other complementary forms (e.g. a plate, a member, engaging surfaces, etc.) to establish magnetic attraction as indicated in FIGS. 32E and 32F. According to an exemplary embodiment, the door 3120 is magnetically secured/attached (e.g. by magnetic attraction/field) to the base 3110. See FIG. 34.

As shown schematically in FIG. 34, the floor console comprises a base 3110, a door 3120 and a cam 3130. As shown schematically in FIG. 34, door 3120 provides a magnet M; cam 3130 provides a magnet M. According to an exemplary embodiment, magnet M on door 3120 and magnet M on cam 3130 are configured to provide a magnetic force to keep door 3120 latched to base 3110 when door 3120 is at the closed position. As shown schematically in FIG. 34, floor console 3100 comprises a spring shown as extension spring 3160 configured to retract/shorten as door 3120 moves from the closed position to the open position. According to an exemplary embodiment, the magnetic force between magnet M on door 3120 and magnet M on cam 3130 at the closed position is sufficient to overcome the force provided by extension spring 3160 (i.e. to keep door 3120 at the closed position).

Exemplary Embodiments—Console Structure and Function

According to an exemplary embodiment, a vehicle interior component shown as a console assembly providing a console may be configured to be operated by application of an external force from an occupant; the console assembly (shown as a floor console assembly) may comprise (a) a base providing a compartment; (b) a cover movable from a closed position to an open position relative to the opening of the base; and (c) a latch mechanism comprising an arm providing a latch feature configured to secure the cover to the base. The cover may comprise a latch feature; the arm may be configured for movement relative to the base between (1) an elevated position for the latch feature of the arm to engage the latch feature of the cover to secure the cover to the base and (2) a retracted position for the latch feature of the arm to disengage the latch feature of the cover to release the cover from the base. See e.g. FIGS. 2A-2D, 3-5, 6A, 15A-15B, 17, 20, 29A-29B and 30A-30B.

According to an exemplary embodiment, the arm may be pivotally coupled to the base; the latch mechanism may comprise a magnet system; the magnet system may comprise a set of magnets. See e.g. FIGS. 3-5, 6A-6B, 15A-15B, 20, 29A-29B, 30A-30B and 34. According to an exemplary embodiment, the latch feature of the arm may comprise at least one magnet and the latch feature of the cover may comprise at least one magnet; the latch feature of the arm may comprise a magnet and the latch feature of the cover may comprise a magnet; the latch to retain the arm in the retracted position may comprise a push-push latch; the latch mechanism may comprise a stop for the arm at the retracted position. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the arm rotates relative to the base between a stop at the retracted position and a stop at the elevated position.

According to an exemplary embodiment, the latch mechanism may comprise a spring configured to retain the arm in the elevated position; the latch mechanism may comprise a latch to retain the arm in the retracted position. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment, the base may comprise an opening; the arm may be configured to extend through the opening of the base to engage the cover to secure the cover to the base; the arm may extend through a slot to present the latch feature of the arm to engage the latch feature of the cover; the opening may comprise a slot; the slot may be provided in a side wall of the base. See e.g. FIGS. 2A-2D, 3-5, 6A, 15A-15B, 17, 20, 29A-29B and 30A-30B.

According to an exemplary embodiment, the console may comprise a mechanism configured to actuate movement of the cover from the closed position to the open position; the mechanism to actuate movement of the cover may comprise a spring; the mechanism to actuate movement of the cover may be configured to move the arm from the retracted position; the mechanism to actuate movement of the cover may be configured to engage the latch mechanism to move the arm from the retracted position as the cover may be moved to the open position. See e.g. FIGS. 2A-2D, 3-5, 6A, 15A-15B, 17, 20, 29A-29B and 30A-30B. According to an exemplary embodiment, the mechanism to actuate movement of the cover may comprise a cam surface configured to engage a surface on the arm of the latch mechanism; the mechanism to actuate movement of the cover may comprise a cam surface configured to engage the arm of the latch mechanism; the mechanism to actuate movement of the cover may comprise a counterweight; the cover may be moved from the closed position by application of the external force to move the arm of the latch mechanism from the elevated position to the retracted position; the cover may be moved to the open position by the mechanism to actuate movement of the cover upon release of the external force; the cover may comprise a door.

According to an exemplary embodiment, the cover of the console may comprise a set of opposing doors; the set of opposing doors may comprise a front door and a rear door; the front door may comprise the latch mechanism; the set of opposing doors may comprise a front door and a rear door; the latch mechanism may comprise a latch mechanism for the front door and a latch mechanism for the rear door. See e.g. FIGS. 2A-2D, 3-5, 6A, 15A-15B, 17, 20, 29A-29B and 30A-30B. According to an exemplary embodiment, the cover may comprise a first door and a second door; the latch mechanism may comprise a latch mechanism for the first door comprising an arm and a latch mechanism for the second door comprising an arm. According to an exemplary embodiment, the console may comprise a mechanism to actuate movement of the first door relative to the base and a mechanism to actuate movement of the second door relative to the base.

According to an exemplary embodiment, the mechanism to actuate movement of the cover may comprise the mechanism to actuate movement of the first door; the mechanism to actuate movement of the second door may comprise a spring and an arm; the spring of the mechanism to actuate movement of the second door may be configured to move the door toward the open position. See e.g. FIGS. 2A-2D, 3-5, 6A, 15A-15B, 17, 20, 29A-29B and 30A-30B.

According to an exemplary embodiment, the arm of the latch mechanism of the first door may be pivotally coupled to the base; the arm of the latch mechanism of the first door may be pivotally coupled to the base at a hinge; the arm of the latch mechanism of the second door may be pivotally coupled to the base; the arm of the latch mechanism of the second door may be pivotally coupled to the base at the hinge; the arm of the latch mechanism of the second door may comprise a counterweight. See e.g. FIGS. 2A-2D, 3-5, 6A, 15A-15B, 17, 20, 29A-29B and 30A-30B.

According to an exemplary embodiment, the latch mechanism for the second door may comprise a spring to retain the arm in the elevated position; the latch mechanism for the first door may comprise a latch to retain the arm in the retracted position; the latch mechanism for the second door may comprise a latch to retain the arm in the retracted position; the latch mechanism for the first door may comprise a push-push latch to retain the arm in the retracted position; the latch mechanism for the second door may comprise a push-push latch to retain the arm in the retracted position. See e.g. FIGS. 3-5, 6A-6B, 15A-15B, 20, 29A-29B, 30A-30B and 34. According to an exemplary embodiment, the arm of the latch mechanism for the second door may be moved to the elevated position as the second door may be moved toward the open position. According to an exemplary embodiment, the mechanism to actuate the second door further may comprise a cam; the arm of the latch mechanism for the second door couples the second door to the cam. See e.g. FIGS. 2A-2D, 3-5, 6A, 15A-15B, 17, 20, 29A-29B and 30A-30B.

According to an exemplary embodiment, the console may comprise a tray configured to fit in the storage compartment; the tray may be coupled (e.g. by a mounting or hinge) under the cover; the tray may be moveable relative to the base. See FIGS. 2A-2D and 3. According to an exemplary embodiment, the second door may be pivotally coupled to the base at a hinge; the tray may be pivotally coupled to the base at the hinge.

According to an exemplary embodiment, the base may comprise a structure comprising a first sidewall and a second sidewall to define the compartment and the latch mechanism may be installed at the first sidewall. See e.g. FIGS. 2A-2D, 3-5, 6A, 15A-15B, 17, 20, 29A-29B and 30A-30B.

According to an exemplary embodiment, the cover may be opened from the base by application of the external force on the cover; the cover may be opened from the base by application of the external force to move the arm of the latch mechanism to the retracted position; the cover may be opened from the base by application of the external force downward on the cover to move the arm of the latch to the retracted position. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the cover may be pivotally coupled to the base. According to an exemplary embodiment, the mechanism to actuate movement of the cover may comprise a damper mechanism.

According to an exemplary embodiment, the latch feature of the arm may comprise a magnet and the latch feature of the cover may comprise a magnet; (1) the magnet of the arm may engage by magnetic attraction the magnet of the cover when the arm is in the elevated position and the cover is in the closed position and (2) the magnet of the arm may disengage from magnetic attraction with the magnet of the cover as the arm is moved to the retracted position. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the magnet of the arm may be installed in the arm and the magnet of the cover may be installed in the cover so that the magnet of the arm indirectly engages the magnet of the cover. See e.g. FIGS. 3-5, 6A-6B, 15A-15B, 20, 29A-29B, 30A-30B and 34.

According to an exemplary embodiment as shown schematically, a vehicle interior component such as a console assembly may be provided in a form configured to be operated by application of an external force from an occupant comprising: (a) a base providing a compartment; (b) a cover movable relative to the base from a closed position to an open position; and (c) a latch mechanism comprising an arm providing a latch feature configured to secure the cover to the base. See e.g. FIGS. 2A-2D, 3-5, 6A, 15A-15B, 17, 20, 29A-29B and 30A-30B. The cover may comprise a latch feature; the arm may be configured for movement relative to the base between (1) an elevated position for the latch feature of the arm to engage the latch feature of the cover to secure the cover to the base and (2) a retracted position for the latch feature of the arm to disengage the latch feature of the cover to release the cover from the base. See e.g. FIGS. 15A-15B, 17, 20, 29A-29B and 30A-30B. The arm may be pivotally coupled to the base. The latch feature of the arm may comprise at least one magnet; the latch feature of the arm may comprise an element of a material configured to be retained by at least one magnet; and the latch feature of the cover may comprise at least one magnet; a magnet of the arm may be installed in the arm and a magnet of the cover may be installed in the cover so that the magnet of the arm engages the magnet of the cover when the cover is in the closed position. See e.g. FIGS. 3-5, 6A-6B, 15A-15B, 20, 29A-29B, 30A-30B and 34. The arm may be configured to rotate relative to the base between a stop at the retracted position and a stop at the elevated position. See e.g. FIGS. 3, 7A-7E, 8A-8E, 11A-11F and 12A-12E, 17, 23A-23E, 24A-24E, 27A-27F, 28A-28E, 30A-30B and 37A-37E. The latch mechanism may comprise a spring configured to retain the arm in the elevated position. The latch mechanism may comprise a push-push latch to retain the arm in the retracted position. See e.g. FIGS. 29A-29B, 35A-35E, 36A-36B and 37A-37F.

The base may comprise an opening; the arm may be configured to extend through the opening of the base to engage the cover to secure the cover to the base. See e.g. FIGS. 2A-2D, 3-5, 6A, 15A-15B, 17, 20, 29A-29B and 30A-30B. The opening may comprise a slot; the slot may be provided in a sidewall of the base. The arm may project at least partially through the slot when in the elevated position to present the latch feature of the arm to engage the latch feature of the cover; the arm may retract at least partially into the slot when in the retracted position. See e.g. FIGS. 3, 7A-7E, 8A-8E, 11A-11F and 12A-12E, 17, 23A-23E, 24A-24E, 27A-27F, 28A-28E, 30A-30B and 37A-37E.

The component may comprise a mechanism configured to actuate movement of the cover from the closed position to the open position; the mechanism to actuate movement of the cover may comprise a spring; the mechanism to actuate movement of the cover may be configured to engage the latch mechanism to move the arm from the retracted position as the cover is moved to the open position; the mechanism to actuate movement of the cover may comprise a cam surface configured to engage the arm of the latch mechanism; the mechanism to actuate movement of the cover may comprise a counterweight. The mechanism to actuate movement of the cover may be configured so that when the cover is moved from the closed position by application of the external force the arm of the latch mechanism is moved from the elevated position to the retracted position. See e.g. FIGS. 2A-2D, 3-5, 6A, 15A-15B, 17, 20, 29A-29B and 30A-30B. The mechanism to actuate movement of the cover may be configured to move the cover to the open position upon release of the external force from the cover. The cover may comprise a door on a hinge. The mechanism to actuate movement of the cover may comprise a cam; the cam may be configured to engage the arm of the latch mechanism to move the arm to the elevated position during movement of the cover to the open position. The mechanism to actuate movement of the cover may comprise a link arm coupled to a disk providing the cam and a spring coupled to the disk; the link arm may be coupled to the cover to move the cover to the open position. See e.g. FIGS. 3, 7A-7E, 8A-8E, 11A-11F and 12A-12E, 17, 23A-23E, 24A-24E, 27A-27F, 28A-28E, 30A-30B and 37A-37E. A tray may be configured to fit in the storage compartment; the tray may be installed within the base under the cover; the tray may be configured for movement relative to the base. The base may comprise a structure comprising a first sidewall and a second sidewall to define the compartment and the latch mechanism is installed at the first sidewall. See e.g. FIGS. 3-5, 6A-6B, 15A-15B, 20, 29A-29B, 30A-30B and 34. The mechanism to actuate movement of the cover may comprise a damper mechanism.

The latch feature of the arm may comprise a magnet and the latch feature of the cover may comprise a magnet; and (1) the magnet of the arm may engage by magnetic attraction the magnet of the cover when the arm is in the elevated position and the cover is in the closed position and (2) the magnet of the arm may disengage from magnetic attraction with the magnet of the cover as the arm is moved to the retracted position. See e.g. FIGS. 3, 7A-7E, 8A-8E, 11A-11F and 12A-12E, 17, 23A-23E, 24A-24E, 27A-27F, 28A-28E, 30A-30B and 37A-37E. The cover may comprise a set of opposing doors; the set of opposing doors may comprise a front door and a rear door; the latch mechanism may comprise a latch mechanism for the front door and a latch mechanism for the rear door. The cover may comprise a first door and a second door; the latch mechanism may comprise a latch mechanism for the first door comprising an arm and a latch mechanism for the second door comprising an arm; the mechanism to actuate movement the cover may comprise a mechanism to actuate movement of the first door relative to the base and a mechanism to actuate movement of the second door relative to the base. See e.g. FIGS. 2A-2D, 3-5, 6A, 15A-15B, 17, 20, 29A-29B and 30A-30B. The mechanism to actuate movement of the first door may comprise a spring and a link arm; the spring of the mechanism to actuate movement of the first door may be configured to move the door toward the open position. The arm of the latch mechanism for the first door may be pivotally coupled to the base; the arm of the latch mechanism for the second door may be pivotally coupled to the base. The arm of the latch mechanism for the first door and the arm of the latch mechanism for the second door may be pivotally coupled to the base at a pivot. The arm of the latch mechanism for the first door may comprise a counterweight. The latch mechanism for the first door may comprise a spring to retain the arm in the elevated position. The latch mechanism for the first door may comprise a push-push latch to retain the arm in the retracted position; the latch mechanism for the second door may comprise a push-push latch to retain the arm in the retracted position; the arm of the latch mechanism for the first door may be moved to the elevated position as the first door is moved toward the open position. See e.g. FIGS. 29A-29B, 35A-35E, 36A-36B and 37A-37F.

The base and cover may comprise at least one of (a) a vehicle trim component, (b) a console, (c) a floor console, (d) a center console, (e) a storage compartment.

According to an exemplary embodiment as shown schematically, a vehicle interior component such as a console assembly may be provided in a form configured to be operated by application of an external force from an occupant comprising: (a) a base providing a compartment; (b) a cover movable relative to the base from a closed position to an open position; (c) a mechanism to actuate movement of the cover to the open position; and (d) a latch configured to secure the cover to the base. See e.g. FIGS. 2A-2D, 3-5, 6A, 15A-15B, 17, 20, 29A-29B and 30A-30B. The latch may comprise a projection configured to retract into a slot in a sidewall of the base when the cover is moved to the open position. See e.g. FIGS. 3, 7A-7E, 8A-8E, 11A-11F and 12A-12E, 17, 23A-23E, 24A-24E, 27A-27F, 28A-28E, 30A-30B and 37A-37E. The latch may comprise a concealed magnetic latch. See e.g. FIGS. 3-5, 6A-6B, 15A-15B, 20, 29A-29B, 30A-30B and 34. The mechanism may comprise a linkage; the linkage may comprise a link arm coupled to the cover.

According to an exemplary embodiment as shown schematically, a vehicle interior component such as a console assembly may be provided in a form configured to be operated by application of an external force from an occupant comprising: (a) a base providing a compartment; (b) a cover movable relative to the base from a closed position to an open position; (c) a mechanism to actuate movement of the cover to the open position; and (d) a latch mechanism comprising a latch configured to secure the cover to the base. See e.g. FIGS. 2A-2D, 3-5, 6A, 15A-15B, 17, 20, 29A-29B and 30A-30B. The mechanism to actuate movement of the cover may be configured to engage the latch mechanism when the cover is moved to the open position so that the latch can engage the cover when the cover is moved to the closed position. The mechanism to actuate movement of the cover may comprise at least one of (a) a disk on a flange of the cover; (b) a linkage with a disk and a link arm; (c) a disk with a link arm configured to nest with the disk when the cover is moved to the open position; (d) a disk and a link arm in planar alignment; (e) a link arm comprising a curved section; (f) a disk providing a cam surface; (g) a spring; (h) a torsion spring; (i) a coil spring. See e.g. FIGS. 2A-2D, 3-5, 6A, 15A-15B, 17, 20, 29A-29B and 30A-30B. The latch mechanism may comprise an arm providing a latch feature configured to engage a latch feature of the cover; and the mechanism to actuate movement of the cover may engage the arm of the latch mechanism to move the arm of the latch mechanism for engagement with the latch feature of the cover. See e.g. FIGS. 3-5, 6A-6B, 15A-15B, 20, 29A-29B, 30A-30B and 34. The mechanism to actuate movement of the cover may comprise a counterweight configured to at least one of: (a) facilitate movement of the cover to the open position; (b) provide mass intended to maintain the cover in the closed position; (c) provide a cam surface to engage a latch mechanism comprising the latch. The latch may comprise a magnetic latch. See e.g. FIGS. 3-5, 6A-6B, 15A-15B, 20, 29A-29B, 30A-30B and 34. The mechanism to actuate movement of the cover may be configured to engage the latch mechanism to move an arm of the latch mechanism from a retracted position as the cover is moved to the open position. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment as shown schematically, a vehicle interior component such as a console assembly may be provided in a form configured to be operated by application of an external force from an occupant comprising: (a) a base providing a compartment; (b) a first door movable relative to the base from a closed position to an open position; (c) a second door moveable from a closed position to an open position relative to the base; (d) a first mechanism configured to actuate the first door for movement to the open position of the first door; (e) a second mechanism configured to actuate the second door for movement to the open position of the second door; (f) a first latch configured to secure the first door to the base; (g) a second latch configured to secure the second door the base. The first latch may comprise a first latch mechanism comprising an arm and a latch feature. See e.g. FIGS. 2A-2D, 3-5, 6A, 15A-15B, 17, 20, 29A-29B and 30A-30B. The second latch may comprise a second latch mechanism comprising a projection providing a housing with a latch feature. The arm of the first latch mechanism may be configured for movement relative to the base between (1) an elevated position for the latch feature of the arm to engage a latch feature of the first door to secure the first door to the base and (2) a retracted position for the latch feature of the arm to disengage the latch feature of the first door to release the first door from the base. See e.g. FIGS. 3, 7A-7E, 8A-8E, 11A-11F and 12A-12E, 17, 23A-23E, 24A-24E, 27A-27F, 28A-28E, 30A-30B and 37A-37E. The arm of the second latch mechanism may be configured for movement relative to the base between (1) an elevated position for the latch feature of the arm to engage a latch feature of the second door to secure the second door to the base and (2) a retracted position for the latch feature of the arm to disengage the latch feature of the second door to release the second door from the base. See e.g. FIGS. 3, 7A-7E, 8A-8E, 11A-11F and 12A-12E, 17, 23A-23E, 24A-24E, 27A-27F, 28A-28E, 30A-30B and 37A-37E. The first latch may comprise a magnetic latch. See e.g. FIGS. 3-5, 6A-6B, 15A-15B, 20, 29A-29B, 30A-30B and 34. The second mechanism to actuate movement of the second door may be configured to engage the second latch mechanism to move the projection from the retracted position as the second door is moved to the open position. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment as shown schematically, a vehicle interior component such as a console assembly may be provided in a form configured to be operated by application of an external force from an occupant comprising: (a) a base providing a compartment; (b) a cover movable relative to the base from a closed position to an open position; and (c) a latch configured to secure the cover to the base. The latch may comprise a magnetic latch feature for the cover and a magnetic latch feature for the base; the magnetic latch feature for the cover may comprise at least one magnet installed in the cover; the magnetic latch feature for the base may comprise at least one magnet; and the cover may be secured to the base by magnetic engagement of the magnetic latch feature for the cover with the magnetic latch feature for the base. See e.g. FIGS. 2A-2D, 3-5, 6A, 15A-15B, 17, 20, 29A-29B and 30A-30B. The latch may comprise a magnetic latch mechanism with a projection providing the magnetic latch feature for the base configured to secure the cover to the base; the magnetic latch mechanism may comprise an arm with the magnetic latch feature for the base that is configured for an elevated position when the cover is retained to the base and for a retracted position when the cover is moved toward the open position. See e.g. FIGS. 3, 7A-7E, 8A-8E, 11A-11F and 12A-12E, 17, 23A-23E, 24A-24E, 27A-27F, 28A-28E, 30A-30B and 37A-37E. The arm may be configured to be retracted into a slot in a sidewall of the base when the arm is in the retracted position. At least one magnet of the magnetic latch feature for base may be installed in a housing and configured so that the at least one magnet for the magnetic latch feature for the base is not in direct contact with the at least one magnet of the magnetic latch feature for the cover when the cover is secured to the base by the latch. See e.g. FIGS. 3-5, 6A-6B, 15A-15B, 20, 29A-29B, 30A-30B and 34.

According to an exemplary embodiment as shown schematically, a vehicle interior component such as a console assembly may be provided in a form configured to be operated by application of an external force from an occupant comprising: (a) a base providing a compartment; (b) a cover comprising a first door moveable relative to the base from a closed position to an open position and a second door moveable relative to the base from a closed position to an open position; and (c) a first latch mechanism for the first door configured to secure the first door to the base and a second latch mechanism for the second door configured to secure the second door to the base. See e.g. FIGS. 2A-2D, 3-5, 6A, 15A-15B, 17, 20, 29A-29B and 30A-30B. The first door may comprise a latch feature, the second door may comprise a latch feature, the first latch mechanism may comprise a latch feature with the base and the second latch mechanism may comprise a latch feature with the base. See e.g. FIGS. 3, 7A-7E, 8A-8E, 11A-11F and 12A-12E, 17, 23A-23E, 24A-24E, 27A-27F, 28A-28E, 30A-30B and 37A-37E. Each latch feature may be substantially identical. The latch feature of the first latch mechanism with the base may comprise a magnet provided in a housing; the latch feature of the second latch mechanism with the base may comprise a magnet provided in a housing; the latch feature of the first door may comprise a magnet provided in a housing; the latch feature of the second door may comprise a magnet provided in a housing; the magnet of the first latch mechanism with base in the housing may be configured to provide for magnetic attraction without direct contact to the magnet of the first door in the housing; the magnet of the second latch mechanism with base in the housing may be configured to provide for magnetic attraction without direct contact to the magnet of the second door in the housing. See e.g. FIGS. 3-5, 6A-6B, 15A-15B, 20, 29A-29B, 30A-30B and 34.

According to an exemplary embodiment as shown schematically, a vehicle interior component such as a console assembly may be provided in a form configured to be operated by application of an external force from an occupant comprising: (a) a base providing a compartment; (b) a cover comprising a first door movable relative to the base from a closed position to an open position and a second door relative to the base moveable from a closed position to an open position; and (c) a first latch mechanism for the first door configured to secure the first door to the base and a second latch mechanism for the second door configured to secure the second door to the base. See e.g. FIGS. 2A-2D, 3-5, 6A, 15A-15B, 17, 20, 29A-29B and 30A-30B. The first latch mechanism and the second latch mechanism may be coupled to the base at a shared pivot. See e.g. FIGS. 3, 7A-7E, 8A-8E, 11A-11F and 12A-12E, 17, 23A-23E, 24A-24E, 27A-27F, 28A-28E, 30A-30B and 37A-37E. The first latch mechanism may comprise a spring at the pivot configured to compress as a projection of the first latch mechanism moves from an elevated position to engage the first door to a retracted position to disengage the first door. The first latch mechanism may comprise at least one magnet. The first door may be configured to move to the open position by rotation in a first direction when the first latch mechanism is unlatched; the first latch mechanism may be configured to unlatch the first door from the base by rotation is a second direction to the retracted position; the first direction may be opposite to the second direction. See e.g. FIGS. 3-5, 6A-6B, 15A-15B, 20, 29A-29B, 30A-30B and 34. The first door may be opposed to the second door; the first door when in the open position may be configured to facilitate access to the compartment; and the second door when in the open position is configured to facilitate access to the compartment. See e.g. FIGS. 2A-2D, 3-5, 6A, 15A-15B, 17, 20, 29A-29B and 30A-30B.

According to an exemplary embodiment as shown schematically, a vehicle interior component such as a console assembly may be provided in a form configured to be operated by application of an external force from an occupant comprising: (a) a base providing a compartment; (b) a cover comprising a first door movable relative to the base from a closed position to an open position and a second door moveable from a closed position to an open position relative to the base; and (c) a first latch mechanism for the first door configured to secure the first door to the base and a second latch mechanism for the second door configured to secure the second door to the base. See e.g. FIGS. 2A-2D, 3-5, 6A, 15A-15B, 17, 20, 29A-29B and 30A-30B. The base may comprise a set of sidewalls comprising at least one sidewall providing a mechanism for actuating the first door. At least one sidewall comprises a sidewall; the first latch mechanism may be associated on the sidewall; the first latch mechanism may be configured to move between an elevated position relative to the sidewall to secure the first door in the closed position and a retracted position within a slot in the sidewall to disengage from the first door as the first door moves toward the open position. See e.g. FIGS. 3, 7A-7E, 8A-8E, 11A-11F and 12A-12E, 17, 23A-23E, 24A-24E, 27A-27F, 28A-28E, 30A-30B and 37A-37E. The first latch mechanism may be at least partially concealed in the sidewall when in the retracted position within the slot.

According to an exemplary embodiment as shown schematically, a vehicle interior component such as a console assembly may be provided in a form configured to be operated by application of an external force from an occupant comprising: (a) a base providing a compartment; (b) a door movable relative to the base from a closed position to an open position; and (c) a latch mechanism configured to secure the door to the base. The base may comprise a set of sidewalls comprising a sidewall providing an aperture; a projection of the latch mechanism may be configured to extend through the aperture in the sidewall to engage the cover to secure the cover to the base. See e.g. FIGS. 2A-2D, 3-5, 6A, 15A-15B, 17, 20, 29A-29B and 30A-30B. The aperture may comprise a slot and the latch mechanism may comprise an arm with the projection movable between an elevated position and a retracted position and the projection of the arm may elevate (or extend at least partially) through the slot when the arm is in the elevated position. See e.g. FIGS. 3, 7A-7E, 8A-8E, 11A-11F and 12A-12E, 17, 23A-23E, 24A-24E, 27A-27F, 28A-28E, 30A-30B and 37A-37E. The latch mechanism may be a magnetic latch mechanism; the projection may comprise a housing for at least one magnet. See e.g. FIGS. 3-5, 6A-6B, 15A-15B, 20, 29A-29B, 30A-30B and 34.

According to an exemplary embodiment as shown schematically, a vehicle interior component such as a console assembly may be provided in a form configured to be operated by application of an external force from an occupant comprising: (a) a base providing an opening for a compartment; (b) a cover movable relative to the base from a closed position to an open position; and (c) a magnetic latch mechanism comprising an arm providing a magnetic latch feature configured to secure the cover to the base. See e.g. FIGS. 2A-2D, 3-5, 6A, 15A-15B, 17, 20, 29A-29B and 30A-30B. The cover may comprise a magnetic latch feature configured to engage the magnetic latch feature of the arm. The arm may be configured for movement relative to the base between (1) an elevated position for the magnetic latch feature of the arm to engage the magnetic latch feature of the cover to secure the cover to the base and (2) a retracted position for the magnetic latch feature of the arm to disengage the magnetic latch feature of the cover to release the cover from the base. See e.g. FIGS. 3, 7A-7E, 8A-8E, 11A-11F and 12A-12E, 17, 23A-23E, 24A-24E, 27A-27F, 28A-28E, 30A-30B and 37A-37E. The magnetic latch feature may comprise at least one magnet installed in the cover; the magnetic latch feature for the base may comprise at least one magnet installed in the arm. See e.g. FIGS. 3-5, 6A-6B, 15A-15B, 20, 29A-29B, 30A-30B and 34. The latch may comprise a latch mechanism; the latch mechanism may comprise an arm; the arm may comprise a magnetic latch feature; the arm of the cover may be configured for movement relative to the base between (1) an elevated position for the magnetic latch feature of the arm to engage the magnetic latch feature of the cover to secure the cover to the base and (2) a retracted position for the magnetic latch feature of the arm to disengage the magnetic latch feature of the cover to release the cover from the base. See e.g. FIGS. 29A-29B, 35A-35E, 36A-36B and 37A-37F. The magnetic latch feature of the cover may translate relative to the magnetic latch feature of the arm as the arm moves to the retracted position. See e.g. FIGS. 3-5, 6A-6B, 15A-15B, 20, 29A-29B, 30A-30B and 34. Magnetic attraction between the cover and arm may be across an interface. The magnetic latch feature of the cover may engage the magnetic latch feature of the arm at an interface; the interface may comprise a housing for the at least one magnet of the cover and a housing for the at least one magnet of the arm; and the latch may be secured at the interface by contact of the housing for the at least one magnet of the cover and the housing for the at least one magnet of the arm. The magnetic latch feature of the arm may engage by magnetic attraction the magnetic latch feature of the cover when the arm is elevated and the cover is in the closed position; the magnetic latch feature of the arm may disengage from magnetic attraction with the magnetic latch feature of the cover when the arm is in the retracted position. See e.g. FIGS. 3, 7A-7E, 8A-8E, 11A-11F and 12A-12E, 17, 23A-23E, 24A-24E, 27A-27F, 28A-28E, 30A-30B and 37A-37E. The magnetic latch feature of the arm and the magnetic latch feature of the cover may comprise a complementary configuration to establish magnetic attraction to close the cover to the base; the complementary configuration may comprise a first magnetic element from the magnetic latch feature of the arm providing a first magnetic field configured to engage a second magnetic element from the magnetic latch feature of the cover providing a second magnetic field. The first magnetic field may be aligned with the second magnetic field to engage and secure the cover to the base by magnetic attraction. See e.g. FIGS. 3-5, 6A-6B, 15A-15B, 20, 29A-29B, 30A-30B and 34. The magnetic latch feature of the arm may be disengaged from the magnetic latch feature of the cover by external force to facilitate separation of the cover from the base for the cover to move to the open position.

According to an exemplary embodiment as shown schematically, a vehicle interior component may comprise a console configured to be operated by application of an external force from an occupant; the console may comprise: (a) a base providing an opening for a compartment; (b) a cover movable from a closed position to an open position relative to the opening of the base; (c) a mechanism to actuate movement of the cover to the open position; and (d) a latch configured to secure the cover to the base. See e.g. FIGS. 2A-2D, 3-5, 6A, 15A-15B, 17, 20, 29A-29B and 30A-30B. According to an exemplary embodiment, the latch may comprise a concealed magnetic latch. See e.g. FIGS. 3-5, 6A-6B, 15A-15B, 20, 29A-29B, 30A-30B and 34.

According to an exemplary embodiment, the mechanism may comprise a spring configured to facilitate movement of the cover to the open position; the spring may comprise at least one of (a) a torsion spring or (b) a coil spring. According to an exemplary embodiment, the mechanism may comprise a linkage; the mechanism may comprise a link arm coupled to the cover. See e.g. FIGS. 2A-2D, 3-5, 6A, 15A-15B, 17, 20, 29A-29B and 30A-30B. According to an exemplary embodiment, the mechanism may comprise a pivot with a disk and a link arm configured to nest with the disk when the cover may be moved to the open position. See e.g. FIGS. 16A-16B. According to an exemplary embodiment, the link arm and the disk are in alignment; the link arm may comprise a curved section. See FIGS. 16A-16B.

According to an exemplary embodiment, the mechanism may comprise a cam surface to engage a latch mechanism comprising the latch; the mechanism may comprise a disk providing the cam surface. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment, the latch mechanism may comprise an arm providing a latch feature configured to engage a latch feature of the cover; the cam surface of the mechanism engages the arm of the latch mechanism to disengage the latch feature of the arm and the latch feature of the cover. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the mechanism may comprise a counterweight configured to at least one of: (a) facilitate movement of the cover to the open position; (b) provide inertia to maintain the cover in the closed position; (c) provide a cam surface to engage a latch mechanism comprising the latch. See e.g. FIGS. 2A-2D, 3-5, 6A, 15A-15B, 17, 20, 29A-29B and 30A-30B.

According to an exemplary embodiment the console may comprise a latch mechanism providing the latch; the latch may comprise a magnetic latch; the latch mechanism may comprise a set of latch features; the latch mechanism may comprise an arm providing a latch feature. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the cover may comprise a latch feature for the latch mechanism. According to an exemplary embodiment, the arm may be configured for movement relative to the base between (1) an elevated position for the latch feature of the arm to engage the latch feature of the cover to secure the cover to the base and (2) a retracted position for the latch feature of the arm to disengage the latch feature of the cover to release the cover from the base. According to an exemplary embodiment, the arm may be pivotally coupled to the base; the latch feature of the arm may comprise at least one magnet and the latch feature of the cover may comprise at least one magnet; the latch mechanism may comprise a spring configured to retain the arm in the elevated position. According to an exemplary embodiment, the latch mechanism may comprise a stop for the arm at the retracted position. According to an exemplary embodiment, the latch mechanism may comprise a latch to retain the arm in the retracted position; the latch may comprise at least one of (a) a push-push latch or (b) a clip. See e.g. FIGS. 29A-29B, 35A-35E, 36A-36B and 37A-37F.

According to an exemplary embodiment, the mechanism to actuate movement of the cover may comprise a spring. See e.g. FIGS. 2A-2D, 3-5, 6A, 15A-15B, 17, 20, 29A-29B and 30A-30B. According to an exemplary embodiment, the mechanism to actuate movement of the cover may be configured to engage the latch mechanism to move the arm from the retracted position as the cover may be moved to the open position. According to an exemplary embodiment, the mechanism to actuate movement of the cover may comprise a cam surface configured to engage a surface on the arm of the latch mechanism; the mechanism to actuate movement of the cover may comprise a counterweight.

According to an exemplary embodiment, the cover may be moved from the closed position by application of the external force to move the arm of the latch mechanism from the elevated position to the retracted position; the cover may be moved to the open position by the mechanism to actuate movement of the cover upon release of the external force. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the cover may comprise a door. According to an exemplary embodiment, the cover may comprise a set of opposing doors; the set of opposing doors may comprise a front door and a rear door; the front door may comprise the latch mechanism; the set of opposing doors may comprise a front door and a rear door; the latch mechanism may comprise a latch mechanism for front door and a latch mechanism for the rear door. See e.g. FIGS. 2A-2D, 3-5, 6A, 15A-15B, 17, 20, 29A-29B and 30A-30B.

According to an exemplary embodiment, the cover may comprise a first door and a second door; the latch mechanism may comprise a latch mechanism for the first door and a latch mechanism for the second door; the mechanism to actuate movement of the cover may comprise a mechanism to actuate movement of the first door relative to the base and a mechanism to actuate movement of the second door relative to the base. See e.g. FIGS. 2A-2D, 3-5, 6A, 15A-15B, 17, 20, 29A-29B and 30A-30B. According to an exemplary embodiment, the mechanism to actuate movement of the second door may comprise a spring and an arm; the spring of the mechanism to actuate movement of the second door may be configured to move the door toward the open position. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the arm of the latch mechanism of the first door may be pivotally coupled to the base; the arm of the latch mechanism of the first door may be pivotally coupled to the base at a hinge; the arm of the latch mechanism of the second door may be pivotally coupled to the base; the arm of the latch mechanism of the second door may be pivotally coupled to the base at the hinge.

According to an exemplary embodiment, the arm of the latch mechanism of the second door may comprise a counterweight; the latch mechanism for the second door may comprise a spring to retain the arm in the elevated position. According to an exemplary embodiment, the base may comprise a structure comprising a first sidewall and a second sidewall to define the compartment and the latch mechanism may be installed at the first sidewall. See e.g. FIGS. 2A-2D, 3-5, 6A, 15A-15B, 17, 20, 29A-29B and 30A-30B.

According to an exemplary embodiment, the latch mechanism for the first door may comprise a push-push latch to retain the arm in the retracted position; the latch mechanism for the second door may comprise a push-push latch to retain the arm in the retracted position. See e.g. FIGS. 29A-29B, 35A-35E, 36A-36B and 37A-37F. According to an exemplary embodiment, the arm of the latch mechanism for the second door may be moved to the elevated position as the second door may be moved toward the open position. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment, the cover may be opened from the base by application of the external force downward on the cover. According to an exemplary embodiment, the mechanism to actuate movement of the cover may comprise a dampening mechanism. See e.g. FIGS. 2A-2D, 3-5, 6A, 15A-15B, 17, 20, 29A-29B and 30A-30B.

According to an exemplary embodiment as shown schematically, a vehicle interior component may comprise a console configured to be operated by application of an external force from an occupant; the console may comprise: (a) a base providing an opening for a compartment; (b) a first door movable from a closed position to an open position relative to the opening of the base; (c) a second door moveable from a closed position to an open position relative to the base; (d) a first mechanism configured to actuate the first door for movement to the open position; (e) a second mechanism configured to actuate the second door for movement to the open position; (f) a first latch configured to secure the first door to the base; (g) a second latch configured to secure the second door the base. See e.g. FIGS. 2A-2D, 3-5, 6A, 15A-15B, 17, 20, 29A-29B and 30A-30B. According to an exemplary embodiment, the first latch may comprise a first latch mechanism comprising an arm and a latch feature. According to an exemplary embodiment, the second latch may comprise a second latch mechanism comprising an arm and a latch feature. According to an exemplary embodiment, the arm of the first latch mechanism may be configured for movement relative to the base between (1) an elevated position for the latch feature of the arm to engage the latch feature of the first door to secure the first door to the base and (2) a retracted position for the latch feature of the arm to disengage the latch feature of the first door to release the first door from the base. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the console may comprise a latch mechanism for the second door comprising an arm providing a latch feature configured to secure the second door to the base; the second door may comprise a latch feature; the arm of the second door may be configured for movement relative to the base between (1) an elevated position for the latch feature of the arm to engage the latch feature of the second door to secure the second door to the base and (2) a retracted position for the latch feature of the arm to disengage the latch feature of the second door to release the second door from the base. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the latch mechanism for the first door may comprise a magnet system; the latch feature of the arm may comprise at least one magnet and the latch feature of the first door may comprise at least one magnet. See e.g. FIGS. 3-5, 6A-6B, 15A-15B, 20, 29A-29B, 30A-30B and 34. According to an exemplary embodiment, the latch mechanism of the first/second door may comprise a spring configured to retain the arm in the elevated position. According to an exemplary embodiment, the latch to retain the arm in the retracted position may comprise a push-push latch. See e.g. FIGS. 29A-29B, 35A-35E, 36A-36B and 37A-37F. According to an exemplary embodiment, the latch mechanism for a door may comprise a stop for the arm at the retracted position.

According to an exemplary embodiment, the console may comprise a mechanism to actuate movement of two doors (comprising either or both of a first/second door) from the closed position to the open position. See e.g. FIGS. 2A-2D, 3-5, 6A, 15A-15B, 17, 20, 29A-29B and 30A-30B. According to an exemplary embodiment, the mechanism to actuate movement of the first/second door may comprise a spring. According to an exemplary embodiment, the mechanism to actuate movement of the first/second door may be configured to engage the latch mechanism to move the arm from the retracted position as the first/second door may be moved to the open position. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the mechanism to actuate movement of the first/second door may comprise a cam surface configured to engage a surface on the arm of the latch mechanism. According to an exemplary embodiment, the mechanism to actuate movement of the first/second door may comprise a counterweight. According to an exemplary embodiment, the first/second door may be moved from the closed position by application of the external force to move the arm of the latch mechanism from the elevated position to the retracted position. According to an exemplary embodiment, the first/second door may be moved to the open position by the mechanism to actuate movement of the first/second door upon release of the external force.

According to an exemplary embodiment, the first door may comprise a front door and the second door may comprise a rear door. See FIGS. 2A-2D. According to an exemplary embodiment, the mechanism to actuate movement of the second door may comprise a spring and an arm; the spring of the mechanism to actuate movement of the second door may be configured to move the door toward the open position. According to an exemplary embodiment, the mechanism to actuate movement of the second door further may comprise a cam disk; the arm of the mechanism for the second door couples the second door to the cam disk. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the arm of the latch mechanism for the second door may comprise a counterweight. According to an exemplary embodiment, the latch mechanism for the second door may comprise a spring to retain the arm in the elevated position. According to an exemplary embodiment, the arm of the latch mechanism for the second door may be moved to the elevated position as the second door may be moved toward the open position. According to an exemplary embodiment, the first/second door may be opened from the base by application of the external force downward on the first/second door.

According to an exemplary embodiment, the base may comprise a structure comprising a first sidewall and a second sidewall to define the compartment and the latch mechanism for the first door may be installed at the first sidewall. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment, the component may comprise at least one of (a) a vehicle trim component, (b) a console, (c) a floor console, (d) a center console, (e) a storage compartment.

According to an exemplary embodiment as shown schematically, a vehicle interior component may comprise a console configured to be operated by application of an external force from an occupant; the console may comprise: (a) a base providing an opening for a compartment; (b) a cover movable from a closed position to an open position relative to the opening of the base; and (c) a latch configured to secure the cover to the base; the latch may comprise a magnetic latch feature for the cover; and the magnetic latch feature of the cover may comprise at least one magnet installed in the cover; the magnetic latch feature for the base may comprise at least one magnet installed so that the at least one magnet may be not directly exposed to the at least one magnet of the cover; and the cover may be secured to the base by indirect magnetic engagement of the magnetic latch feature of the cover with the magnetic latch feature for the base. See e.g. FIGS. 2A-2D, 3-5, 6A, 15A-15B, 17, 20, 29A-29B and 30A-30B.

According to an exemplary embodiment, the latch may comprise a magnetic latch mechanism providing the magnetic latch feature for the base configured to secure the cover to the base. See e.g. FIGS. 3-5, 6A-6B, 15A-15B, 20, 29A-29B, 30A-30B and 34. According to an exemplary embodiment, the magnetic latch mechanism may comprise an arm with the magnetic latch feature. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment as shown schematically, a vehicle interior component may comprise a console configured to be operated by application of an external force from an occupant; the console may comprise: (a) a base providing an opening for a compartment; (b) a cover movable from a closed position to an open position relative to the opening of the base; and (c) a magnetic latch mechanism providing a magnetic latch feature for the base configured to secure the cover to the base; the cover may comprise a magnetic latch feature configured to engage the magnetic latch feature for the base; the magnetic latch feature of the may comprise at least one magnet installed in the cover; the magnetic latch feature for the base may comprise at least one magnet. See e.g. FIGS. 2A-2D, 3-5, 6A, 15A-15B, 17, 20, 29A-29B and 30A-30B.

According to an exemplary embodiment as shown schematically, a vehicle interior component may comprise a console configured to be operated by application of an external force from an occupant; the console may comprise: (a) a base providing an opening for a compartment; (b) a cover movable from a closed position to an open position relative to the opening of the base; and (c) a magnetic latch mechanism comprising an arm providing a magnetic latch feature configured to secure the cover to the base; the cover may comprise a magnetic latch feature configured to engage the magnetic latch feature of the arm; the arm may be configured for movement relative to the base between (1) an elevated position for the magnetic latch feature of the arm to engage the magnetic latch feature of the cover to secure the cover to the base and (2) a retracted position for the magnetic latch feature of the arm to disengage the magnetic latch feature of the cover to release the cover from the base. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment, the magnetic latch feature of the cover may comprise at least one magnet installed in the cover; the magnetic latch feature for the base may comprise at least one magnet installed in the arm. See e.g. FIGS. 3-5, 6A-6B, 15A-15B, 20, 29A-29B, 30A-30B and 34. According to an exemplary embodiment, the cover may be pivotally movable relative to the base. According to an exemplary embodiment, the latch may comprise a latch mechanism. According to an exemplary embodiment, the latch mechanism may comprise an arm. According to an exemplary embodiment, the arm may comprise a magnetic latch feature. According to an exemplary embodiment, the arm of the cover may be configured for movement relative to the base between (1) an elevated position for the magnetic latch feature of the arm to engage the magnetic latch feature of the cover to secure the cover to the base and (2) a retracted position for the magnetic latch feature of the arm to disengage the magnetic latch feature of the cover to release the cover from the base. See e.g. FIGS. 3, 7A-7E, 8A-8E, 11A-11F and 12A-12E, 17, 23A-23E, 24A-24E, 27A-27F, 28A-28E, 30A-30B and 37A-37E. According to an exemplary embodiment, the magnetic latch feature of the cover translates relative to the magnetic latch feature of the arm as the arm moves to the retracted position. According to an exemplary embodiment, the magnetic latch feature of the cover slides relative to the magnetic latch feature of the arm as the arm moves to the retracted position. According to an exemplary embodiment, the magnetic latch feature of the cover translates relative to the magnetic latch feature of the arm as the arm moves to the retracted position. According to an exemplary embodiment, the magnetic latch feature of the cover may comprise at least one magnet. According to an exemplary embodiment, the magnetic latch feature of the arm may comprise at least one magnet. According to an exemplary embodiment, the magnetic latch feature may comprise a magnetic material. According to an exemplary embodiment, magnetic attraction between the cover and arm may be across an interface. See e.g. FIGS. 3-5, 6A-6B, 15A-15B, 20, 29A-29B, 30A-30B and 34. According to an exemplary embodiment, the magnetic latch feature of the cover engages the magnetic latch feature of the arm at an interface; the interface may comprise a housing for the at least one magnet of the cover and a housing for the at least one magnet of the arm; and the latch may be secured at the interface by contact of the housing for the at least one magnet of the cover and the housing for the at least one magnet of the arm. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment, (1) the magnetic latch feature of the arm engages by magnetic attraction the magnetic latch feature of the cover when the arm may be elevated and the cover may be in the closed position and (2) the magnetic latch feature of the arm disengages from magnetic attraction with the magnetic latch feature of the cover when the arm may be in the retracted position. See e.g. FIGS. 3-5, 6A-6B, 15A-15B, 20, 29A-29B, 30A-30B and 34.

According to an exemplary embodiment, the console may comprise a magnetic latching arrangement in which the magnetic latch feature of the arm and the magnetic latch feature of the cover comprise a complementary configuration to establish magnetic attraction to close the cover to the base; the complementary configuration may comprise a first magnetic element from the magnetic latch feature of the arm providing a first magnetic field configured to engage a second magnetic element from the magnetic latch feature of the cover providing a second magnetic field. See e.g. FIGS. 3-5, 6A-6B, 15A-15B, 20, 29A-29B, 30A-30B and 34. According to an exemplary embodiment, the first magnetic field may be aligned with the second magnetic field to engage and secure the cover to the base by magnetic attraction. According to an exemplary embodiment, the magnetic latch feature of the arm may be disengaged from the magnetic latch feature of the cover by external force to facilitate separation of the cover from the base for the cover to move to the open position. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment as shown schematically, a vehicle interior component may comprise a console configured to be operated by application of an external force from an occupant; the console may comprise: (a) a base providing an opening for a compartment; (b) a cover comprising a first door movable from a closed position to an open position relative to the opening of the base and a second door moveable from a closed position to an open position relative to the base; and (c) a first latch mechanism for the first door configured to secure the first door to the base and a second latch mechanism for the second door configured to secure the second door to the base; the first door, second door, first latch mechanism and second latch mechanism may each comprise a latch feature (e.g. all four latch features substantially the same). See e.g. FIGS. 2A-2D, 3-5, 6A, 15A-15B, 17, 20, 29A-29B and 30A-30B. According to an exemplary embodiment, the first latch mechanism and the second latch mechanism may pivot relative to the base about a shared pivot (e.g. actuated by a spring at the pivot and configured to compress and extend). According to an exemplary embodiment, the first latch mechanism and second latch mechanism of the console may be contained between walls of the base (e.g. on the driver side); the latch mechanism may project or extend from a wall joining the side walls of the base. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment as shown schematically, a vehicle interior component may comprise a console configured to be operated by application of an external force from an occupant; the console may comprise: (a) a base providing an opening for a compartment; (b) a door movable from a closed position to an open position relative to the opening of the base; and (c) a latch mechanism configured to secure the door to the base; the door may comprise a latch feature; the latch mechanism may comprise a latch feature. See e.g. FIGS. 2A-2D, 3-5, 6A, 15A-15B, 17, 20, 29A-29B and 30A-30B. According to an exemplary embodiment the door and latch mechanism may each comprise a latch feature (e.g. identical latch features such as magnet elements). See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment, at least one of the latch features may be a magnetic material and/or a magnet; at least one of the latch features may be configured to translate or slide relative to disengage (e.g. relative to the cover to release door from base); the latch mechanism may be configured to engage the latch mechanism when the cover is moved to the open position so that the latch can engage the cover when the cover is moved to the closed position. See e.g. FIGS. 3-5, 6A-6B, 15A-15B, 20, 29A-29B, 30A-30B and 34.

According to an exemplary embodiment, the latch mechanism may comprise a mechanical latch arrangement. See e.g. FIGS. 29A-29B, 35A-35E, 36A-36B and 37A-37F. According to an exemplary embodiment, the latch arrangement and latch features may be retained in a housing of the base/arm and cover (e.g. retained by a clip arrangement, encapsulated, housed in a plastic material, mounted, bonded, etc.) during installation and/or assembly of the console assembly. See e.g. FIGS. 3, 7A-7E, 8A-8E, 11A-11F and 12A-12E, 17, 23A-23E, 24A-24E, 27A-27F, 28A-28E, 30A-30B and 37A-37E.

According to an exemplary embodiment, the mechanisms/assemblies of the floor console assembly may be implemented using a combination of components providing the features including but not limited to as shown and described in reference to the FIGURES.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in

The invention claimed is:

1. A vehicle interior component comprising:
(a) a base;
(b) a cover movable relative to the base from a closed position to an open position;
(c) a latch mechanism; and
(d) an opening mechanism configured to actuate movement of the cover from the closed position to the open position upon release of an external force from the cover;
wherein the opening mechanism is configured to move the latch mechanism within the base as the cover moves toward the open position;
wherein the latch mechanism comprises a magnet configured for movement within the base for an engaged state and a disengaged state to release the cover from the closed position;
wherein the latch mechanism is configured to maintain the disengaged state after the cover has been released from the base.

2. The component of claim 1 wherein the latch mechanism further comprises a magnet fixed to the cover.

3. The component of claim 2 wherein the magnet fixed to the cover is configured to be concealed within the cover; wherein the magnet of the base is configured to be concealed within the base.

4. The component of claim 1 wherein the base comprises an opening provided in a sidewall of the base; wherein the latch mechanism is configured to extend through the opening to engage the cover to secure the cover to the base.

5. The component of claim 1 wherein the magnet comprises at least one of (a) a magnet element; (b) a ferromagnetic element; (c) an element of a magnet arrangement; (d) an element of a magnetic latch arrangement; (e) an element of a magnetic latch mechanism; (f) a magnetic material element; (g) a magnetic component; (h) a magnet configured to engage a magnet in the cover; (i) a multi-pole magnet; (j) a multi-pole magnet configured to engage a magnet in the cover; (k) a magnet configured to establish magnetic attraction when aligned according to complementary magnetic polarity; (l) a multi-pole magnet configured to establish magnetic attraction when aligned according to a multi-pole complementary south-north magnetic polarity; (m) a magnet configured to establish magnetic attraction with a metallic component.

6. A vehicle interior component comprising:
(a) a base;
(b) a cover movable relative to the base from a closed position to an open position; and
(c) a latch mechanism;
wherein the latch mechanism comprises a magnet configured for movement within the base for an engaged state and a disengaged state to release the cover from the closed position;
wherein the cover comprises a magnet;
wherein the cover is configured to move the magnet of the base from an elevated position for the magnet of the base to engage the magnet of the cover to secure the cover to the base to a retracted position for the magnet of the base to disengage the magnet of the cover to release the cover from the base.

7. The component of claim 6 wherein the cover is configured to move the magnet of the base from the elevated position to the retracted position in response to application of external force on the cover.

8. The component of claim 6 wherein the magnet of the cover is configured to slide relative to the magnet of the base to release the cover from the base.

9. The component of claim 6 wherein the latch mechanism is configured to maintain the magnet of the base in the retracted position after the cover has been released from the base.

10. The component of claim 6 wherein the magnet of the base is configured to extend beyond an opening in the base in the elevated position.

11. The component of claim 6 wherein the cover is configured to move the magnet of the base from the retracted position toward the elevated position as the cover moves toward the open position.

12. The component of claim 6 wherein the cover comprises a user interface configured to release the cover from the base; wherein actuation of the user interface is configured to move the magnet of the cover and the magnet of the base.

13. A vehicle interior component comprising:
(a) a base;
(b) a cover movable relative to the base from a closed position to an open position; and
(c) a latch mechanism;
wherein the latch mechanism comprises a magnet configured for movement within the base for an engaged state and a disengaged state to release the cover from the closed position;
wherein the cover comprises a magnet;
wherein the magnet of the cover is configured to move relative to the base to move the magnet of the base from the engaged state to the disengaged state.

14. The component of claim 13 wherein the magnet of the cover is fixed to the cover.

15. The component of claim 13 wherein the cover is configured to rotate relative to the base between the open position and the closed position about a pivot; wherein the magnet of the cover is configured to rotate relative to the base about the pivot to rotate the magnet of the base to the disengaged state.

16. The component of claim 13 further comprising a counterweight configured for at least one of: (a) to facilitate movement of the cover to the open position; (b) to maintain the cover in the closed position.

17. The component of claim 13 wherein the magnet of the base is configured to retract at least partially into a sidewall of the base when the magnet of the base moves toward the disengaged state.

18. The component of claim 13 comprising at least one of (a) a vehicle trim component, (b) a console, (c) a floor console, (d) a center console, (e) a storage compartment; (f) a console assembly.

* * * * *